United States Patent
Hutchison et al.

(10) Patent No.: US 11,423,400 B1
(45) Date of Patent: *Aug. 23, 2022

(54) METHOD AND APPARATUS FOR ORDERING GOODS, SERVICES AND CONTENT OVER AN INTERNETWORK USING A VIRTUAL PAYMENT ACCOUNT

(71) Applicant: Stripe, Inc., San Francisco, CA (US)

(72) Inventors: Robin B. Hutchison, Vancouver (CA); Robert J. Llewellyn, Poulsbo, WA (US); Andre F. Viljoen, North Vancouver (CA); David Griffiths, Jr., Ware (GB); David Birch, Woking (GB); Iain M. Begg, Vancouver (CA)

(73) Assignee: STRIPE, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/865,175

(22) Filed: Jan. 8, 2018

Related U.S. Application Data

(63) Continuation of application No. 11/775,473, filed on Jul. 10, 2007, now Pat. No. 9,864,989, which is a
(Continued)

(51) Int. Cl.
  *G06Q 20/38* (2012.01)
  *G06Q 30/06* (2012.01)
  (Continued)

(52) U.S. Cl.
  CPC .......... *G06Q 20/385* (2013.01); *G06Q 20/02* (2013.01); *G06Q 20/027* (2013.01);
  (Continued)

(58) Field of Classification Search
  None
  See application file for complete search history.

(56) References Cited

U.S. PATENT DOCUMENTS

| | | | | |
|---|---|---|---|---|
| 5,005,200 | A | * | 4/1991 | Fischer .................. G06F 21/00 380/30 |
| 5,191,522 | A | * | 3/1993 | Bosco .................... G06Q 40/02 705/4 |

(Continued)

FOREIGN PATENT DOCUMENTS

| CA | 2167543 A1 | 7/1997 |
|---|---|---|
| CA | 2217825 A1 | 4/1998 |

(Continued)

OTHER PUBLICATIONS

Marvin A. Sirbu (Credits and debits on the Internet) (Year: 1997).*
(Continued)

*Primary Examiner* — Mamon Obeid
(74) *Attorney, Agent, or Firm* — Womble Bond Dickinson (US) LLP

(57) ABSTRACT

A virtual payment system for paying for goods, services and content ordered over an internetwork is disclosed. The virtual payment system includes a commerce gateway. Buyers and sellers becomes registered participants by applying for virtual payment buyer and seller accounts. Once an account is established with the commerce gateway, a digital certificate is stored on the registered participant's computer. A buyer can then order a product, i.e., goods, services or content from a seller and charge it to the virtual payment account. When the product is shipped, the seller notifies the commerce gateway, which applies the charges to the buyer's virtual payment account. The buyer can settle the charges using a prepaid account, a credit account, or by using reward points earned through use of the virtual payment account. A buyer may create sub-accounts.

18 Claims, 56 Drawing Sheets

Related U.S. Application Data continuation of application No. 10/663,443, filed on Sep. 16, 2003, now Pat. No. 7,249,097, which is a continuation of application No. 10/338,133, filed on Jan. 6, 2003, now abandoned, which is a continuation of application No. 09/578,395, filed on May 25, 2000, now abandoned, which is a continuation-in-part of application No. 09/370,949, filed on Aug. 9, 1999, now abandoned.

(60) Provisional application No. 60/140,039, filed on Jun. 18, 1999.

(51) Int. Cl.

| | | |
|---|---|---|
| *G06Q 20/02* | (2012.01) | |
| *G06Q 40/02* | (2012.01) | |
| *G06Q 20/08* | (2012.01) | |
| *G06Q 20/10* | (2012.01) | |
| *G06Q 20/12* | (2012.01) | |
| *G06Q 20/24* | (2012.01) | |
| *G06Q 20/36* | (2012.01) | |
| *G06Q 20/40* | (2012.01) | |
| *G06Q 30/00* | (2012.01) | |
| *G06Q 30/04* | (2012.01) | |

(52) U.S. Cl.
CPC ........... *G06Q 20/085* (2013.01); *G06Q 20/10* (2013.01); *G06Q 20/102* (2013.01); *G06Q 20/12* (2013.01); *G06Q 20/24* (2013.01); *G06Q 20/367* (2013.01); *G06Q 20/3674* (2013.01); *G06Q 20/3676* (2013.01); *G06Q 20/382* (2013.01); *G06Q 20/3821* (2013.01); *G06Q 20/3829* (2013.01); *G06Q 20/40* (2013.01); *G06Q 20/403* (2013.01); *G06Q 30/00* (2013.01); *G06Q 30/04* (2013.01); *G06Q 30/06* (2013.01); *G06Q 30/0601* (2013.01); *G06Q 30/0603* (2013.01); *G06Q 30/0613* (2013.01); *G06Q 30/0617* (2013.01); *G06Q 40/025* (2013.01)

(56) References Cited

U.S. PATENT DOCUMENTS

| | | | | |
|---|---|---|---|---|
| 5,276,444 A | * | 1/1994 | McNair | G07C 9/27 340/5.8 |
| 5,336,870 A | | 8/1994 | Hughes et al. | |
| 5,475,819 A | | 12/1995 | Miller et al. | |
| 5,557,518 A | * | 9/1996 | Rosen | G06Q 20/367 705/69 |
| 5,610,980 A | | 3/1997 | Johnson et al. | |
| 5,659,616 A | * | 8/1997 | Sudia | G06Q 20/3821 705/76 |
| 5,671,279 A | * | 9/1997 | Elgamal | G06Q 20/02 380/29 |
| 5,677,955 A | * | 10/1997 | Doggett | G06Q 20/02 235/379 |
| 5,715,314 A | * | 2/1998 | Payne et al. | 705/78 |
| 5,724,424 A | | 3/1998 | Gifford | |
| 5,729,594 A | | 3/1998 | Klingman | |
| 5,732,400 A | * | 3/1998 | Mandler | G06Q 20/02 705/26.44 |
| 5,737,414 A | | 4/1998 | Walker et al. | |
| 5,765,144 A | * | 6/1998 | Larche | G06Q 30/02 705/38 |
| 5,768,382 A | | 6/1998 | Schneier et al. | |
| 5,779,549 A | * | 7/1998 | Walker | A63F 13/12 463/23 |
| 5,784,463 A | * | 7/1998 | Chen | G06F 21/33 380/282 |
| 5,790,677 A | * | 8/1998 | Fox | G06Q 20/00 380/277 |
| 5,794,207 A | * | 8/1998 | Walker | G06Q 20/00 705/77 |
| 5,797,127 A | | 8/1998 | Walker et al. | |
| 5,798,508 A | | 8/1998 | Walker et al. | |
| 5,818,933 A | | 10/1998 | Kambe et al. | |
| 5,822,737 A | | 10/1998 | Ogram | |
| 5,855,008 A | | 12/1998 | Goldhaber et al. | |
| 5,870,473 A | | 2/1999 | Boesch et al. | |
| 5,878,403 A | * | 3/1999 | DeFrancesco | G06Q 20/10 705/35 |
| 5,883,810 A | | 3/1999 | Franklin et al. | |
| 5,883,955 A | | 3/1999 | Ronning | |
| 5,884,288 A | * | 3/1999 | Chang | G06Q 20/0425 705/40 |
| 5,890,137 A | | 3/1999 | Koreeda | |
| 5,899,980 A | | 5/1999 | Wilf et al. | |
| 5,903,721 A | | 5/1999 | Sixtus | |
| 5,903,882 A | * | 5/1999 | Asay | G06Q 10/10 380/30 |
| 5,905,736 A | | 5/1999 | Ronen et al. | |
| 5,909,492 A | | 6/1999 | Payne et al. | |
| 5,910,987 A | * | 6/1999 | Ginter | G06Q 20/102 705/52 |
| 5,914,472 A | | 6/1999 | Foladare et al. | |
| 5,930,776 A | * | 7/1999 | Dykstra | G06Q 40/00 705/35 |
| 5,933,625 A | | 8/1999 | Sugiyama | |
| 5,943,423 A | * | 8/1999 | Muftic | G06Q 20/3674 705/67 |
| 5,963,625 A | * | 10/1999 | Kawecki | G06Q 20/10 379/114.17 |
| 5,991,738 A | * | 11/1999 | Ogram | G06Q 20/02 235/375 |
| 5,995,625 A | * | 11/1999 | Sudia | G06F 21/6209 705/51 |
| 5,996,076 A | * | 11/1999 | Rowney | G06F 21/445 705/76 |
| 6,000,832 A | | 12/1999 | Franklin et al. | |
| 6,002,767 A | * | 12/1999 | Kramer | G06Q 20/02 705/27.1 |
| 6,003,765 A | | 12/1999 | Okamoto | |
| 6,029,150 A | * | 2/2000 | Kravitz | G06Q 20/02 705/39 |
| 6,058,250 A | | 5/2000 | Harwood et al. | |
| 6,064,987 A | * | 5/2000 | Walker | G06Q 10/087 705/30 |
| 6,076,078 A | | 6/2000 | Camp et al. | |
| 6,088,686 A | * | 7/2000 | Walker | G06Q 20/10 235/375 |
| 6,092,147 A | | 7/2000 | Levy et al. | |
| 6,098,053 A | | 8/2000 | Slater | |
| 6,112,983 A | * | 9/2000 | D'Anniballe | G06Q 30/02 235/379 |
| 6,119,105 A | | 9/2000 | Williams | |
| 6,138,107 A | | 10/2000 | Elgamal | |
| 6,158,657 A | * | 12/2000 | Hall, III | G06Q 20/341 235/379 |
| 6,173,269 B1 | | 1/2001 | Sokol et al. | |
| 6,182,894 B1 | | 2/2001 | Hackett et al. | |
| 6,189,103 B1 | * | 2/2001 | Nevarez | G06F 21/128 726/5 |
| 6,209,091 B1 | | 3/2001 | Sudia et al. | |
| 6,212,504 B1 | * | 4/2001 | Hayosh | G06Q 20/042 235/375 |
| 6,227,447 B1 | * | 5/2001 | Campisano | G06Q 20/04 235/380 |
| 6,233,341 B1 | | 5/2001 | Riggins | |
| 6,236,981 B1 | * | 5/2001 | Hill | G06Q 20/02 380/46 |
| 6,263,447 B1 | * | 7/2001 | French | G06F 21/31 380/30 |
| 6,282,658 B2 | | 8/2001 | French et al. | |
| 6,317,729 B1 | * | 11/2001 | Camp | G06Q 20/027 705/16 |

(56) References Cited

U.S. PATENT DOCUMENTS

| | | | |
|---|---|---|---|
| 6,321,339 B1* | 11/2001 | French | G06F 21/33 726/2 |
| 6,324,524 B1 | 11/2001 | Lent et al. | |
| 6,327,578 B1* | 12/2001 | Linehan | G06Q 20/04 705/65 |
| 6,332,134 B1* | 12/2001 | Foster | G06Q 20/02 705/36 R |
| 6,341,349 B1 | 1/2002 | Takaragi et al. | |
| 6,373,950 B1* | 4/2002 | Rowney | G06Q 20/12 380/255 |
| 6,418,169 B1 | 7/2002 | Datari | |
| 6,438,691 B1 | 8/2002 | Mao | |
| 6,442,607 B1* | 8/2002 | Korn | G06F 17/30867 707/E17.109 |
| 6,446,052 B1 | 9/2002 | Juels | |
| 6,466,917 B1* | 10/2002 | Goyal | G06Q 20/206 705/18 |
| 6,484,182 B1 | 11/2002 | Dunphy et al. | |
| 6,523,012 B1* | 2/2003 | Glassman | G06Q 20/02 705/75 |
| 6,629,150 B1 | 9/2003 | Huded | |
| 6,636,833 B1 | 10/2003 | Flitcroft et al. | |
| 6,658,568 B1* | 12/2003 | Ginter | G06F 21/10 348/E5.006 |
| 6,675,153 B1* | 1/2004 | Cook | G06Q 20/02 705/64 |
| 6,721,716 B1* | 4/2004 | Gross | G06Q 20/02 705/34 |
| 6,879,966 B1* | 4/2005 | Lapsley | G06Q 20/4014 705/78 |
| 6,941,270 B1* | 9/2005 | Hannula | G06Q 20/3821 705/76 |
| 6,957,334 B1* | 10/2005 | Goldstein | G06F 21/33 713/170 |
| 6,959,382 B1* | 10/2005 | Kinnis | G06F 21/602 713/168 |
| 6,961,858 B2 | 11/2005 | Fransdonk | |
| 7,020,635 B2 | 3/2006 | Hamilton et al. | |
| 7,024,395 B1* | 4/2006 | McCown | G06Q 20/0453 235/375 |
| 7,039,688 B2 | 5/2006 | Matsuda et al. | |
| 7,069,443 B2* | 6/2006 | Berringer | G06F 21/64 713/175 |
| 7,080,049 B2 | 7/2006 | Truitt et al. | |
| 7,089,202 B1 | 8/2006 | McNamar et al. | |
| 7,090,128 B2 | 8/2006 | Farley et al. | |
| 7,103,575 B1* | 9/2006 | Linehan | G06Q 20/12 235/379 |
| 7,107,462 B2 | 9/2006 | Fransdonk | |
| 7,150,045 B2 | 12/2006 | Koelle et al. | |
| 7,177,847 B2* | 2/2007 | Atkinson | G06Q 20/367 705/65 |
| 7,188,003 B2* | 3/2007 | Ransom | H04L 63/20 700/286 |
| 7,206,748 B1* | 4/2007 | Gruse | G06F 21/10 380/277 |
| 7,249,097 B2* | 7/2007 | Hutchison | G06Q 20/02 705/39 |
| 7,290,138 B2* | 10/2007 | Freeman | H04L 9/3247 713/167 |
| 7,356,503 B1* | 4/2008 | Johnson | G06Q 40/00 705/35 |
| 7,483,858 B2* | 1/2009 | Foran | G06Q 20/02 705/39 |
| 7,536,352 B2* | 5/2009 | Lapsley | G07F 7/1008 705/44 |
| 7,580,988 B2* | 8/2009 | Rudd | G06F 21/6209 709/217 |
| 7,587,368 B2* | 9/2009 | Felsher | G06Q 20/367 705/65 |
| 7,587,502 B2 | 9/2009 | Crawford et al. | |
| 7,606,760 B2* | 10/2009 | Hutchison | G06Q 20/10 705/39 |
| 7,631,188 B2* | 12/2009 | Valente | H04L 9/3265 380/232 |
| 7,644,037 B1* | 1/2010 | Ostrovsky | G06Q 20/10 705/40 |
| 7,711,586 B2 | 5/2010 | Aggarwal et al. | |
| 7,765,151 B1* | 7/2010 | Williams | G06Q 40/00 705/38 |
| 7,904,722 B2* | 3/2011 | Sudia | H04L 9/3247 713/176 |
| 7,908,226 B2* | 3/2011 | Hutchison | G06Q 30/0617 705/79 |
| 8,001,039 B2* | 8/2011 | Crosthwaite | G06Q 30/04 705/38 |
| 8,055,589 B2* | 11/2011 | Saito | G06Q 20/3829 705/76 |
| 8,060,931 B2* | 11/2011 | Dillaway | G06F 21/6218 726/21 |
| 8,078,527 B2* | 12/2011 | Cerise | G06Q 20/102 705/33 |
| 8,095,969 B2* | 1/2012 | Dillaway | H04L 63/10 726/6 |
| 8,117,125 B1* | 2/2012 | Kawan | G06Q 20/38215 705/40 |
| 8,127,345 B2* | 2/2012 | Gregg | G06F 21/335 726/4 |
| 8,225,378 B2* | 7/2012 | Dillaway | G06F 21/6218 726/4 |
| 8,275,672 B1* | 9/2012 | Nguyen | G06Q 30/0641 705/26.41 |
| 8,316,237 B1* | 11/2012 | Felsher | H04L 9/0825 713/171 |
| 8,341,045 B2* | 12/2012 | Kravitz | G06Q 20/347 705/35 |
| 8,556,164 B1* | 10/2013 | Freedman | G06Q 20/387 235/375 |
| 8,566,596 B2* | 10/2013 | Stephenson | G06Q 30/0241 713/176 |
| 8,635,442 B2* | 1/2014 | Agrawal | H04L 9/3268 713/155 |
| 8,656,503 B2* | 2/2014 | Becker | H04L 63/20 726/27 |
| 8,682,802 B1* | 3/2014 | Kannanari | G06Q 20/367 705/65 |
| 8,688,589 B2* | 4/2014 | Cronic | G06Q 20/40 705/67 |
| 8,700,509 B2* | 4/2014 | Heyner | G06Q 40/06 705/35 |
| 8,719,165 B2* | 5/2014 | Roy | G06Q 30/06 705/44 |
| 8,938,783 B2* | 1/2015 | Becker | G06F 21/6218 726/4 |
| 9,094,212 B2* | 7/2015 | Thomas | H04L 63/0807 |
| 9,189,777 B1* | 11/2015 | Dickinson | G06F 21/31 |
| 9,218,507 B2 | 12/2015 | Bowers | |
| 9,626,653 B2* | 4/2017 | Saxena | G06Q 10/103 |
| 9,690,968 B2* | 6/2017 | Wadley | G06K 7/1417 |
| 9,792,593 B2* | 10/2017 | Hayhow | G06Q 20/1085 |
| 9,864,989 B2* | 1/2018 | Hutchison | G06Q 20/24 |
| 9,864,990 B2* | 1/2018 | Hutchison | G06Q 20/085 |
| 9,959,576 B2* | 5/2018 | Hurry | G06Q 40/08 |
| 10,192,216 B2* | 1/2019 | Hammad | G06Q 20/3278 |
| 10,318,955 B2* | 6/2019 | Wilczynski | G06Q 20/36 |
| 10,423,952 B2* | 9/2019 | Heyner | G06F 21/602 |
| 10,482,460 B2* | 11/2019 | Wu | H04L 63/0823 |
| 10,706,416 B2* | 7/2020 | Heyner | G06Q 20/3823 |
| 11,010,727 B2* | 5/2021 | Chu | G06F 3/04842 |
| 2001/0000535 A1 | 4/2001 | Lapsley et al. | |
| 2001/0001877 A1 | 5/2001 | French et al. | |
| 2001/0005839 A1* | 6/2001 | Maenpaa | G06Q 30/06 705/65 |
| 2001/0007098 A1* | 7/2001 | Hinrichs | G06Q 30/02 705/14.23 |
| 2001/0018739 A1 | 8/2001 | Anderson et al. | |
| 2001/0029493 A1 | 10/2001 | Pare et al. | |

(56) References Cited

U.S. PATENT DOCUMENTS

| | | | |
|---|---|---|---|
| 2001/0037310 A1* | 11/2001 | Saeki | G06Q 20/027 705/64 |
| 2001/0039533 A1 | 11/2001 | Pare et al. | |
| 2001/0039535 A1 | 11/2001 | Tsiounis et al. | |
| 2001/0042051 A1* | 11/2001 | Barrett | G06Q 20/02 705/65 |
| 2002/0007343 A1* | 1/2002 | Oyama | G06Q 20/108 705/39 |
| 2002/0013765 A1* | 1/2002 | Shwartz | G06Q 20/04 705/39 |
| 2002/0013898 A1* | 1/2002 | Sudia | G06Q 20/02 713/155 |
| 2002/0023051 A1* | 2/2002 | Kunzle | G06Q 10/10 705/38 |
| 2002/0035533 A1 | 3/2002 | Mache et al. | |
| 2002/0035539 A1 | 3/2002 | O'Connell | |
| 2002/0046188 A1* | 4/2002 | Burges | G06Q 20/3674 705/67 |
| 2002/0052754 A1 | 5/2002 | Joyce et al. | |
| 2002/0059430 A1* | 5/2002 | Orbke | G06Q 10/107 709/227 |
| 2002/0062249 A1 | 5/2002 | Iannacci | |
| 2002/0078344 A1 | 6/2002 | Sandhu et al. | |
| 2002/0094088 A1 | 7/2002 | Okaue | |
| 2002/0111917 A1 | 8/2002 | Hoffman et al. | |
| 2002/0111919 A1* | 8/2002 | Weller | G06Q 20/02 705/67 |
| 2002/0116341 A1* | 8/2002 | Hogan | G06Q 20/04 705/64 |
| 2002/0128969 A1* | 9/2002 | Parmelee | G06Q 20/108 705/42 |
| 2002/0133467 A1* | 9/2002 | Hobson | G06Q 20/04 705/64 |
| 2002/0144120 A1 | 10/2002 | Ramanathan | |
| 2002/0144262 A1* | 10/2002 | Plotnick | G11B 27/005 725/32 |
| 2002/0161719 A1* | 10/2002 | Manning | G06Q 20/02 705/64 |
| 2002/0174048 A1* | 11/2002 | Dheer | G06F 16/957 705/36 R |
| 2002/0184517 A1* | 12/2002 | Tadayon | G06F 21/10 726/27 |
| 2003/0014362 A1* | 1/2003 | Yim | G06Q 20/102 705/40 |
| 2003/0033259 A1* | 2/2003 | Walker | G06Q 20/00 705/78 |
| 2003/0046223 A1* | 3/2003 | Crawford | G06Q 20/10 705/38 |
| 2003/0046237 A1* | 3/2003 | Uberti | G06Q 20/02 705/44 |
| 2003/0046708 A1 | 3/2003 | Jutzi | |
| 2003/0052168 A1 | 3/2003 | Wong | |
| 2003/0074271 A1* | 4/2003 | Viswanath | G06Q 30/06 705/26.81 |
| 2003/0074273 A1* | 4/2003 | Miller | G06Q 30/06 705/26.1 |
| 2003/0163423 A1* | 8/2003 | Holst-Roness | G06Q 20/102 705/40 |
| 2003/0171992 A1* | 9/2003 | Blagg | G06Q 20/385 705/14.17 |
| 2004/0002878 A1* | 1/2004 | Maria Hinton | G06Q 20/3821 705/76 |
| 2004/0073518 A1* | 4/2004 | Atkinson | G07F 7/08 705/65 |
| 2004/0073801 A1* | 4/2004 | Kalogridis | G06F 21/305 713/176 |
| 2004/0078394 A1* | 4/2004 | Powell | G06F 21/606 |
| 2004/0083184 A1* | 4/2004 | Tsuei | G06Q 10/08 705/74 |
| 2004/0111375 A1* | 6/2004 | Johnson | G06Q 20/38215 705/64 |
| 2004/0181818 A1* | 9/2004 | Heyner | H04N 21/4758 725/146 |
| 2004/0192306 A1 | 9/2004 | Elkarat et al. | |
| 2004/0199456 A1* | 10/2004 | Flint | G06Q 30/02 705/38 |
| 2004/0230515 A1 | 11/2004 | Crosthwaite et al. | |
| 2004/0243811 A1* | 12/2004 | Frisch | H04L 9/3247 713/176 |
| 2004/0267665 A1* | 12/2004 | Nam | G06Q 20/04 705/41 |
| 2005/0033813 A1* | 2/2005 | Bhogal | G06Q 10/10 709/206 |
| 2005/0038715 A1 | 2/2005 | Sines et al. | |
| 2005/0102188 A1* | 5/2005 | Hutchison | G06Q 30/0601 705/39 |
| 2005/0119978 A1* | 6/2005 | Ates | G06Q 20/3674 705/67 |
| 2005/0177518 A1* | 8/2005 | Brown | G06Q 20/10 705/64 |
| 2005/0192896 A1* | 9/2005 | Hutchison | G06Q 20/10 705/40 |
| 2005/0216421 A1 | 9/2005 | Barry et al. | |
| 2006/0080546 A1* | 4/2006 | Brannon | H04L 9/3239 713/185 |
| 2006/0089912 A1* | 4/2006 | Spagna | G06F 21/10 705/51 |
| 2006/0168663 A1* | 7/2006 | Viljoen | G06Q 20/4014 726/27 |
| 2006/0237528 A1* | 10/2006 | Bishop | G06Q 20/32 235/380 |
| 2007/0052517 A1* | 3/2007 | Bishop | G06Q 20/10 340/5.2 |
| 2007/0198434 A1* | 8/2007 | Jang | G06F 21/10 705/67 |
| 2007/0199057 A1* | 8/2007 | Plummer | G06F 21/52 726/9 |
| 2007/0245158 A1* | 10/2007 | Giobbi | G06F 21/31 713/186 |
| 2007/0271149 A1* | 11/2007 | Siegel | G06Q 30/0641 705/26.41 |
| 2007/0299684 A1* | 12/2007 | Goodwin | G06Q 20/0855 705/64 |
| 2007/0299771 A1* | 12/2007 | Brody | G06Q 30/02 705/38 |
| 2008/0046718 A1* | 2/2008 | Grab | H04N 21/4627 713/156 |
| 2008/0066159 A1* | 3/2008 | Dillaway | G06F 21/62 726/4 |
| 2008/0066170 A1* | 3/2008 | Dillaway | H04L 63/10 726/9 |
| 2008/0243702 A1* | 10/2008 | Hart | G06Q 20/3672 705/66 |
| 2008/0263422 A1* | 10/2008 | Bardouillet | G06F 11/1004 714/732 |
| 2008/0283591 A1* | 11/2008 | Oder, II | G06Q 40/00 235/380 |
| 2009/0048940 A1* | 2/2009 | Hill | G06Q 30/0613 705/26.41 |
| 2009/0132819 A1* | 5/2009 | Lu | G06Q 20/10 713/169 |
| 2009/0198617 A1* | 8/2009 | Soghoian | G07F 9/001 705/65 |
| 2009/0293081 A1 | 11/2009 | Pirani et al. | |
| 2010/0042542 A1* | 2/2010 | Rose | G06Q 20/108 705/42 |
| 2010/0049658 A1* | 2/2010 | Sanchez | H04L 9/14 705/64 |
| 2010/0088237 A1* | 4/2010 | Wankmueller | G06Q 20/12 705/75 |
| 2010/0114739 A1* | 5/2010 | Johnston | G06Q 30/0601 705/26.1 |
| 2010/0154040 A1* | 6/2010 | CHiu | H04L 63/0823 726/5 |
| 2010/0223186 A1* | 9/2010 | Hogan | G06Q 20/02 705/71 |

(56) References Cited

U.S. PATENT DOCUMENTS

| | | | |
|---|---|---|---|
| 2010/0228668 A1* | 9/2010 | Hogan | G06Q 20/02 705/41 |
| 2010/0251353 A1* | 9/2010 | Hodgkinson | H04L 63/0853 726/9 |
| 2010/0306081 A1* | 12/2010 | Hutchison | G06Q 20/3674 705/26.43 |
| 2011/0087526 A1* | 4/2011 | Morgenstern | G06Q 10/10 705/14.1 |
| 2011/0093934 A1* | 4/2011 | Le Saint | H04L 9/3273 726/5 |
| 2011/0099107 A1* | 4/2011 | Saxena | G06Q 20/3223 705/42 |
| 2011/0189981 A1* | 8/2011 | Faith | G06Q 20/40 455/414.1 |
| 2011/0225643 A1* | 9/2011 | Faynberg | G06F 21/31 726/10 |
| 2012/0142403 A1* | 6/2012 | Prather | G06Q 20/10 463/13 |
| 2012/0173431 A1* | 7/2012 | Ritchie | G06Q 20/367 705/65 |
| 2012/0191979 A1* | 7/2012 | Feldbau | H04L 9/3247 713/178 |
| 2012/0197806 A1* | 8/2012 | Hill | G06F 21/35 705/67 |
| 2012/0246075 A1* | 9/2012 | Rasti | H04L 63/0884 705/44 |
| 2012/0303828 A1 | 11/2012 | Young et al. | |
| 2013/0007858 A1* | 1/2013 | Shah | H04W 12/04 726/6 |
| 2013/0013931 A1* | 1/2013 | O'Hare | H04L 9/085 713/189 |
| 2013/0103584 A1* | 4/2013 | Eichner | G06Q 20/02 705/44 |
| 2013/0191884 A1* | 7/2013 | Leicher | H04L 63/08 726/4 |
| 2013/0311294 A1* | 11/2013 | Ward | G06Q 30/0264 705/14.64 |
| 2013/0317990 A1* | 11/2013 | Heyner | G06F 21/60 705/44 |
| 2013/0318619 A1* | 11/2013 | Heyner | G06Q 20/3829 726/26 |
| 2013/0346112 A1* | 12/2013 | Chasten | G06Q 30/0279 705/4 |
| 2014/0040113 A1 | 2/2014 | Loudoun | |
| 2014/0189797 A1* | 7/2014 | Nori | H04L 63/0807 726/4 |
| 2014/0258109 A1* | 9/2014 | Jiang | G06Q 20/341 705/41 |
| 2014/0331058 A1* | 11/2014 | Heyner | G06Q 20/3829 713/185 |
| 2014/0365781 A1* | 12/2014 | Dmitrienko | G06F 21/34 713/185 |
| 2015/0006392 A1* | 1/2015 | Brand | G06Q 20/38215 705/44 |
| 2015/0026080 A1* | 1/2015 | Roever | G06Q 40/04 705/310 |
| 2015/0081567 A1* | 3/2015 | Boyle | G06Q 20/3829 705/71 |
| 2015/0142665 A1* | 5/2015 | Dicker | G06Q 20/322 705/64 |
| 2015/0150110 A1* | 5/2015 | Canning | H04L 63/12 726/9 |
| 2015/0228039 A1* | 8/2015 | Mahgoub | G06Q 10/00 705/311 |
| 2015/0242825 A1* | 8/2015 | Mills | G06Q 20/0655 705/64 |
| 2016/0189136 A1* | 6/2016 | Mercille | G06Q 20/4093 705/44 |
| 2016/0267477 A1* | 9/2016 | McDonald | G06Q 20/3829 |
| 2016/0292601 A1* | 10/2016 | Pakanathi | G06Q 10/06311 |
| 2016/0352827 A1* | 12/2016 | Procopio | H04L 67/1095 |
| 2017/0083867 A1* | 3/2017 | Saxena | G06Q 10/103 |
| 2017/0103459 A1* | 4/2017 | Kim | G06Q 20/065 |
| 2017/0132630 A1* | 5/2017 | Castinado | G06Q 20/4014 |
| 2017/0160992 A1 | 6/2017 | Christmas et al. | |
| 2018/0018665 A1 | 1/2018 | Chene et al. | |
| 2018/0196950 A1* | 7/2018 | Heyner | G06F 21/64 |
| 2018/0255101 A1* | 9/2018 | Adam | H04L 63/20 |
| 2020/0195642 A1* | 6/2020 | Liderman | H04L 63/0884 |
| 2020/0259654 A1* | 8/2020 | Barnes | H04L 63/0884 |
| 2020/0334675 A1* | 10/2020 | Heyner | H04L 9/321 |

FOREIGN PATENT DOCUMENTS

| | | |
|---|---|---|
| EP | 0765068 A2 | 3/1997 |
| EP | 0779587 A2 | 6/1997 |
| EP | 0818907 A2 | 1/1998 |
| EP | 0883076 A2 | 12/1998 |
| EP | 0902381 A2 | 3/1999 |
| EP | 0921487 A2 | 6/1999 |
| JP | 09-218903 A | 8/1997 |
| JP | 09-297789 A | 11/1997 |
| JP | 09-326002 A | 12/1997 |
| JP | 10-509543 | 9/1998 |
| JP | 10-327145 A | 12/1998 |
| JP | 11-003387 A | 1/1999 |
| JP | 11-003887 A | 1/1999 |
| JP | 11-053444 A | 2/1999 |
| JP | 11-503541 A | 3/1999 |
| JP | 11-239128 A | 8/1999 |
| JP | 11-353280 A | 12/1999 |
| KR | 10-2000-0012391 A | 3/2000 |
| WO | 95/16971 A1 | 6/1995 |
| WO | 96/21192 A1 | 7/1996 |
| WO | 96/31965 A1 | 10/1996 |
| WO | 96/37848 A1 | 11/1996 |
| WO | 97/01920 A1 | 1/1997 |
| WO | 97/22074 A1 | 6/1997 |
| WO | 97/29584 A1 | 8/1997 |
| WO | 97/49054 A2 | 12/1997 |
| WO | 98/09260 A1 | 3/1998 |
| WO | 98/40809 A2 | 9/1998 |
| WO | 98/57460 A1 | 12/1998 |
| WO | 99/21321 A1 | 4/1999 |
| WO | 99/57835 A1 | 11/1999 |

OTHER PUBLICATIONS

Yamasaki, S., and K. Araki, "A Certificate Infrastructure Model for Integrated Cross-Authentification With Warranty and Use Policy Control," Transactions of Information Processing Society of Japan 40(1):296-309, Jan. 1999 (English Abstract).

Summons to Attend Oral Proceedings mailed Aug. 19, 2009, in related Application No. EP 00942881.4, filed Jun. 16, 2000.

Sirbu, M.A., "Creating an Open Market for Information," Journal of Academic Librarianship, Nov. 1995, p. 467 (abstract).

Pappalardo, D., "Tools Lets ISPs Charge for Fax, Voice," Network World, Apr. 1997, p. 116.

Office Action (CA) dated Jan. 13, 2014, issued in related Canadian Application No. 2,377,706, filed Jun. 16, 2000, 5 pages.

Notification of Reason(s) for Refusal dated Dec. 8, 2009, in corresponding Japanese Application No. 2001-504945, filed Jun. 16, 2000.

Minkoff, J., "Ensuring Online Security," Discount Merchandiser, Jan. 1996, p. 49.

Lang, P., "Product Review: eCharge Billing System" .COPYRGT. 1997-2009 Optimum Interactive LLC, Apr. 1998, <http://sellitontheweb.com/ezine/echarge.shtml> [retrieved Dec. 10, 2008], 3 pages.

Itoh, M., et al., "Outline of SET Protocol," NEC Journal 51(9):90-99, 1998 (with partial English translation provided by foreign associate).

http://www.echarge.att.com/how.sub.-wk..html, "AT&T eCharge: How Does It Work?" available at least as early as Oct. 29, 1997.

http://www.echarge.att.com/cgi-bin/Register.cgi, "AT&T eCharge: Apply for an Account," available at least as early as Oct. 29, 1997.

European Examination Report dated Nov. 28, 2008, issued in related Application No. EP 01944177.3, filed May 25, 2001.

(56) References Cited

OTHER PUBLICATIONS

English translation provided by foreign associate of excerpts of Examiner's Opinion dated Jun. 5, 2012, issued in Brazilian Patent Application No. PI 0011768-4, filed Jun. 16, 2000, 3 pages.
Ajluni, C., "Security Techniques Ensure Privacy," Electronic Design, Apr. 1995, pp. 83-84 (abstract).
"Who's guarding the till at the cybermall?", Marion, Larry, Datamation, vol. 41, No. 3, p. 38(4), Feb. 15, 1995.
"Victims Seeking Cheap Online Erotica Aroused by Not-So-Cheap Phone Bills," San Jose Mercury News, Feb. 20, 1997, Sec. C, p. 1.
"Verisign offers unique seal to show Internet users 'Proof of Authentication'", PR Newswire, p. 1210LATU033, Dec. 10, 1996.
"User authentication and authorization challenges in a networked library", Online Libraries and Microcomputers, vol. 15, No. 10, Oct. 1, 1997.
"Open house: E-business and you: buying on the Net . . . safely", Howie, Lau, Businessworld (Philippines), Nov. 3, 1998.
"Internet Service Considers 900," Audiotex News, Jan. 1997, p. 8 (abstract).
"Internet 900 Billing Fills Void," Audiotex News, Dec. 1997, p. 5 (abstract).
"Encryption Devices," Government Executive, Jul. 1996, p. 2A.
"Briefly Noted," Internet Business News, .COPYRGT. Aug. 1994 M2 Communications Ltd., Coventry, United Kingdom, Jan. 1, 1998, p. 1.
"AT&T eCharge: Welcome to AT&T eCharge," <http://www.echarge.att.com /index.html>, available at least as early as Oct. 29, 1997.
Schneier, B., "Applied Cryptography: Protocols, Algorithms, and Source Code in C," 2nd Edition, John Wiley & Sons, Inc., New York, 1996 (rather than sending the entire text, applicants refer to the remarks regarding this reference that are contained in the European Examination Report). https://archive.org/details/Applied_Cryptography_2nd_ed._B._Schneier.
Notification of Reason(s) for Refusal dated Apr. 11, 2011, in corresponding Japanese Application No. 2001-504945, filed Jun. 16, 2000, and English Translation, 6 pages.
Decision of Rejection dated Dec. 6, 2011, issued in Japanese Patent Application No. 2001-587188, filed May 25, 2001, with English translation 6 pages.

\* cited by examiner

600

Step 1 : Provide your information
Apply for a credit account

All fields marked with a star (*) must be completed so we can process your eCharge Net Account application. For an explanation of the required information, click on a specific link or Help.

Personal information
Name*   Initial   Last*
E-Mail Address*   Date of Birth* (mm/dd/yyyy)
Home Phone*   Daytime Phone

Current address
Address*
City*   [1]State*   Zip Code*
Home Ownership*   Time at this address*
years   months

Financial and employment information
Social Security Number*   Employment Status*
Time at Current Employment*   [2]Annual Household Income*
years   months

Making payments
You can pay for your credit account purchases from your checking or savings account.
Account Type*   ⦿ Checking   ○ Savings
ABA Routing Number*
Bank Account Number*

Special offers
⦿ Please send me notices about special offers from eCharge, online retailers who accept eCharge, and other companies.
○ Please send me special offer notices only from eCharge.
○ Please do not send me special offer notices from eCharge or any other company at this time.

CONTINUE   CANCEL

— 610

[1]Currently, eCharge is only available to U.S. residents, except residents of Alabama and Iowa, with a U.S. billing address. State Law Disclosures

[2]Alimony, child support, or separate maintenance income need not be revealed if you do not wish to have it considered as a basis for repaying this obligation.

Help | Security
Privacy | Terms and Conditions
© 2000 eCharge Corporation. All rights reserved.

Application Error

Create a Sub Account

You can create up to five secure Sub Accounts at no change, giving everyone in your family a separate account. Or set up Sub Accounts for specific types of purchases. Each Sub Account also offers parental controls, which let you set purchasing limits for the kids and restrict the web sites from which they can purchase.

For security reasons, each account holder is assigned a personal Digital ID and Pass-Phrase. As the primary eCharge Net Account holder, you're liable for all charges incurred by the Sub Account holders. If you need more than five Sub Accounts, you can create additional accounts for a small fee. For details, please contact Customer Support.

All fields marked with a star (*) must be completed before we can create your Sub Account.

Sub Account information

Type of Account*

⊙ Credit - This account allows you to shares the credit limit of your primary account.

⊙ Prepay - Purchases are automatically deducted from your pre-paid balance and you can add funds as often as you like to this Sub Account.

Account Holder First Name*

Account Holder Last Name*

Account*

E-Mail Address*

Set parental controls

Purchasing limits
To set purchasing limits for this Sub Account, fill in one or more of the following options.

Single Transaction $

Daily Total $

Monthly Total            (number of transactions)

Web site restrictions
To set purchasing limits on specific web sites, simply type in the monthly dollar amount for each Retail Category. You can also restrict the Retail Categories from which your children can make purchases by checking the categories you want to restrict.

| Retail Category | Monthly Limit ($) | Restrict |
|---|---|---|
| Cnet | $ | ☐ |
| DVD Express | $ | ☐ |
| MP3.com | $ | ☐ |

Special offers

⊙ Please send me notices about special offers from eCharge, online retailers who accept eCharge, and other companies.
⊙ Please send me special offer notices only from eCharge.
⊙ Please do not send me special offer notices from eCharge or any other company at this time.

PLEASE NOTE: These settings apply only to this Sub Account. You can change these settings at any time.

CONTINUE    CANCEL

Home | Help | Security | Log Out
Privacy | Terms and Conditions

© 2000 eCharge Corporation. All rights reserved.

NET ACCOUNT

*A DIGITAL CERTIFICATE COULD NOT BE FOUND ON YOUR COMPUTER. PLEASE ANSWER THE FOLLOWING QUESTIONS IN ORDER TO IDENTIFY YOURSELF FOR YOUR VIRTUAL PAYMENT ACCOUNT PURCHASE.*

MY EMAIL ADDRESS IS:

MY MONTHLY MORTGAGE PAYMENT IS:

MY NEIGHBOR'S NAME IS:

[ OK ]   [ CANCEL ]

Item Sales
11/01/1999 - 11/30/1999

| Item ID | Item Name | Quantity | % of Quantity | % of Total Sales | Total Sales |
|---|---|---|---|---|---|
| 103327 | MSFT FrontPage 98 Upgrade | 1 | 0.04 | 0.03 | 49.00 |
| 103370 | HP LaserJet Paper, 8.5"x11", ream | 6 | 0.24 | 0.03 | 47.94 |
| 103371 | Hammermill Laser Print Paper | 19 | 0.75 | 0.11 | 163.21 |
| 103376 | Hitachi Monitor MC6215 | 0 | 0.00 | 0.00 | 0.00 |
| 102521 | Pizza and Baking Stone, 14x16 | 3 | 0.12 | 0.05 | 78.00 |
| 103900 | Chrome Premium Belgian Waffle Iron, 2-c. | 1 | 0.04 | 0.03 | 49.95 |
| 103615 | Prankster's Red Hot Sauce, 5-oz. | 1 | 0.04 | 0.00 | 4.95 |
| 107734 | Blueberries n Cream Muffin Mix, 16-oz. | 1 | 0.04 | 0.00 | 3.95 |
| 107960 | Blue Oval Baking Dish, 14-in. | 5 | 0.20 | 0.12 | 177.50 |
| 111829 | Nonstick Cookware Set, 8-pc. | 2 | 0.08 | 0.27 | 399.90 |
| 112967 | Chocolate Raspberry Truffle Cake Baking Kit | 1 | 0.04 | 0.01 | 9.95 |
| 117410 | Smoky Chipotle Tomato Grilling Sauce, 12-oz. | 1 | 0.04 | 0.00 | 5.95 |
| 119349 | Corn Cheddar Cayenne Cheese Wafers, 8-oz. | 1 | 0.04 | 0.00 | 5.95 |
| 119821 | Hellfire & Damnation Hot Sauce, 5-oz. | 1 | 0.04 | 0.00 | 4.95 |
| 126349 | Nonstick Bakeware Set, 4-pc. | 1 | 0.04 | 0.04 | 59.95 |
| 127133 | Hi-Density Hard-Anodized Cookware Set, 7-pc. | 1 | 0.04 | 0.31 | 469.95 |
| 128127 | Red Chili Chipotle Cheddar Popcorn Seasoning, 5-oz. | 1 | 0.04 | 0.00 | 5.95 |
| 130385 | Bakeware Set for Kids, 5-pc. | 19 | 0.75 | 0.22 | 322.05 |
| 139633 | Wasabi Lime Mustard, 19-oz. | 1 | 0.04 | 0.00 | 2.95 |
| X-FILE-001 | Kron 7z | 0 | 0.00 | 0.00 | 0.00 |
| 20100 | Jimi Hendrix Interactive CD ROM | 2 | 0.08 | 0.03 | 49.90 |
| 20120 | Eric Clapton Interactive CD ROM | 6 | 0.24 | 0.10 | 149.70 |
| 20131 | Alanis Morissette Interactive CD ROM | 1 | 0.04 | 0.02 | 24.95 |
| 20170 | The Wallflowers Interactive CD ROM | 0 | 0.00 | 0.00 | 0.00 |
| 20180 | Classical Guitar Standards Volume 1 CD ROM | 1 | 0.04 | 0.02 | 24.95 |
| 20178 | Classical Guitar Standards Volume 2 CD ROM | 0 | 0.00 | 0.00 | 0.00 |
| 300-DA-001 | Rubbermaid Pencil Palace[tm] | 7 | 0.28 | 0.04 | 53.55 |
| 400-PA-001 | HP Laser Black Toner Cartridge | 772 | 30.50 | 25.76 | 38561.40 |
| 400-PC-03 | TEK Pentium 133 | 0 | 0.00 | 0.00 | 0.00 |
| AZ1000 | THIS IS the description for the second item | 133 | 5.25 | 58.75 | 87942.26 |
| CTV9321 | High-Back Executive Chairs with Arms | 0 | 0.00 | 0.00 | 0.00 |
| GAME-003 | Blast Em Game Software | 727 | 28.72 | 7.29 | 10905.00 |
| GAME-033 | Blast Em Game Software | 17 | 0.67 | 0.17 | 255.00 |
| RZ1000 | THIS IS product description | 19 | 0.75 | 1.42 | 2127.43 |
| T-Shirt-001 | T-Shirt of ClearCommerce Logo | 729 | 28.80 | 4.87 | 7292.62 |
| T-Shirt-001 | T-Shirt with the cool ClearCommerce Logo | 17 | 0.67 | 0.05 | 79.90 |
| abc | test item description | 24 | 0.95 | 0.16 | 240.00 |
| def | test item description | 6 | 0.24 | 0.02 | 24.00 |
| pokemon.fossel | Blast Em Game Software | 4 | 0.16 | 0.06 | 88.00 |
| Totals | | 2531 | 100.00 | 100.00 | 149680.71 |

METHOD AND APPARATUS FOR ORDERING GOODS, SERVICES AND CONTENT OVER AN INTERNETWORK USING A VIRTUAL PAYMENT ACCOUNT

CROSS-REFERENCES TO RELATED APPLICATIONS

This application is a continuation of U.S. patent application Ser. No. 11/775,473, filed Jul. 10, 2007 (now U.S. Pat. No. 9,864,989), which is a continuation of U.S. patent application Ser. No. 10/663,443, filed Sep. 16, 2003 (now U.S. Pat. No. 7,249,097), which is a continuation of U.S. patent application Ser. No. 10/338,133, filed Jan. 6, 2003, which is a continuation of U.S. patent application Ser. No. 09/578,395, filed May 25, 2000, which is a continuation-in-part of U.S. patent application Ser. No. 09/370,949, filed Aug. 9, 1999, priority from the filing date of which is hereby claimed under 35 U.S.C. § 120. U.S. patent application Ser. No. 09/370,949 also claims the benefit of provisional U.S. Patent Application No. 60/140,039, filed Jun. 18, 1999, the benefit of which is hereby claimed under 35 U.S.C. § 119. All of said applications are expressly incorporated herein by reference.

FIELD OF THE INVENTION

This invention generally relates to a method and apparatus for ordering goods, services and content from one or more other computers connected via common communications links and, more particularly, to a method and apparatus for ordering goods, services and content from computers connected to the Internet using a virtual payment account.

BACKGROUND OF THE INVENTION

Communication networks are well known in the computer communications field. By definition, a network is a group of computers and associated devices that are connected by communications facilities or links. Network communications can be of a permanent nature, such as via cables, or can be of a temporary nature, such as connections made through telephone or radio links. Networks may vary in size, from a local area network (LAN) consisting of a few computers or workstations and related devices; to a wide area network (WAN), which interconnects computers and LANs that are geographically dispersed; to a remote access service (RAS), which interconnects remote computers via temporary communication links. An internetwork, in turn, is the joining of multiple computer networks, both similar and dissimilar, by means of gateways or routers that facilitate data transfer and conversion from various networks. A well-known abbreviation for the term internetwork is "Internet." As currently understood, the capitalized term "Internet" refers to the collection of networks and routers that use the Transmission Control Protocol/Internet Protocol (TCP/IP) to communicate with one another.

A representative section of the Internet 40 is shown in FIG. 1 (Prior Art) in which a plurality of local area networks (LANs) 44 and a wide area network (WAN) 46 are interconnected by routers 42. The routers 42 are generally special purpose computers used to interface one LAN or WAN to another. Communication links within the LANs may be twisted wire pair, or coaxial cable, while communication links between networks may utilize 56 Kbps analog telephone lines, or 1 Mbps digital T-1 lines and/or 45 Mbps T-3 lines. Further, computers and other related electronic devices can be remotely connected to either the LANs 44 or the WAN 46 via a modem and temporary telephone link. Such computers and electronic devices 48 are shown in FIG. 1 as connected to one of the LANs 44 by a dotted line. It will be appreciated that the Internet comprises a vast number of such interconnected networks, computers and routers and that only a small, representative section of the Internet 40 is shown in FIG. 1.

The Internet has recently seen explosive growth by virtue of its ability to link computers located throughout the world. As the Internet has grown, so has the World Wide Web (WWW). The WWW is a vast collection of interconnected or "hypertext" documents (also known as "Web pages") written in HyperText Markup Language (HTML) that are electronically stored at "Web sites" throughout the Internet. A Web site is a server connected to the Internet that has mass storage facilities for storing hypertext documents and that runs administrative software for handling requests for those stored hypertext documents. A hypertext document normally includes a number of hyperlinks, i.e., highlighted portions of text that link the document to another hypertext document possibly stored at a Web site elsewhere on the Internet. Each hyperlink is associated with a Uniform Resource Locator (URL) that provides the exact location of the linked document on a server connected to the Internet. Thus, whenever a hypertext document is retrieved from any Web server, the document is considered to be retrieved from the WWW.

A user is allowed to retrieve hypertext documents from the WWW, i.e., a user is allowed to "surf the Web," via a Web browser. A Web browser, such as NETSCAPE NAVIGATOR® or MICROSOFT® Internet Explorer, is a software program implemented by a Web client, i.e., a user's computer, to provide a graphical user interface to the WWW. Upon request from the user via the Web browser, the Web client accesses and retrieves the desired hypertext document or Web page from the appropriate Web server using the URL for the document and a protocol known as HyperText Transfer Protocol (HTTP). HTTP is a higher-level protocol than TCP/IP and is designed specifically for the requirements of the WWW. It is used on top of TCP/IP to transfer hypertext documents between servers and clients.

At the advent of the WWW, the information stored on the Internet was freely transferred back and forth between those parties interested in the information. However, the WWW is quickly becoming a channel of commercial activity, whereby a vast number of companies have developed their own Web sites for advertising and selling their goods and services. Commercial activity that takes place by means of connected computers is known as electronic commerce, or e-commerce, and can occur between a buyer and a seller through an on-line information service, the Internet, a bulletin board system (BBS), or between buyer and seller computers through electronic data interchange (EDI). A buyer (also referred to as a user, consumer or purchaser in the context of e-commerce) may "visit the Web site" of a company or seller, i.e., retrieve the hypertext documents located on the Web server of a particular seller, and order any good or service that the seller has to offer. If that good or service is in the form of electronically stored information, such as a book, a video, a computer game, etc., the buyer may simply download the good or service from the company's Web site to his or her computer for immediate consumption and use. If the good or service is of a more tangible nature, such as an appliance or article of clothing ordered from an on-line catalog, a more conventional method of delivery, e.g., the postal service or a common carrier, is used.

A common method of payment for e-commerce purchases is electronic credit, or e-credit. E-credit is a form of electronic commerce often involving credit card transactions carried out over the Internet. Traditional e-credit purchases are paid for by a major credit card, wherein the buyer is required to transmit his or her credit information, for example, an account number and expiration date, over the Internet to the company's Web site. Many buyers are concerned about the security and confidentiality of such electronic transmissions. Furthermore, many buyers do not have a major credit card with which to make such purchases. Alternative billing systems, such as providing credit information by facsimile or postal service, are much less convenient and often prove enough of a barrier to prohibit the sale altogether. Finally, the traditional methods of billing and payment do not adequately protect the seller or buyer from fraudulent purchases.

Accordingly, a more effective method and apparatus for ordering and billing for goods, services and content over a network, and ultimately the Internet, is needed. The method and apparatus should protect the seller and buyer from fraudulent purchases. Additionally, the method and apparatus should provide an element of non-repudiation to all transactions. The method and apparatus should also prevent buyers with histories of nonpayment from purchasing additional goods, services and/or content. Finally, the method and apparatus should allow a buyer without a major credit card to purchase goods, services and content over the network.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention provides a computer program for ordering products from computers connected to the Internet, wherein the buyer is automatically billed for the ordered good, service or content based on a virtual payment account maintained by a commerce gateway.

In accordance with other aspects of the present invention, a commerce gateway interfaces with a credit processing server to handle the monetary aspects involved in purchasing goods, services and/or content. The credit processing server interfaces with one or more financial institutions that physically handle the buyer's account. For example, a buyer can pay for purchases electronically by transferring funds from a bank account held by the buyer at a financial institution, or by prepaying for the purchases by sending a check to the provider of the commerce gateway. Alternatively, reward points earned by using the virtual payment account can be applied towards purchases.

In accordance with still other aspects of the present invention, the credit processing server or commerce gateway communicates with one or more identity bureaus in order to determine a buyer's identity before creating a virtual payment account.

In accordance with still other aspects of the present invention, the credit processing server communicates with one or more credit bureaus in order to determine a credit limit for a buyer's virtual payment account.

In accordance with yet other aspects of the present invention, a virtual payment account can have associated sub-accounts. A sub-account can have a credit limit that is less than the main account credit limit. A sub-account can limit the seller sites from which goods, services and/or content can be purchased.

In accordance with further aspects of the present invention, purchases must be made by a registered buyer from a registered seller. Security is ensured via authentication of the parties to a transaction. Authentication can be performed by verification of a digital certificate, or a digital signature, or by alternate authentication methods.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 8A-8G are exemplary Web pages displayed on a buyer's computer when applying for a virtual payment account in accordance with the present invention;

FIGS. 9A-9C are exemplary Web pages used by a buyer to customize the virtual payment account applied for in accordance with the present invention;

FIG. 30 is an exemplary Web page showing an alternate authentication dialog;

FIGS. 31-41 are exemplary Web pages used by a seller to view transactions, status of payments and reports;

DETAILED DESCRIPTION OF THE PREFERRED EMBODIMENTS

Figure 1:
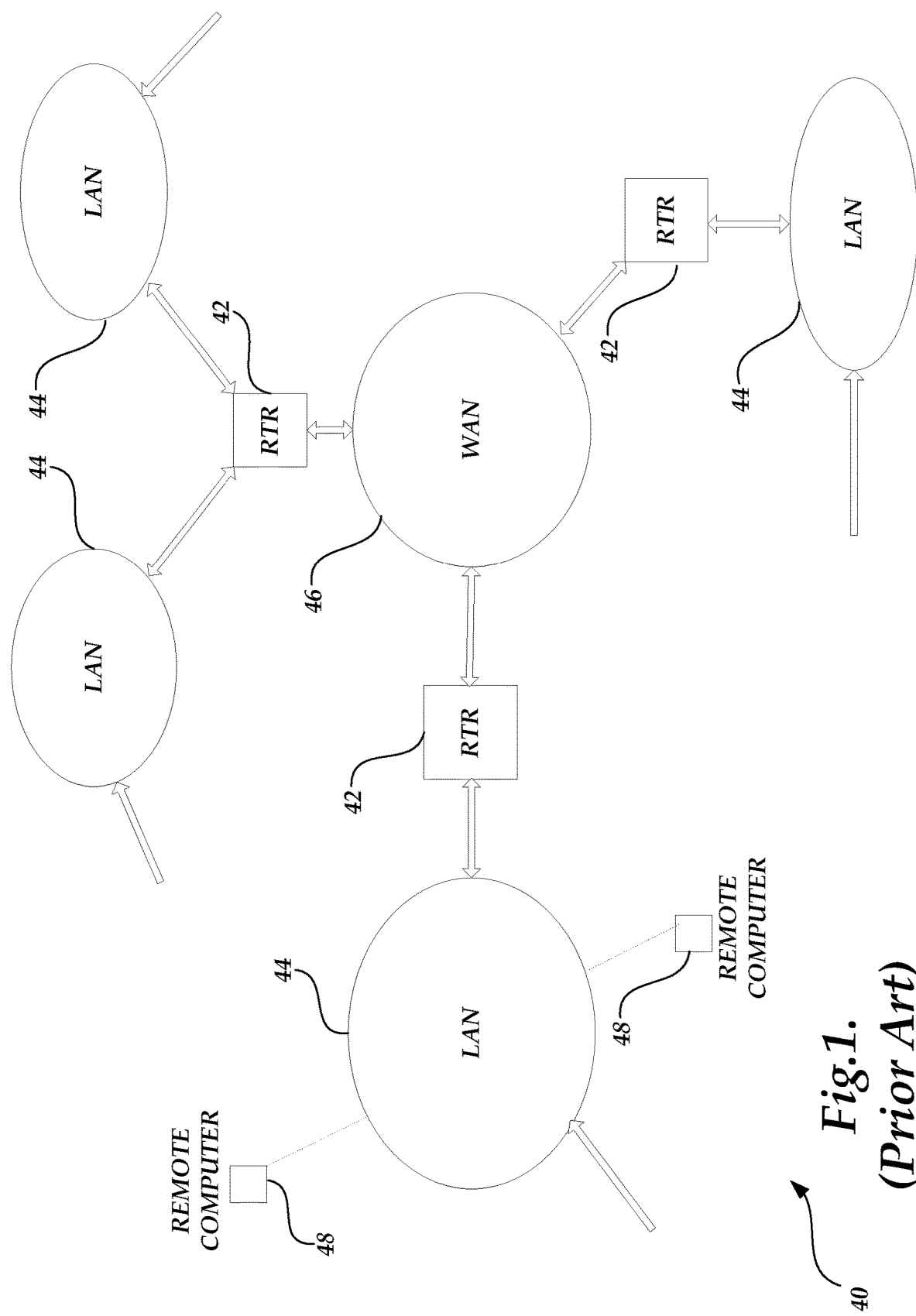
FIG. 1 (Prior Art) is a block diagram of a representative portion of the Internet.

As previously described and shown in FIG. 1, the Internet 40 is a collection of local area networks (LANs) 44, wide area networks (WANs) 46, remote computers 48 and routers 42 that use the Transmission Control Protocol/Internet Protocol (TCP/IP) to communicate with each other. The World Wide Web (WWW), on the other hand, is a vast collection of interconnected, electronically stored information located on servers connected throughout the Internet 40. Many companies are now selling goods, services and access to their premium content over the Internet using the WWW. In accordance with the present invention, a buyer orders goods, services and/or content (referred to interchangeably herein as "products") over the Internet 40 via a Web browser and is automatically billed for the purchase using his or her virtual payment account without transferring sensitive account information, such as account number and expiration date, over the Internet 40. The virtual payment account allows a buyer to settle transactions of the virtual payment account using a prepaid or credit account. In one actual embodiment of the present invention, the virtual payment account uses bank electronic funds transfers, for example, using the Automated Clearing House (ACH) standard, which is maintained by the National Automated Clearing House Association (NACHA)—the standards group promoting electronic commerce standards. In another embodiment, the virtual payment account can be funded using a traditional paper check, with the buyer mailing a check, e.g., via the postal service, to the providers of the virtual payment account system. Alternatively, funds transfer services and electronic bill payment services, such as CHECKFREE®, may be used. Reward points earned through use of the virtual payment account can also be applied to the buyer's virtual payment account to pay for products.

Figure 2:
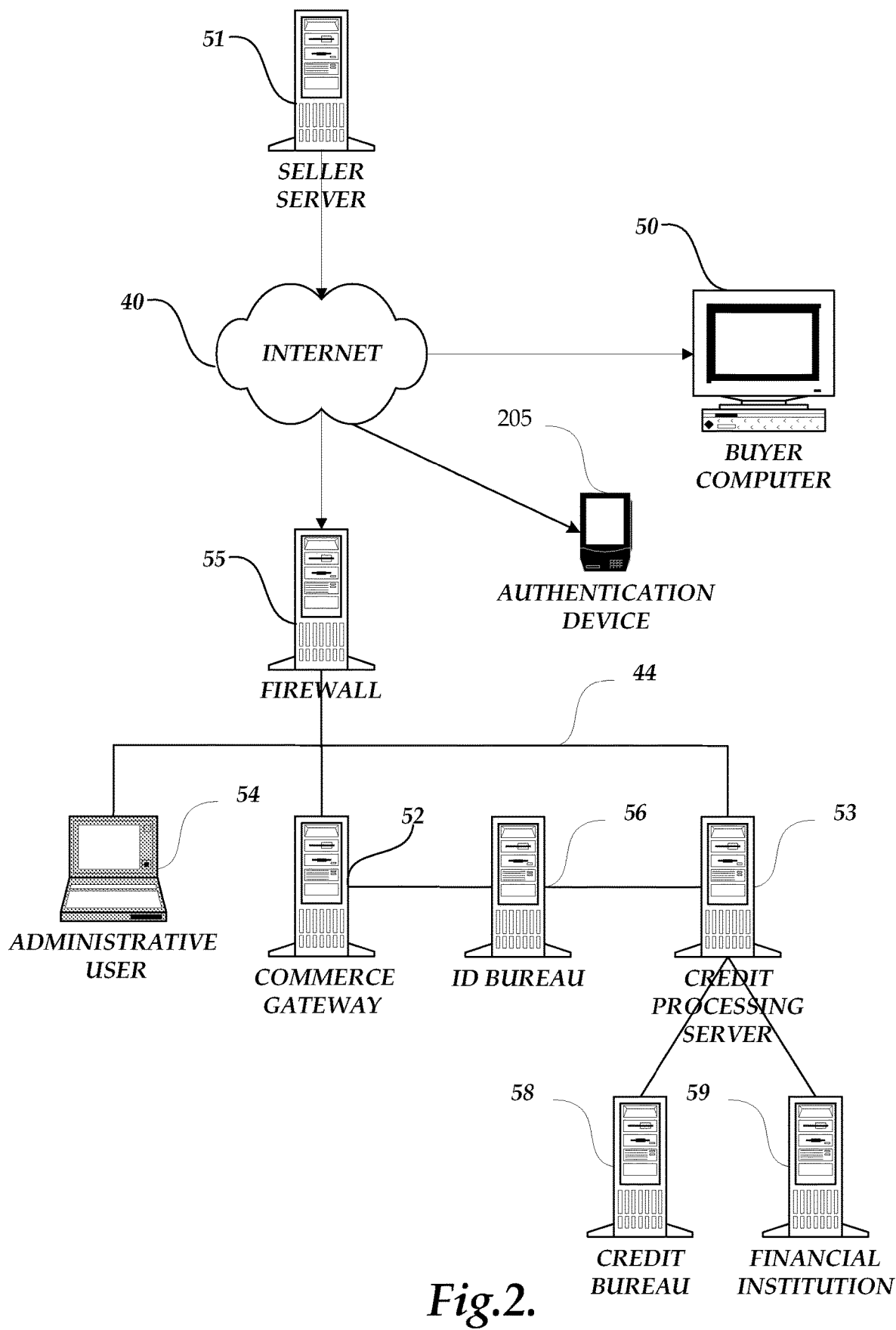
FIG. 2 is a pictorial diagram of a local area network (LAN) connected to the Internet which supplies goods, services and/or content ordered by a buyer using a computer located elsewhere on the Internet in accordance with the present invention.

More specifically, as shown in FIG. 2, the buyer purchases goods, services, and/or premium content from a seller server 51, i.e., a computer owned by the seller that sponsors or sells the product, by placing an order with the seller server from a computer 50 connected to the Internet 40. The order is processed and confirmed by a commerce gateway 52 connected to a LAN 44 located elsewhere in the Internet 40. The commerce gateway 52 is also connected to a credit processing server 53 via the LAN 44. The credit processing server 53 communicates with one or more identity bureaus 56 to verify the identity of the buyer. After verifying the identity of the buyer the credit processing server 53 communicates with one or more credit bureaus 58 in order to determine the credit worthiness of a buyer.

In one actual embodiment of the present invention described herein, the identity bureau 56 is a server provided and maintained by an agency for verifying the identity of the buyer and the credit bureau 58 is a server provided and administrated by a credit agency for processing credit reports for buyers. The identity bureau 56 and credit bureau 58 can be located on the LAN 44 or elsewhere on the Internet 40.

In yet another embodiment, the credit processing server can establish a point-to-point connection with a remote identity bureau or credit bureau that is not connected to either the LAN 44 nor the Internet 40. It will be appreciated that other methods of communication between the credit processing server 53 and identity bureau 56 or credit bureau 58 may be used, for example, a secure Virtual Private Network (VPN) maintained and operated by the identity bureau or credit bureau exclusively for the purpose of identity checking or credit rating, respectively.

Finally, in yet other embodiments, the identity and credit bureaus may not actually offer a server at all. Rather, a customer service representative for the identity or credit bureaus may process the identity or credit report and manually provide the report to an administrator of the present invention who manually enters the report to the credit processing server 53.

The credit processing server 53 also communicates with one or more financial institutions 59 for the purpose of obtaining the buyer's payment, i.e., a transfer of funds for the purchase of products. As is the case with the identity and credit bureaus 58, the financial institutions 59 may be other servers in electronic communication with the credit processing server 53, customer service representatives in more traditional communication with the credit processing server 53, or some combination thereof.

Finally, in addition to the commerce gateway 52, the LAN 44 includes an administrative computer 54 used to administer buyer and seller information and services provided by the commerce gateway 52 and credit processing server 53.

In the exemplary embodiment of the present invention shown in FIG. 2, the LAN 44 is insulated from the Internet 40 by a firewall 55 that tracks and controls the flow of all data passing through it. The firewall 55 protects the LAN 44 from malicious in-bound data traffic. The LAN 44 is a bus network interconnecting the various computers and servers. The LAN 44 shown in FIG. 2 can be formed of various coupling media such as glass or plastic fiberoptics cables, coaxial cables, twisted wire pair cables, ribbon cables, etc. In addition, one of ordinary skill in the art will appreciate that the coupling medium can also include a radio frequency coupling media or other intangible coupling media. Any computer system or number of computer systems, including but not limited to workstations, personal computers, laptop computers, personal data assistants, servers, remote computers, etc., that is equipped with the necessary interface hardware may be connected temporarily or permanently to the LAN 44, and thus, the Internet 40. However, if temporarily connected via a telephone link to another device connected to the LAN 44, the interface hardware of both the remote computer 48 and the device to which it is connected must contain a modem.

Also shown in FIG. 2 is an exemplary authentication device 205 whose purpose will be described in more detail below. In one embodiment of the current invention, the authentication device may be a personal data assistant (PDA) with a wireless modem. However, those of ordinary skill in the art will appreciate that the authentication device may be a laptop computer, a cellular telephone, a pager or any device capable of receiving a remote message.

Finally, those of ordinary skill in the art will recognize that while only one buyer computer 50, and one seller server 51 are depicted in FIG. 2, numerous buyer computers and seller servers equipped with the hardware and software components described below may be connected to the Internet 40. It will also be appreciated that the term "buyer" used herein can be applied to any purchaser of goods and/or services and can be applied equally to an individual, non-commercial purchaser, a business or a commercial purchaser. In other words, the term "buyer" can apply to any purchaser and the term "seller" can apply to any vendor or merchant, be they on individual, non-commercial seller, a business or a commercial seller.

Figure 3:
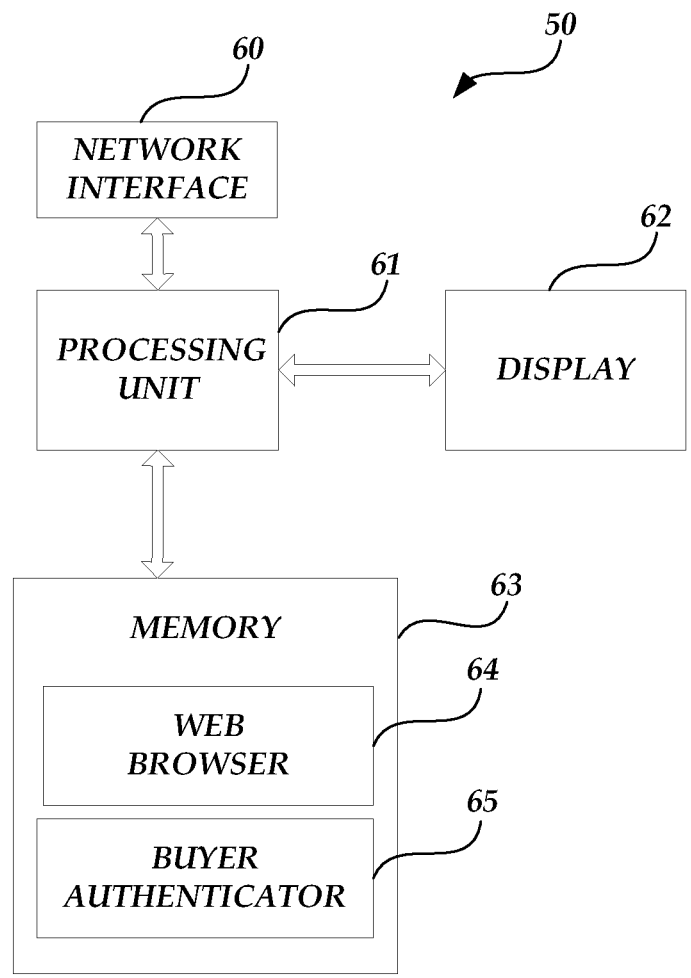
FIG. 3 is a block diagram of the several components of the buyer's computer shown in FIG. 2 that is used to order goods, services and/or content from the Internet in accordance with the present invention.

Relevant Buyer Computer, Seller Server, Commerce Gateway, and Credit Processing Server Components FIG. 3 depicts several of the important components of the buyer's computer 50. Those of ordinary skill in the art will appreciate that the buyer's computer 50 could be any computer used by the buyer to utilize the buyer's virtual payment account. Additionally, those of ordinary skill in the art will appreciate that the buyer's computer 50 may include many more components then those shown in FIG. 3. However, it is not necessary that all of these generally conventional components be shown in order to disclose an illustrative embodiment for practicing the present invention. As shown in FIG. 3, the buyer's computer includes a network interface 60 for connecting to a LAN 44 or WAN 46, or for connecting remotely to a LAN or WAN. Those of ordinary skill in the art will appreciate that the network interface 60 includes the necessary circuitry for such a connection, and is also constructed for use with the TCP/IP protocol, the particular network configuration of the LAN or WAN it is connecting to, and a particular type of coupling medium.

The buyer's computer 50 also includes a processing unit 61, a display 62 and a memory 63. The memory 63 generally comprises a random access memory (RAM), a read-only memory (ROM) and a permanent mass storage device, such as a disk drive. The memory 63 stores the program code and data necessary for ordering and paying for a product over the Internet 40 in accordance with the present invention. More specifically, the memory 63 stores a Web browser component 64, such as NETSCAPE NAVIGATOR® or MICROSOFT® Internet Explorer, and a buyer authenticator component 65 formed in accordance with the present invention for authenticating a buyer as a registered participant of the virtual payment system prior to performing any virtual payment account transactions. It will be appreciated that these components may be stored on a computer-readable medium and loaded into memory 63 of the buyer computer 50 using a drive mechanism associated with the computer-readable medium, such as a floppy or DVD/CD-ROM drive.

Figure 4:
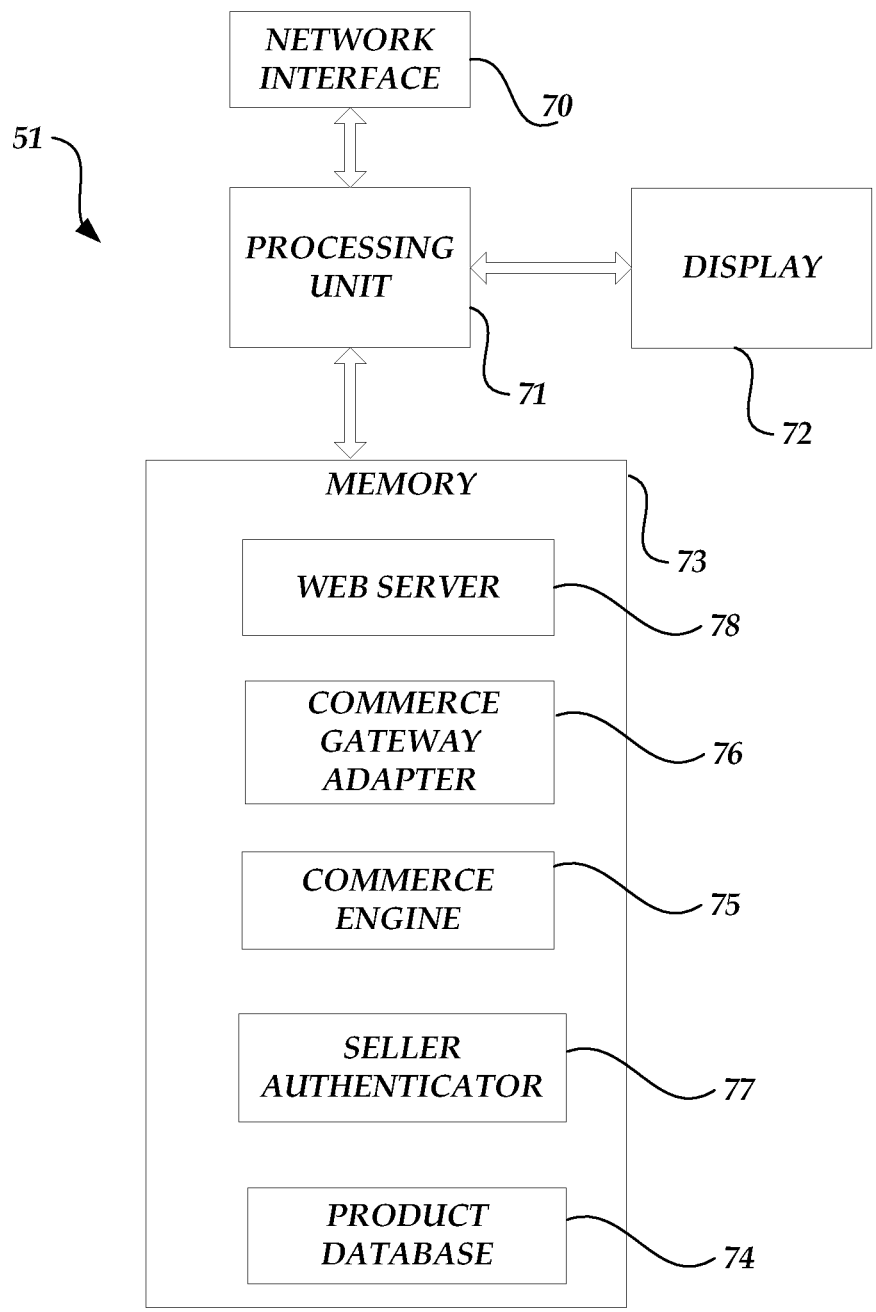
FIG. 4 is a block diagram of the several components of a seller server shown in FIG. 2 that provides the ordered goods, services and/or content in accordance with the present invention.

As will be described in more detail below, the products ordered by the buyer are supplied by a seller server 51, described next, following authorization from a remote server, i.e., a commerce gateway 52 described later, located elsewhere on the Internet, e.g., on LAN 44 illustrated in FIG. 2. FIG. 4 depicts several of the important components of the seller server 51. Those of ordinary skill in the art will appreciate that the seller server 51 includes many more components than those shown in FIG. 4. However, it is not necessary that all of these generally conventional components be shown in order to disclose an illustrative embodiment of practicing the present invention. As shown in FIG. 4, the seller server 51 includes a network interface 70 for connecting to a LAN 44 or WAN 46, or for connecting remotely to a LAN or WAN. Those of ordinary skill in the art will appreciate that the network interface 70 includes the necessary circuitry for such a connection, and is also constructed for use with the TCP/IP protocol, the particular network configuration of the LAN or WAN it is connecting to, and a particular type of coupling medium.

The seller server 51 also includes a processing unit 71, a display 72 and a memory 73. The memory 73 generally comprises a random access memory (RAM), read-only memory (ROM), and a permanent mass storage device, such as a hard disk drive, tape drive, optical drive, floppy disk drive, or combination thereof. In one actual embodiment of the present invention, the memory contains a product database 74 that includes the electronically stored good or service ordered by the buyer. In other embodiments of the present invention, the product database 74 stores the premium content ordered by the buyer, i.e., the hypertext documents or other electronically stored information considered of monetary value by the seller. In yet other embodiments of the present invention, the goods may be tangible goods not capable of being electronically stored, in which case the product database includes descriptive information of the products.

The memory 73 also contains a commerce engine component 75 for purchasing a product from a seller Web site. The commerce engine component 75 may be an existing commerce engine, such as MICROSOFT® Site Server, which allows for the payment of products ordered over the Internet using a major credit card, e.g., VISA® or MAS- TERCARD®. A commerce gateway adapter component 76 is also provided to allow the commerce engine component 75 to interface with the commerce gateway 52. The commerce gateway adapter component uses and provides application programming interface (API) calls to interface with the commerce engine 75. Also included in memory is a seller authenticator component 77 for verifying that the seller is an authorized or registered seller of the virtual payment system of the present invention. It will be appreciated that the product database 74, the commerce engine component 75, the commerce gateway adapter component 76 and the seller authenticator component 77 may be stored on a computer-readable medium and loaded into memory 73 of the seller server 51 using a drive mechanism associated with the computer-readable medium, such as a floppy or CD-ROM drive. Finally, memory 73 stores a Web server component 78 for handling requests for stored information received via the Internet and the WWW.

Figure 5:
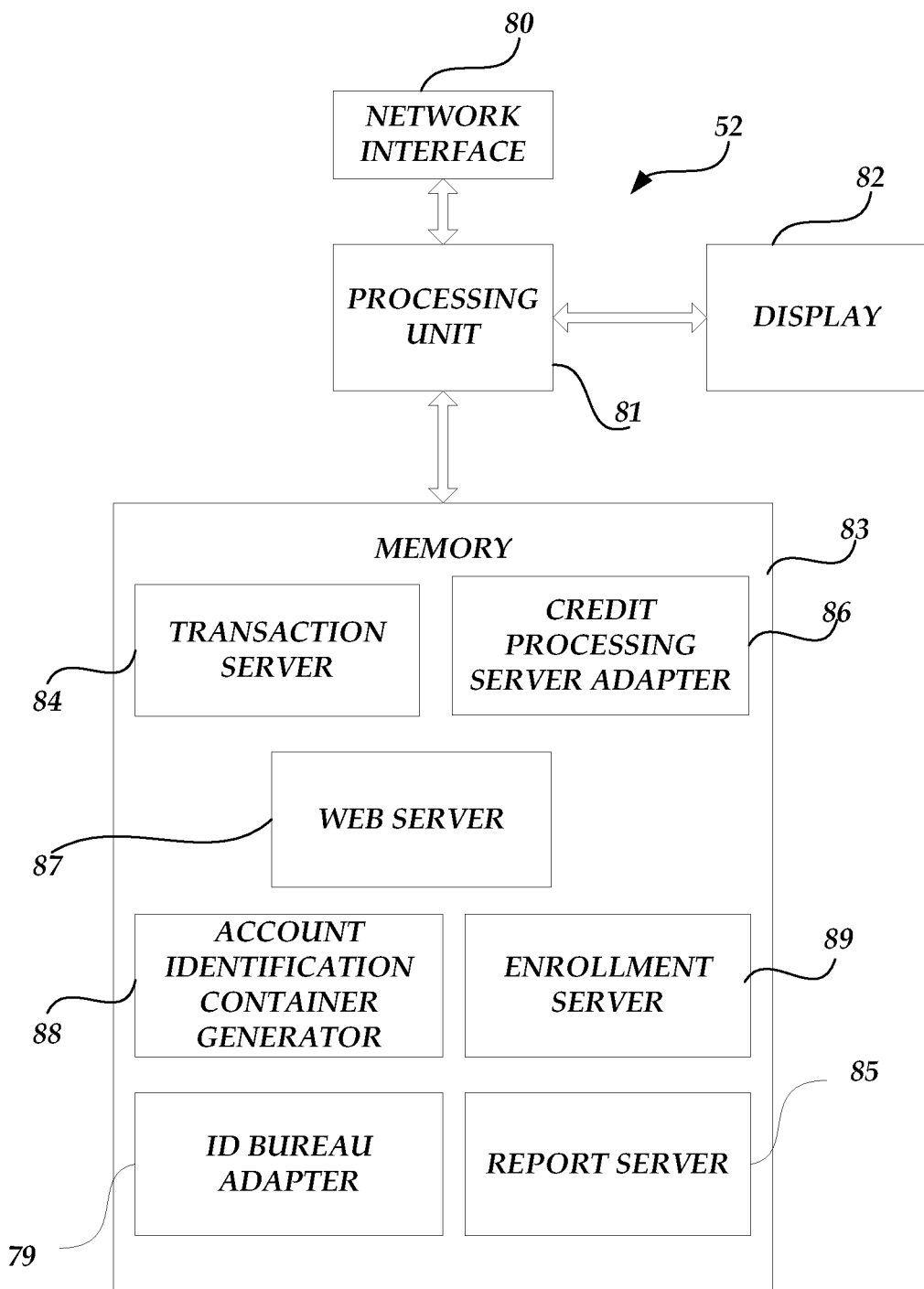
FIG. 5 is a block diagram of the several components of a commerce gateway shown in FIG. 2 that is used to interface between the Internet and a credit processing server in accordance with the present invention.

FIG. 5 depicts several of the important components of the commerce gateway 52. Those of ordinary skill in the art will appreciate that the commerce gateway 52 includes many more components than those shown in FIG. 5. However, it is not necessary that all of these generally conventional components be shown in order to disclose an illustrative embodiment for practicing the present invention. As shown in FIG. 5, the commerce gateway 52 is connected to the LAN 44 via a network interface 80. Those of ordinary skill in the art will appreciate that the network interface 80 includes the necessary circuitry for connecting the commerce gateway 52 to the LAN 44 and the firewall 55, and is constructed for use with the TCP/IP protocol, the particular network configuration of the LAN 44, and the particular type of coupling medium.

The commerce gateway 52 also includes a processing unit 81, a display 82 and a memory 83. The memory 83 generally comprises a random access memory (RAM), a read-only memory (ROM), and a permanent mass storage device, such as a hard disk drive, tape drive, optical drive, floppy disk drive, or combination thereof. The memory 83 stores the program code and data necessary for authorizing a seller server 51 to supply products to buyers and obtaining payment for the products via a credit processing server 53 in accordance with the present invention. More specifically, the memory 83 stores a transaction server component 84 formed in accordance with the present invention for authorizing a seller to supply the ordered product and obtaining payment for the ordered product from the credit processing server 53. Memory 83 also contains an identity bureau adapter 79 formed in accordance with the present invention for verifying a buyer or seller's identity. Also stored in memory 83 is an enrollment server component 89 formed in accordance with the present invention for determining the credit worthiness of an applicant. An account identification container generator component 88 is also stored in memory 83 for determining an internal account identification. A report server 85 is also stored in memory 83 for processing request for reports and consolidating information for requested reports. Also stored in the memory 83 is a credit processing server adapter component 86 for communicating with a credit processing server 53 described below. It will be appreciated that the transaction server component 84, the credit processing server adapter component 86, the account identification container generator component 88, and the enrollment server component 89 may be stored on a computer-readable medium and loaded into memory 83 of the commerce gateway 52 using a drive mechanism associated with the computer-readable medium, such as floppy or CD-ROM drive. The memory 83 also stores a Web server component 87 for handling requests for stored information received via the Internet 40 and the WWW.

Figure 6:
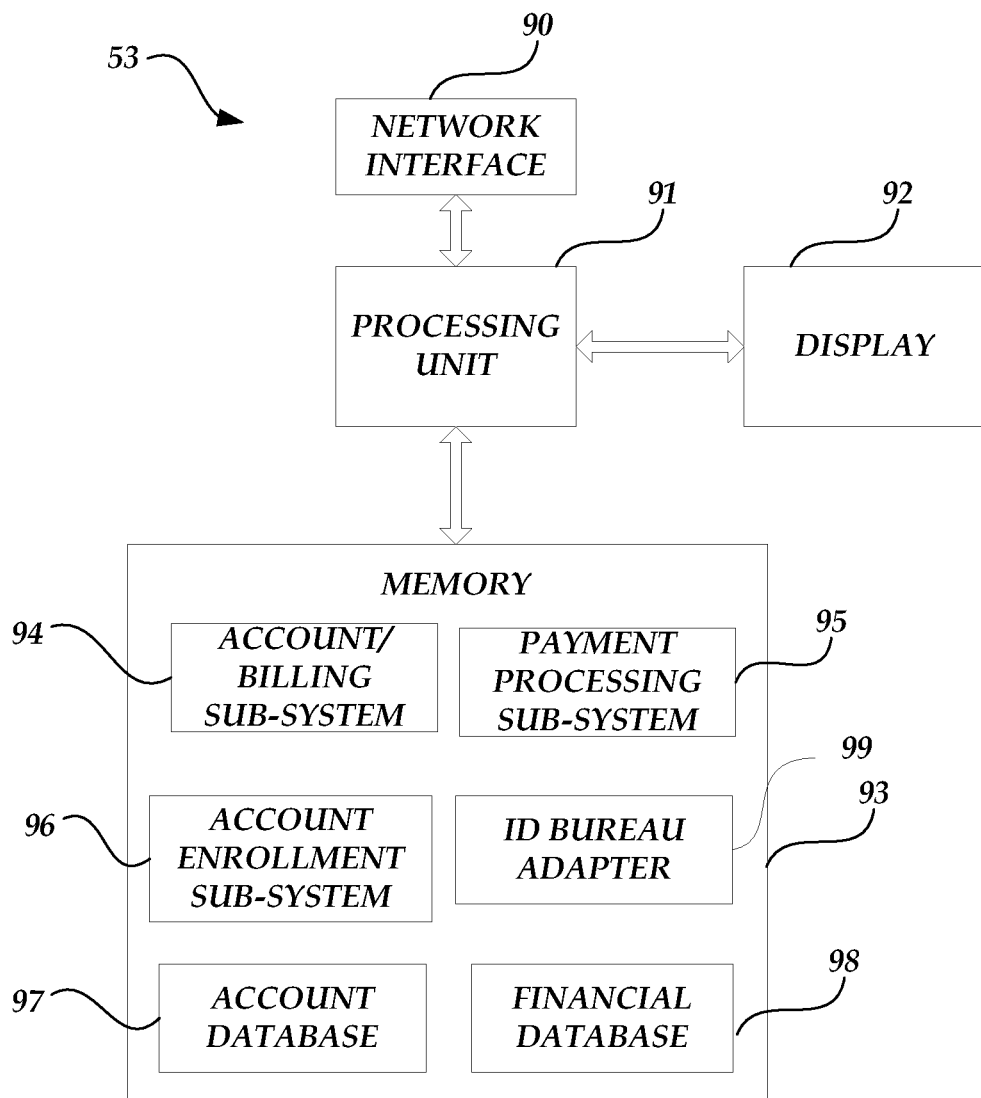
FIG. 6 is a block diagram of the several components of a credit processing server shown in FIG. 2 that provides for the payment of the ordered goods, services and/or content in accordance with the present invention.

FIG. 6 depicts several of the important components of the credit processing server 53. Those of ordinary skill in the art will appreciate that the credit processing server 53 includes many more components than those shown in FIG. 6. However, it is not necessary that all of these generally conventional components be shown in order to disclose an illustrative embodiment for practicing the present invention. As shown in FIG. 6, the credit processing server 53 is connected to the LAN 44 via a network interface 90. Those of ordinary skill in the art will appreciate that the network interface 90 includes the necessary circuitry for connecting the credit processing server 53 to the LAN 44 and the firewall 55, and is constructed for use with the TCP/IP protocol, the particular network configuration of the LAN 44, and the particular type of coupling medium.

The credit processing server 53 also includes a processing unit 91, a display 92 and a memory 93. The memory 93 generally comprises a random access memory (RAM), a read-only memory (ROM), and a permanent mass storage device, such as a hard disk drive, tape drive, optical drive, floppy disk drive, or combination thereof. The memory 93 stores the program code and data necessary for authorizing and securing payment for products purchased using a virtual payment account in accordance with the present invention. More specifically, the memory 93 of the credit processing server stores credit processing sub-systems including: an account/billing sub-system 94 for billing a buyer for products purchased using a virtual payment account; a payment processing sub-system 95 for communicating with a financial institution 59 in order to process payments received for purchases made using a virtual payment account; and an account enrollment sub-system 96 for determining the credit limit for an applicant as determined by information received from one or more credit bureaus 58.

Also stored in memory 93 are an account database 97 and a financial database 98 used to store data required for the account/billing sub-system 94, the payment processing sub-system 95, identity bureau adapter 99 and the account enrollment sub-system 96 to perform their required functions. It will be appreciated that the account/billing sub-system 94, the payment processing sub-system 95, the account enrollment sub-system 96, the account database 97, identity bureau adapter 99 and the financial database 98 may be stored on a computer-readable medium and loaded into memory 93 of the credit processing system using a drive mechanism associated with the computer-readable medium, such as floppy or DVD/CD-ROM drive. It will also be appreciated that the account/billing sub-system 94, the payment processing sub-system 95, and the account enrollment sub-system 96 can comprise, either in full or in part, existing, traditional credit card payment systems.

FIGS. 3-6 depict important components of the buyer computer 50, seller server 51, commerce gateway 52 and credit processing server 53 shown in FIG. 2 of one embodiment of the present invention. It will be appreciated that many other implementations and variations are possible. For example, one or more of the credit processing sub-systems 94, 95, 96 could be included in the commerce gateway 52 instead of in the credit processing server 53. Alternatively, each of the credit processing sub-systems 94, 95, 96 of the credit processing server could be in a separate server. Further, additional commerce gateways 52 and credit processing servers 53 may be located on the LAN 44 or elsewhere on the Internet 40.

Applying for a Virtual Payment Account

Figure 7:
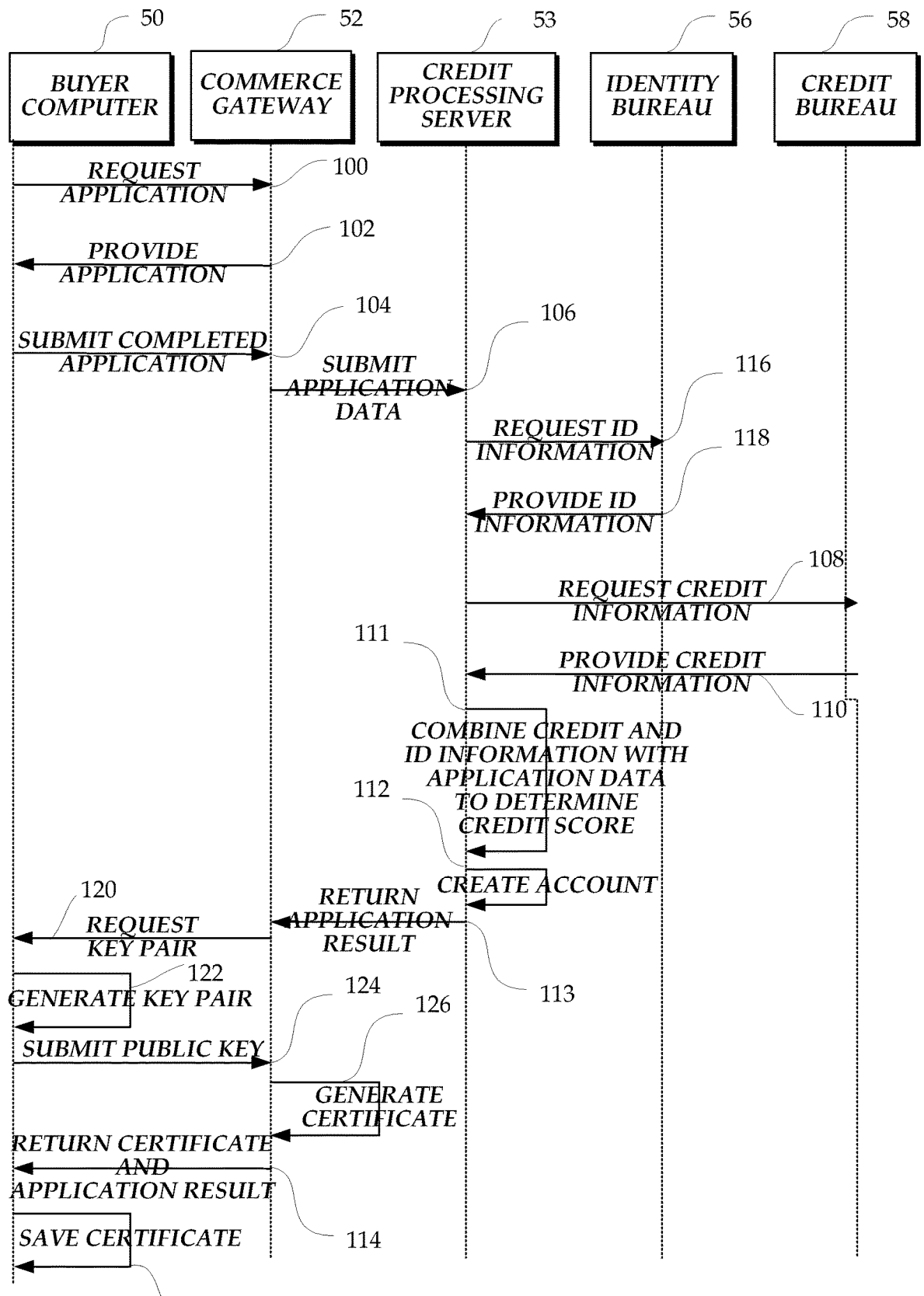
FIG. 7 is a diagram illustrating the actions taken by a buyer's computer, the commerce gateway, the credit processing server, an identity bureau and a credit bureau to create a virtual payment account for a buyer.

Once a VPA is set up, the virtual payment system of the present invention is a closed system that provides buyers a secure method for purchasing products over the Internet. The closed system includes only a registered buyer's computer 50, a registered seller server 51, the commerce gateway 52 (administered by the provider of the virtual payment system) and the credit processing server 53 (which can also be administered by the provider of the virtual payment system). Since the account information necessary for charging the buyer for the purchase is already in the possession of the commerce gateway 52 and the credit processing server 53, the closed system of the present invention allows registered buyers to purchase products from registered sellers without transferring sensitive account information to the sellers over the Internet. In order to become a member of the virtual payment system of the present invention, a buyer becomes a registered user by obtaining a virtual payment account. FIG. 7 illustrates the actions taken by the buyer's computer 50, the commerce gateway 52, the credit processing system 53, and the credit bureau 58 to create a virtual payment account for a buyer. The interactions of the various components are illustrated and described in detail later for various transactions performed by the present invention with reference to the diagrams shown in FIGS. 12, 27 and 42. As shown in FIG. 7, the process of applying for a virtual payment account is initiated when a buyer requests 100 an application form via the Internet using the Web browser 64 installed on the buyer's computer 50. The buyer may apply for a virtual payment account directly from a virtual payment account Web site located at the commerce gateway 52 or indirectly from a registered seller site located at the seller server 51. Once the request 100 for the application form is received by the commerce gateway 52, the commerce gateway 52 provides buyer computer 50 the application form 102 so that the buyer can complete the form displayed in the Web browser 64 of the buyer computer 50.

Upon completion of the application form, the buyer computer 50 submits the completed application form 104 to the commerce gateway 52. The commerce gateway 52 then submits the application data 106 from the completed form to the credit processing server 53 for account and credit limit authorization. The credit processing server 53 verifies the application data by requesting identity information 116 from an identity bureau 56. The identity bureau provides the requested identity information 118 and if the provided identity information corresponds to the application data then the credit processing server 53 requests credit information 108 about the buyer from a credit bureau 58. However, in one actual embodiment of the present invention, if the application data does not conform to the identity information from the identity bureau 56, then no virtual payment account is created and the application is forwarded to customer service for review for possible fraud detection. As noted above, in the actual embodiment of the present invention, the identity bureau 56 is a server provided and maintained by a agency for verifying identity and the credit bureau 58 is a server provided and administrated by a credit agency for processing credit reports. Hence, the credit processing server 53 requests the desired identity and credit information electronically, e.g., via appropriate database queries, etc., from the identity bureau 56 and credit bureau 58.

Returning to the illustrated embodiment, the credit bureau 58 provides the requested credit information 110 to the credit processing server 53 via the connection with the credit processing server 53. The credit processing server 53 then evaluates the application, identity and credit information by combining the identity information from the identity bureau and the credit information received from the credit bureau 58 with application data in order to determine a credit score 111. If the score exceeds a certain threshold, a credit limit is set and the virtual payment account is created 112. If the score falls below the threshold, a virtual payment account may still be created 112, however, all purchases must be prepaid, and the account information is forwarded to a customer service representative for review for a possible later grant of credit.

Once the virtual payment account is created, the credit processing server 53 returns the result of the evaluation 113, e.g., approval/denial, prepaid account only, credit limit, etc., to the commerce gateway 52. The commerce gateway then requests 120 that the buyer authenticator 65 on the buyer computer generate a public key encryption key pair 122 comprising a secret key and a public key. The buyer authenticator 65 then submits the public key to the commerce gateway 124. The commerce gateway 52 digitally signs the public key to generate a digital certificate 126. As will be appreciated by those of ordinary skill in the art, a digital certificate comprises a public key digitally signed by a trustworthy entity. The commerce gateway 52 sends the digital certificate and an application result page 114 to the buyer computer 50 for display via the buyer computer's Web browser 64. Finally, the buyer computer stores the digital certificate 128 for use later with the virtual payment account.

It will be appreciated that the digital certificate may be stored in the memory 63 of the buyer computer 50, or on some form of device capable of interfacing with the buyer computer such as but not limited to a secure token, smart card or as an encrypted file on some other computer readable medium. It will be appreciated by those of ordinary skill in the art that the order of the operations in FIG. 7 may be altered without substantially affecting the operation of the present invention. For example, the buyer may be notified of the application results before generating the public key encryption pairs.

FIGS. 8A-8G are exemplary Web pages provided to the buyer by the Web browser 64 of the buyer computer 50 in connection with applying for a virtual payment account as described above. Using the Web page 600 shown in FIG. 8A, the buyer selects the type of virtual payment account they desire to apply for, e.g., credit or prepaid, and submits the information by clicking "continue." Next, the Web pages 605, 610 and 615 shown in FIGS. 8B-8D for the application form are displayed to the buyer via the Web browser 64. In one actual embodiment of the present invention, the buyer fills out the application form with the appropriate application data on-line. Alternatively, the buyer can request the application on a printed form and submit the printed form via facsimile or regular mail, in which case a customer service representative will enter the information into the account database 97 of the credit processing server 53 via the administrative user computer 54. The application data includes information such as social security number and income that will be used to determine a credit limit for the buyer. Information entered by the buyer in the application form is also used for demographic purposes. For example, banner advertisements can be displayed via the Web browser 64 on the buyer computer 50 and can be targeted to the buyer based on demographic information, such as the buyer's age and geographic location.

Figure 8A:
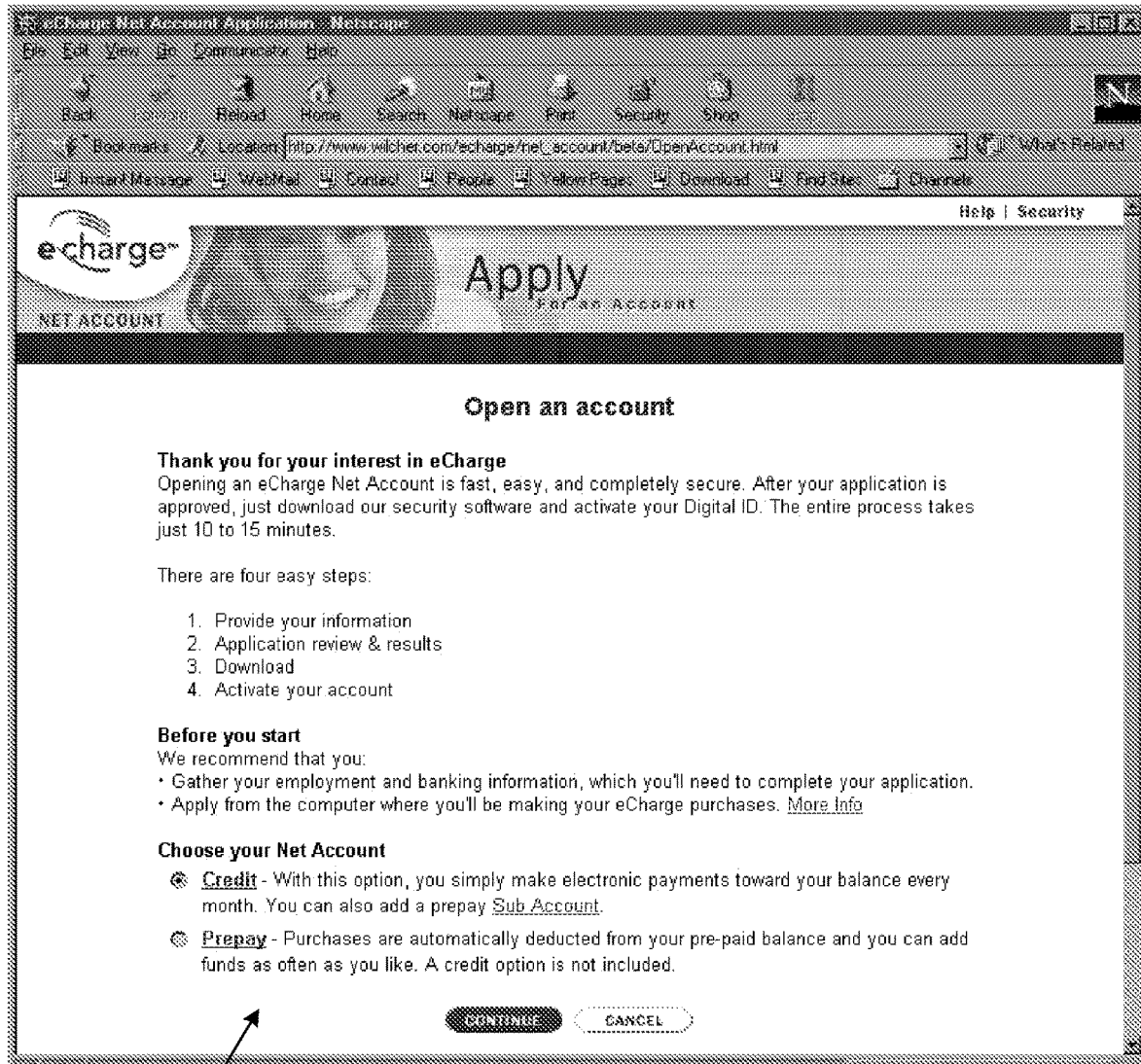
Figure 8B:
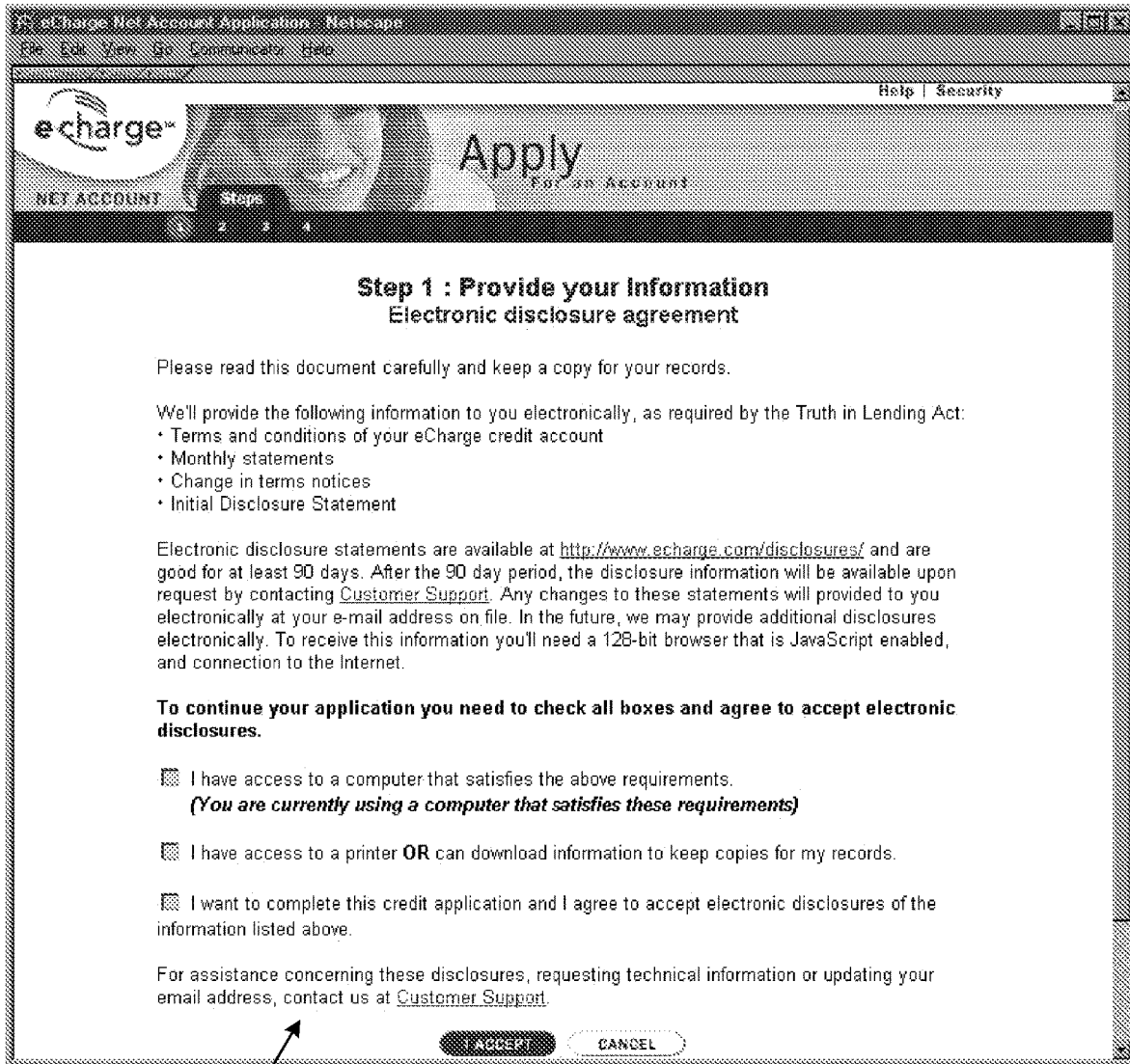
Figure 8D:
Figure 8E:
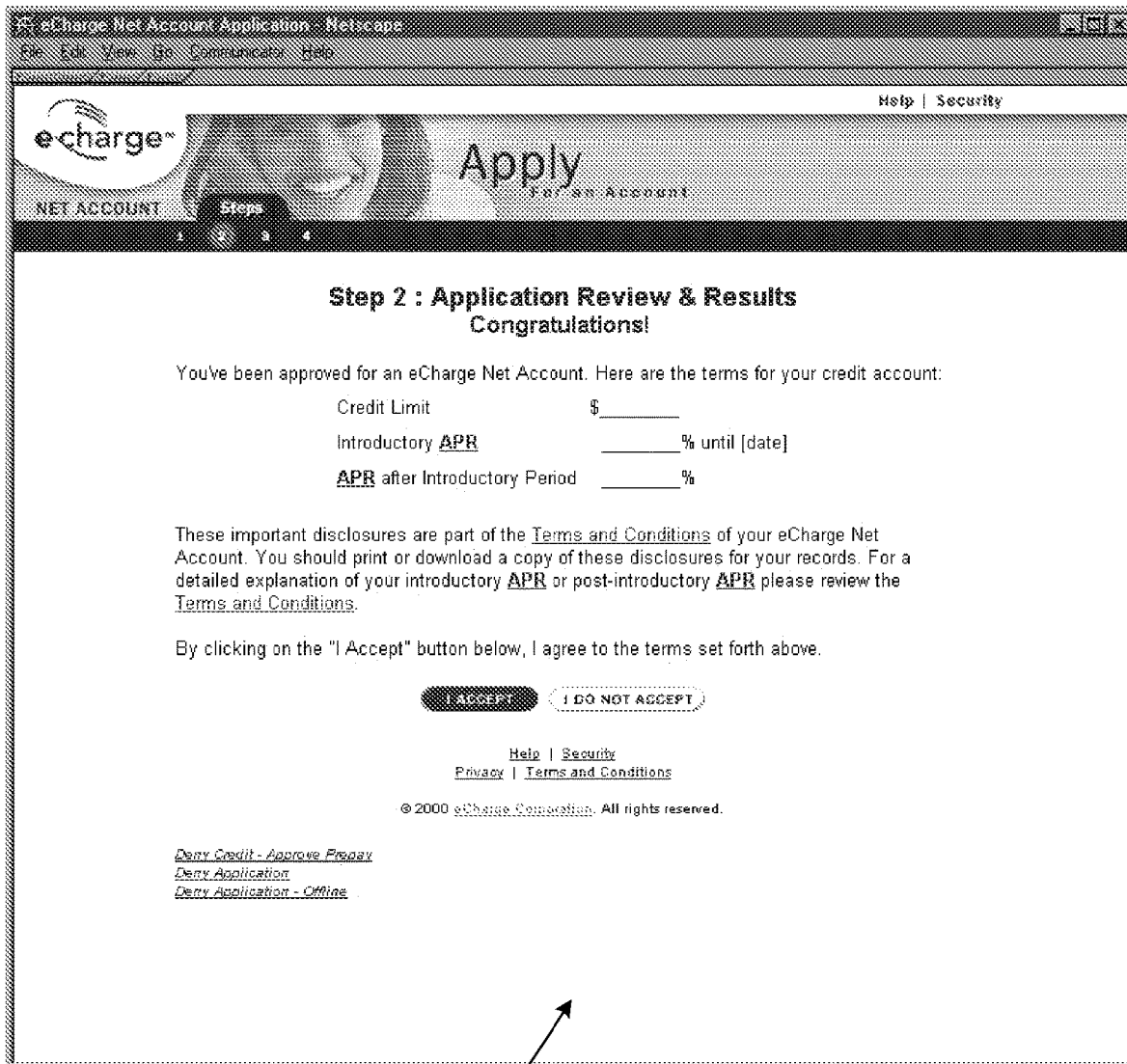
Figure 8F:
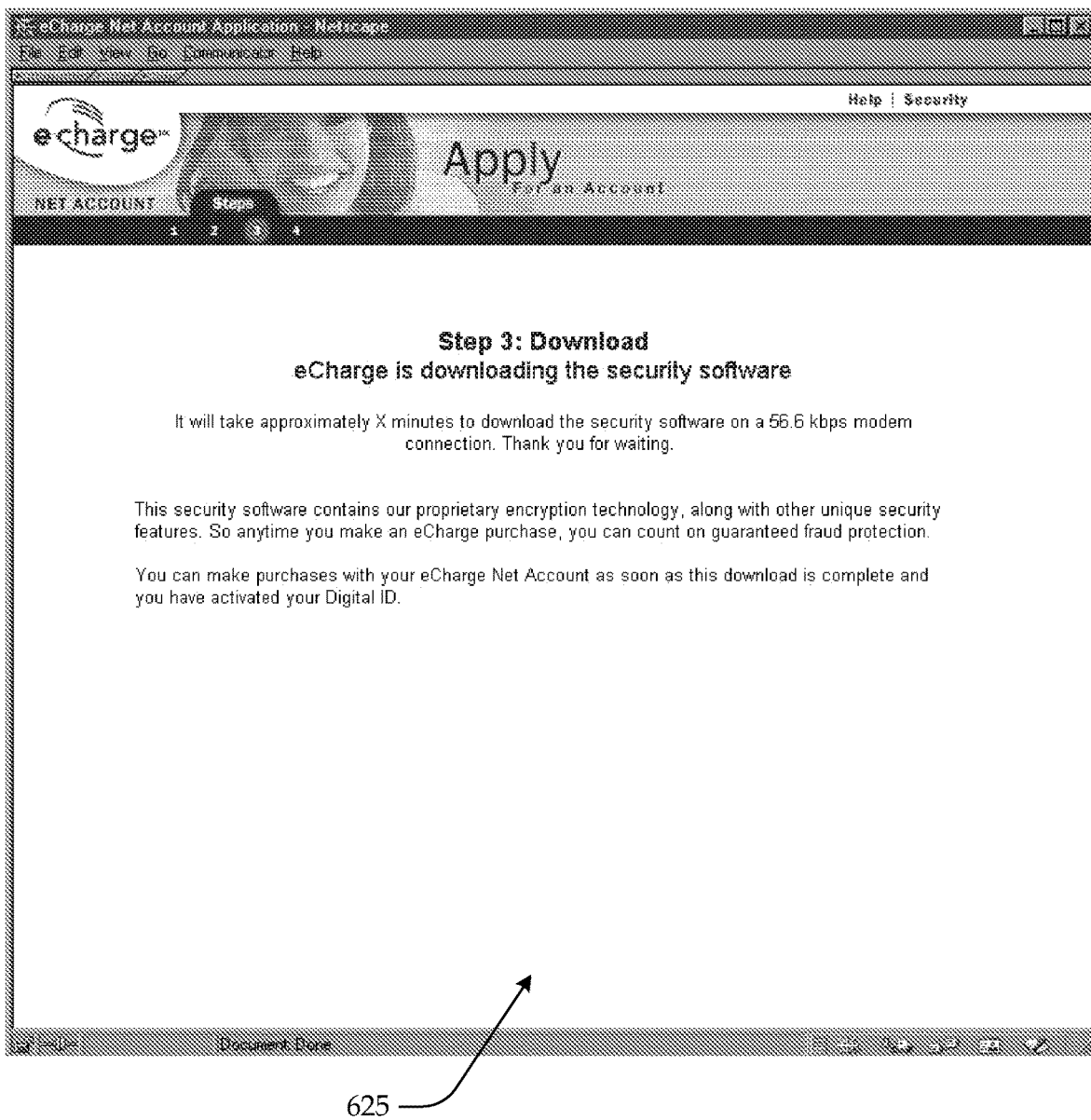
Figure 8G:
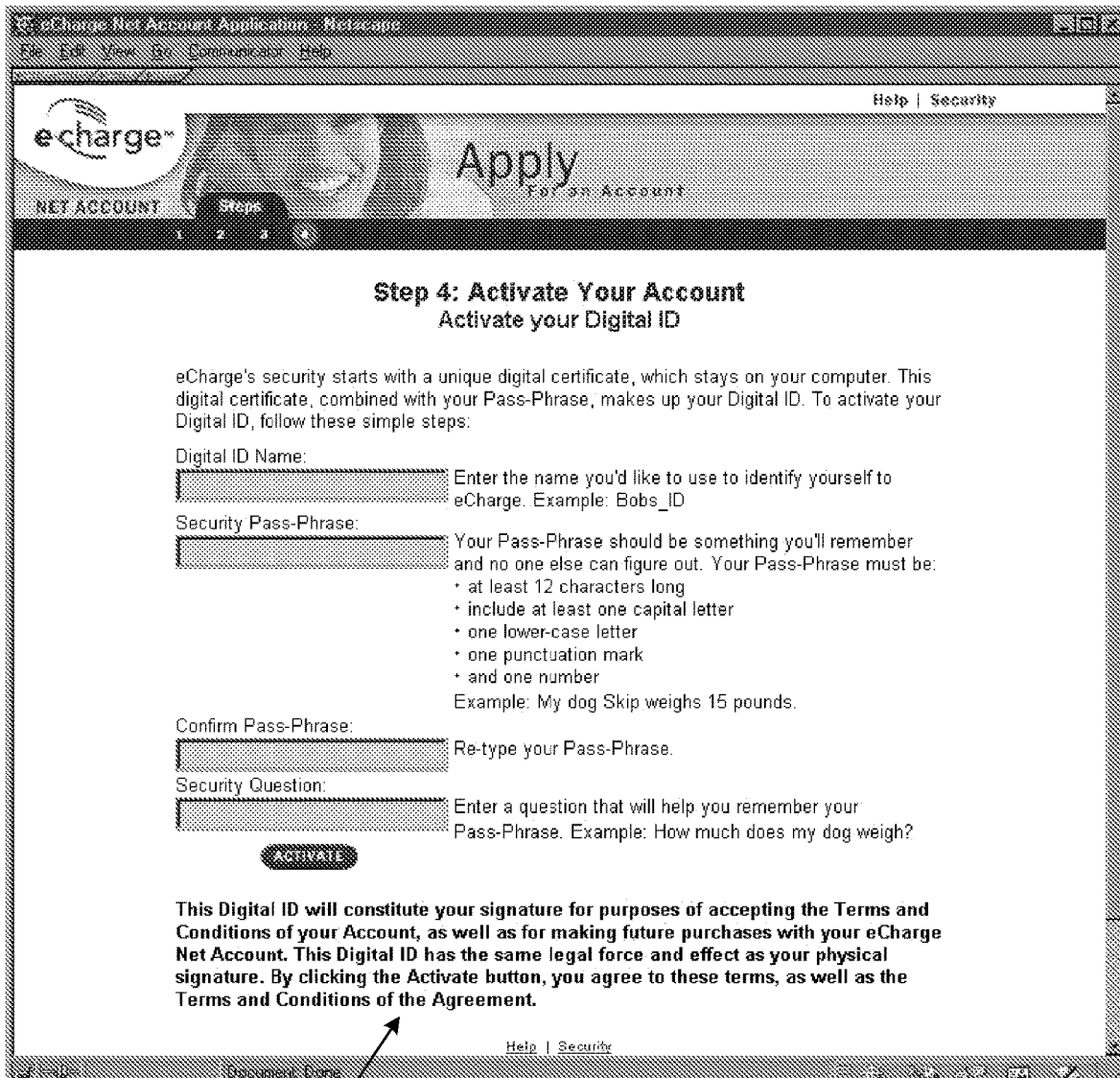

After the buyer completes the application form contained in the Web pages, 605, 610 and 615 shown in FIGS. 8B-8D and the application is processed by the credit processing server 53, a Web page 620 as shown in FIG. 8E is transferred to and displayed by the buyer computer's Web browser 64, which notifies the buyer of the results of the application process, i.e., account approval and details of his or her virtual payment account, including the account credit limit. Once the account approval is complete and the account accepted by the buyer, the commerce gateway 52 then transmits the buyer authenticator component 65 (which, as described above, generates a public key encryption key pair) to the buyers computer for installation as shown in FIG. 8F. FIG. 8G shows an exemplary Web page 630 that allows the buyer to activate their virtual payment account.

Customizing and Modifying a Virtual Payment Account

Figure 9A:
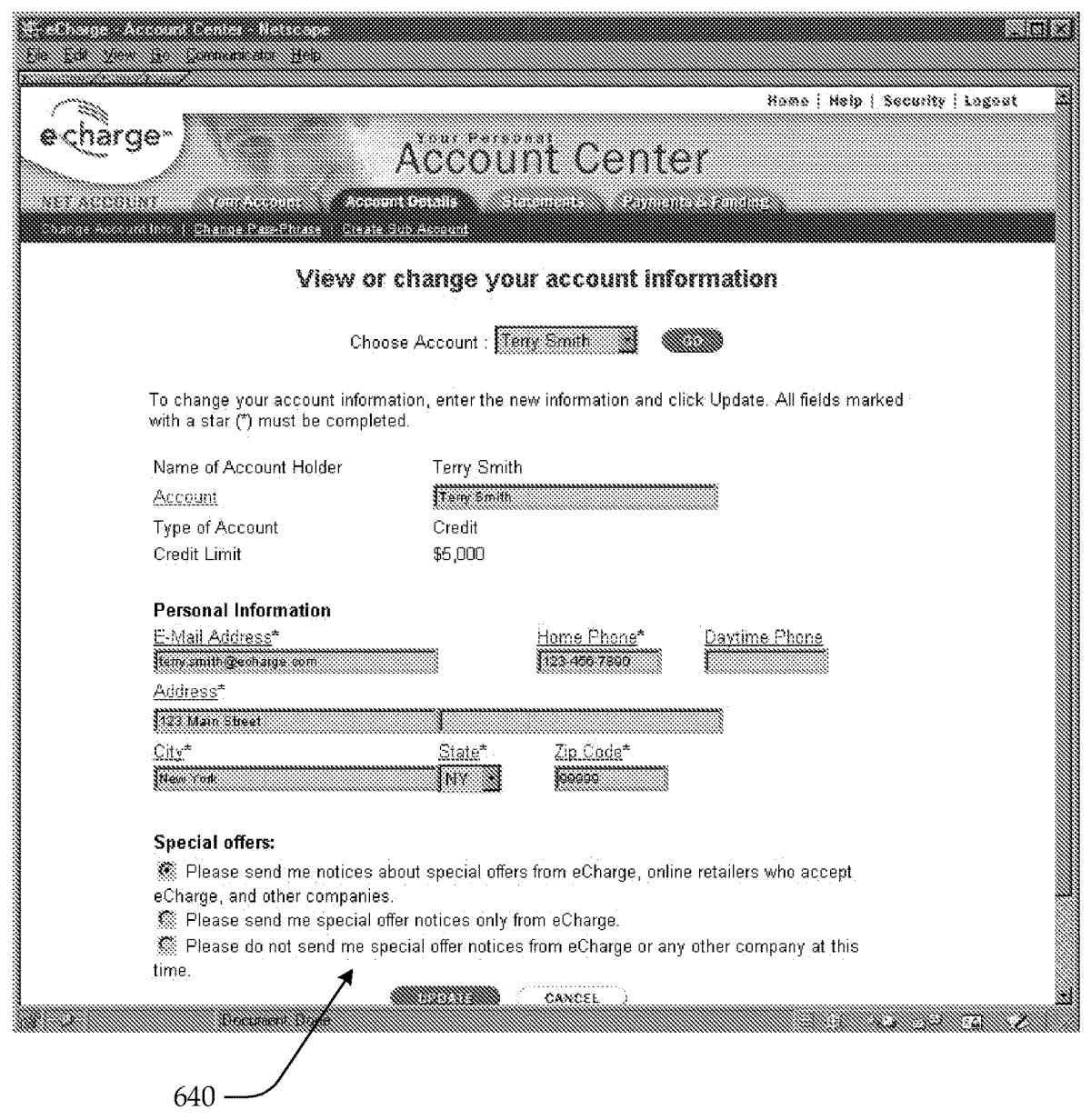
Figure 9B:
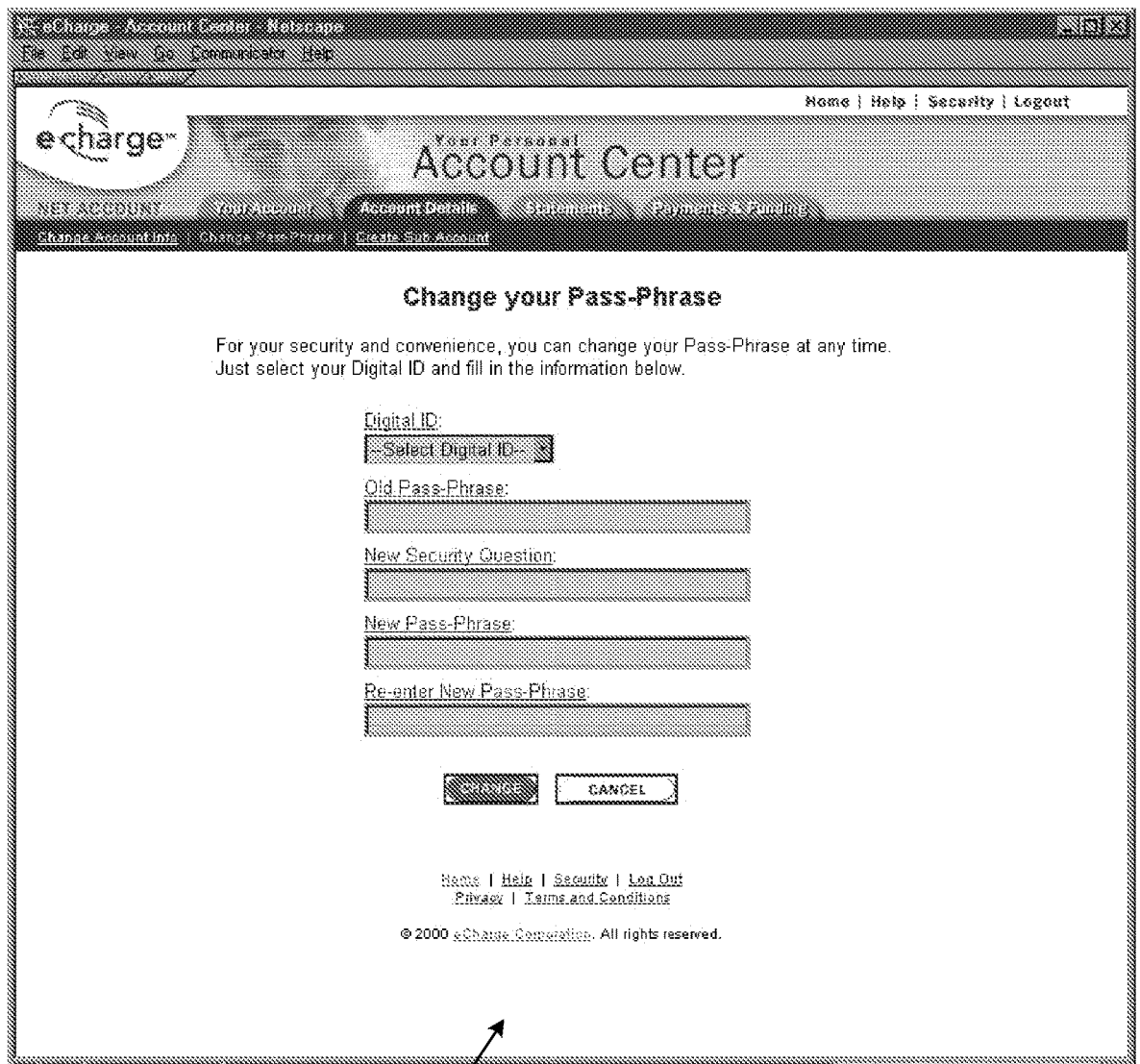

Once a virtual payment account has been approved and a credit limit set as described above, the account can be customized by the buyer. Account information is then stored in the account database 97 of the credit processing server 53. FIGS. 9A-9C illustrate an exemplary set of Web pages downloaded from the commerce gateway 52 and displayed by the Web browser 64 of the buyer's computer 50 for customizing the buyer's virtual payment account. FIGS. 9A-9B illustrate Web pages 640 and 645 for main account customization. As shown in FIG. 9A, the buyer may customize his or her virtual payment account contact information and preferences. FIG. 9B illustrates that the main account holder is able to configure access controls for their account and all sub-accounts as shown in Web page 645.

As shown in FIG. 9C, the buyer may also customize sub-accounts for his or her own use, or for use by a business partner, spouse and/or children. As will be described in more detail below, the buyer may then impose his or her own spending limits on the sub-accounts. In one actual embodiment, reward points accrue in the main account so that the buyer can transfer the reward points to sub-accounts. It will be appreciated that in other embodiments, reward points could accrue to individual sub-accounts, if the buyer so desires. Reward or reward points can later be used, for example, to make a payment for a purchase, to receive seller discounts, to purchase frequent flyer miles, etc. It will be appreciated by those of ordinary skill in the art that reward points can be earned by the buyer and applied to his or her virtual payment account in a myriad of different ways.

It will also be appreciated that a similar process is performed for a seller to become an authorized or registered seller. In one embodiment, a seller can apply to become a participant by completing an application form on-line. In another embodiment, a seller applies to become a participant of the system using a more traditional manual application procedure. In yet another embodiment, some combination of an on-line and manual process is used. It will be appreciated that if the seller application process is performed in whole or in part on-line, a Web browser component (not shown in FIG. 4) is used to display Web pages on the seller's computer display 72. The seller forms a contract with the provider of the commerce gateway 52. In one exemplary embodiment, this contract includes terms such as the billing period and the fee that will be paid to the commerce gateway provider. Since a seller is selling a product to a buyer who has a virtual payment account, the seller will not have sub-accounts in the same sense that a buyer has sub-accounts. However, a seller selling different types of data can have different accounts. For example, a book store may have a general account and one or more restricted accounts, for example, the restricted accounts may prohibit sales of adult products to minors. This can be in the form of a rating system (e.g., G, PG, PG13, NC17, R, etc.). In a similar manner to the buyer application process, once a seller has been approved and the seller account customized, a digital certificate is installed on the seller's computer 51 to identify the seller as a registered seller in the virtual payment system. The digital certificate is used in combination with a secret key generated by the seller server 51 and a public key generated by the seller server and sent to the gateway 52 to encrypt/decrypt messages for greater security.

It will be appreciated, as described earlier, that a seller can apply for a "buyer" account. In other words, a seller can purchase products as the owner of a virtual payment account.

Digital Security

The illustrated embodiment also allows a buyer to create a custom package of sub-accounts. As will be readily recognized by those of ordinary skill in the art, the buyer may be provided with any number, type or combination of sub-accounts depending on the desires of those providing and administrating the virtual payment system of the present invention.

The buyer can add sub-accounts (e.g., supplemental users, young shoppers, etc.) via the Web pages 650 shown in FIG. 9C. Sub-accounts can be customized for young shoppers as shown in FIG. 9C, for example, by setting spending limits for the young shopper and identifying only those seller Web sites from which the young shopper can purchase products.

As will be described in more detail below, once the virtual payment account has been authorized 114 and customized, a digital certificate is transferred by the commerce gateway 52 and installed 128 on the buyer computer 50. The digital certificate is then used in subsequent transactions as a unique credential to identify the buyer as a registered holder of a virtual payment account. In an actual embodiment of the present invention, a buyer or seller is identified as a registered user of the virtual payment system by the commerce gateway 52 verifying the commerce gateway's digital signature on the digital certificate associated with the buyer's virtual payment account.

It will be appreciated that several levels of security can be imposed on on-line transactions. Moving from the lowest level to the highest level, there can be: (1) no security restrictions imposed; (2) minimal security, such as account name and password verification; (3) intermediate security, such as a digital certificate or secret key; (4) high security, such as a transaction signed with a digital signature using the buyer's secret key; or (5) maximum security, such as a digital signature and additional access controls, such as an account number, a last purchase verification, smart cards, secure tokens or some combination thereof. As will be described later, in the actual embodiment of the virtual payment system described herein, the term "digital certificate" is used to describe the authorization used; however, it will be appreciated that a higher level of security such as a digital signature, or a digital signature with additional access controls may be desired in order to ensure the highest level of security for all parties involved (i.e., the buyer, the seller, the commerce gateway, and the credit processing server) in virtual payment account transactions.

In one exemplary embodiment of the security transaction, the seller server 51 digitally signs a purchase offer with a certificate issued by the commerce gateway 52 and sends it to the buyer computer 50; the buyer computer 50 digitally signs the purchase offer with a certificate issued by the commerce gateway 52 and sends it back to the seller server 51; the seller server 51 then forwards the doubly signed purchase offer to the commerce gateway 52; the commerce gateway 52 verifies both signatures and if they are both valid and the transaction is permissible then signs the doubly signed offer and returns the resulting triply signed purchase offer to the seller server 51; the seller server verifies the commerce gateway's 52 signature, and if it is valid, then the purchase transaction is complete. In the aforementioned example, the seller server 51 may notify the buyer computer 50 or they may not.

Ordering Products

Once a buyer has created and customized his or her virtual payment account, he or she can immediately order products via the Internet if he or she was granted credit during the account application process. If, however, the buyer's virtual payment account is only a prepaid account, prepayment must be made before the buyer can order products. In an alternate embodiment, the buyer with only a prepaid account can order products, however, shipment of the product will be held until the prepaid account is sufficiently funded to cover the purchase. More specifically, this would allow any registered buyer to have a form of "digital layaway" and by ordering products directly from the Web site of any registered seller. It will be appreciated that in yet another embodiment, buyer and seller will use the same type of virtual payment accounts and that any buyer can therefore act as a seller and vice versa. Additionally, it will be appreciated that a seller can be an auction Web site, in which a buyer uses his or her virtual payment account to pay for the goods, services and/or content purchased from the auction Web site.

Figure 11A:
FIGS. 11A-11E are exemplary Web pages used by a buyer to purchase goods, services and/or content in accordance with the present invention.
Figure 11B:
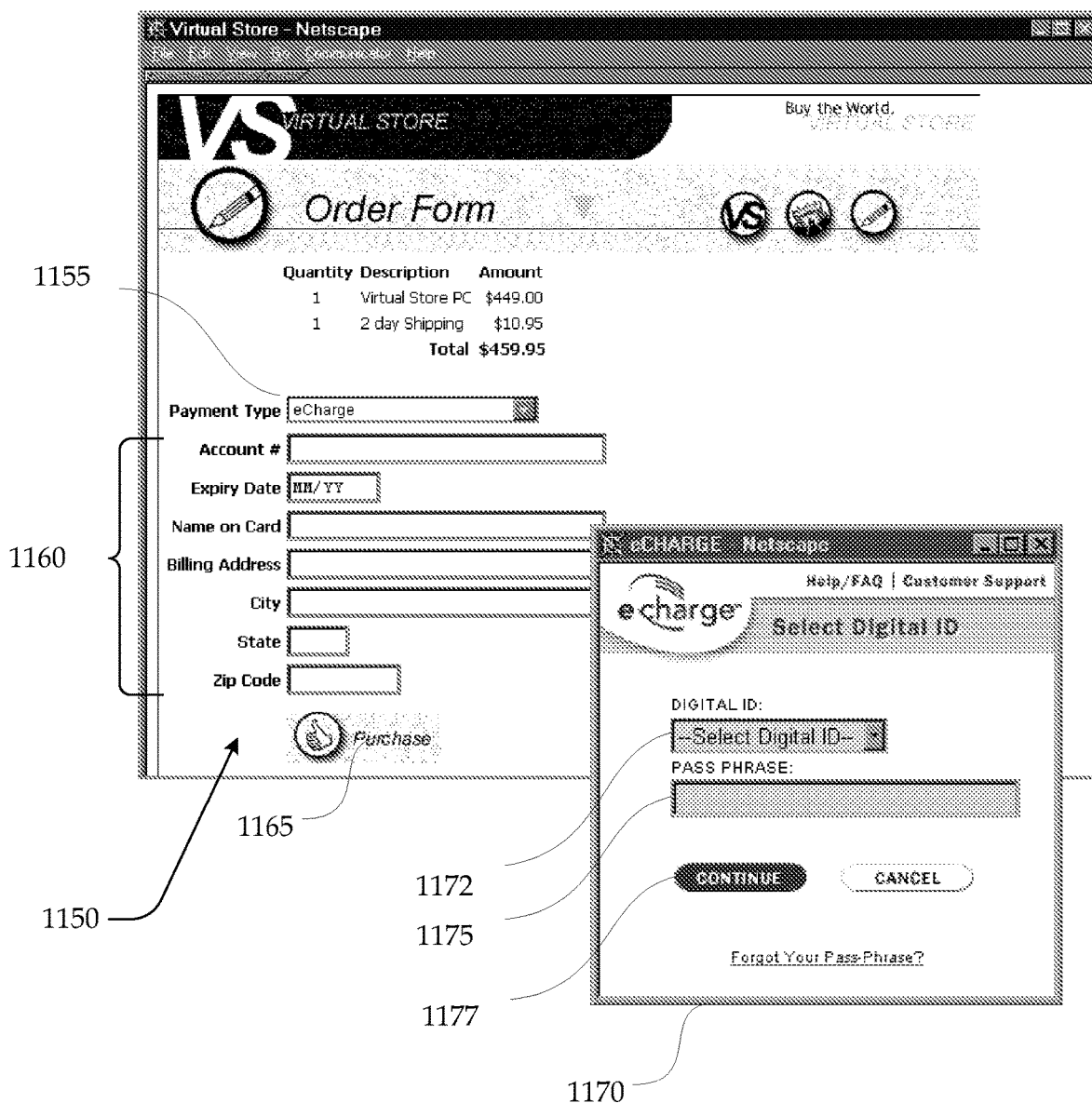
Figure 11C:
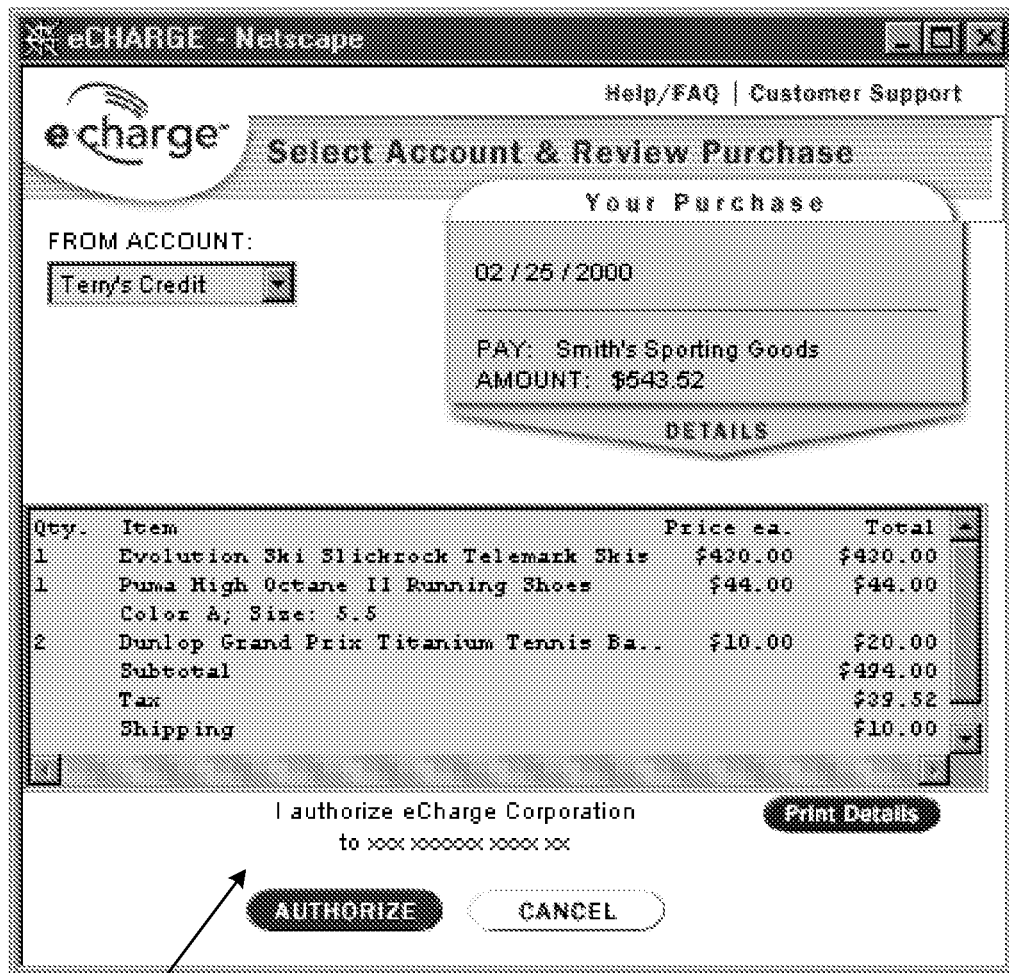

In one actual embodiment of the present invention depicted in FIGS. 11A-11C, the buyer may "surf the Web" and visit a registered seller's Web site, such as "Virtual Store," 1100 using the Web browser 64. Once the buyer visits a registered seller's Web site, the buyer may order and pay for products offered from that Web site using his or her virtual payment account. More specifically, a buyer using buyer computer 50 and Web browser 64 may retrieve the Web page 1100 shown in FIG. 11A from the seller Web site fictitiously known as "Virtual Store." The buyer makes a selection of a particular product 1105 by manipulating a graphics cursor with a pointing device, such as a mouse above the selection 1110 and "single-clicking." It will be appreciated that other pages, for example, a query page in which the buyer requests products by a keyword, may be displayed. It will also be appreciated that the Web page 1100 shown in FIG. 11A is a simplified example. It is common for a seller site to allow a buyer to select multiple products and place them in a "shopping cart." The buyer can then view the items in the cart and, if desired, remove items from the cart. Once the buyer has selected the desired items for purchase, the buyer indicates a desire to purchase the selected items, for example, by clicking an "OK" or a "Buy" button. In the simplified example shown in FIG. 11A, the buyer selects an item, such as the Virtual Store Personal Computer 1105 and presses the "Order" button 1110 to initiate the purchase transaction.

Figure 11D:
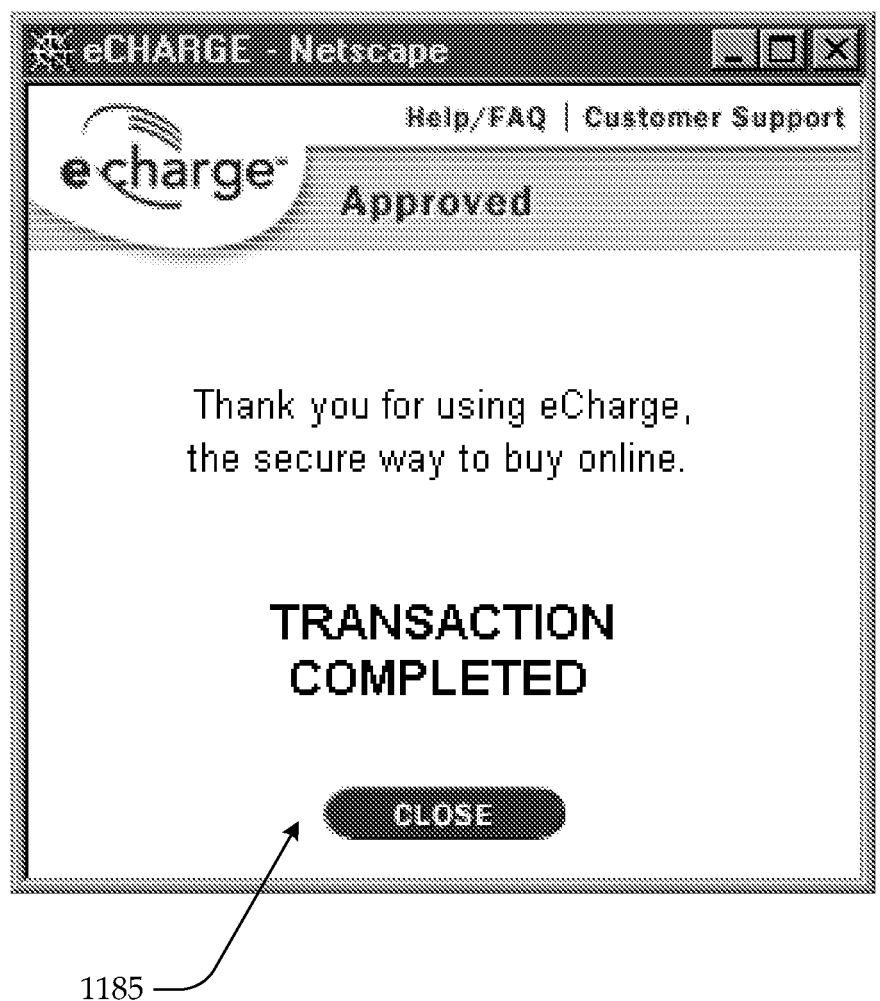
Figure 11E:
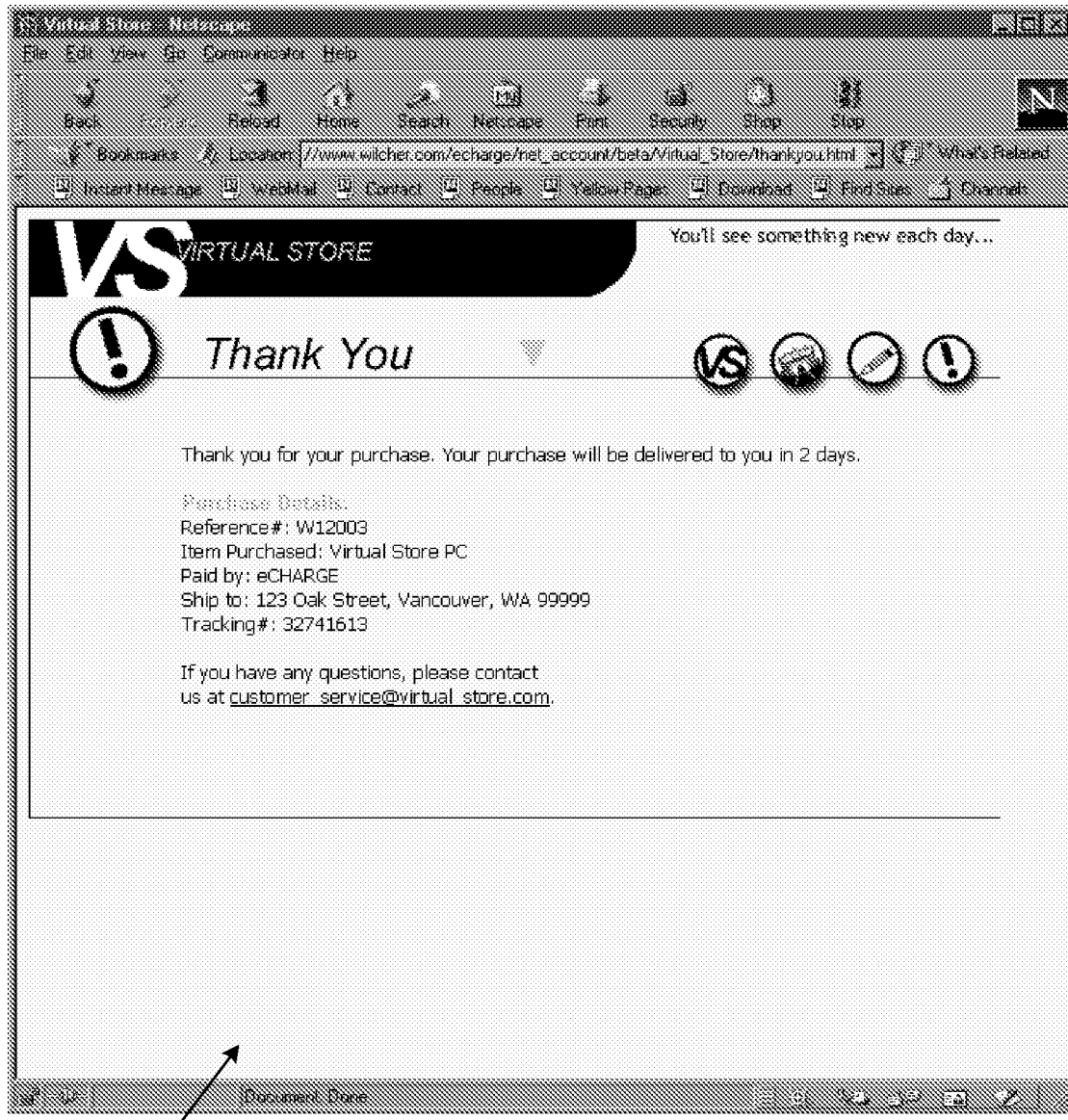

After initiating the purchase transaction, the seller server 51 provides the Web browser 64 of the buyer's computer 50 with the Web page 1150 shown in FIG. 11B, which requests shipping information 1160, such as a street address, from the buyer. Additionally the Web Page 1150 includes various payment options, i.e., major credit cards, such as VISA® or MASTERCARD®, with electronic transmission of credit information. In accordance with the present invention, a virtual payment account option is also displayed as a payment option for registered sellers. After entering the shipping and payment information 1160 and selecting the virtual payment option 1155, the buyer can continue by clicking on the "Purchase" option 1165. In an actual embodiment of the present invention the buyer authenticator 65 displays a window 1170 requesting the buyer to select their choice of accounts 1172, along with an authenticating pass phrase 1175. After selecting an account and entering the correct pass phrase, the buyer clicks "Continue" 1177 to proceed with the purchase. In response, the seller server 51 calculates the total cost of the order, including tax and shipping and handling, and the buyer is presented with a confirmation screen 1180 as shown in FIG. 11C. After authorizing the purchase, the buyer may be presented with a payment confirmation screen 1185 as shown in FIG. 11D. Additionally, the buyer may be presented with an order confirmation screen 1190 as shown in FIG. 11E.

Figure 12:
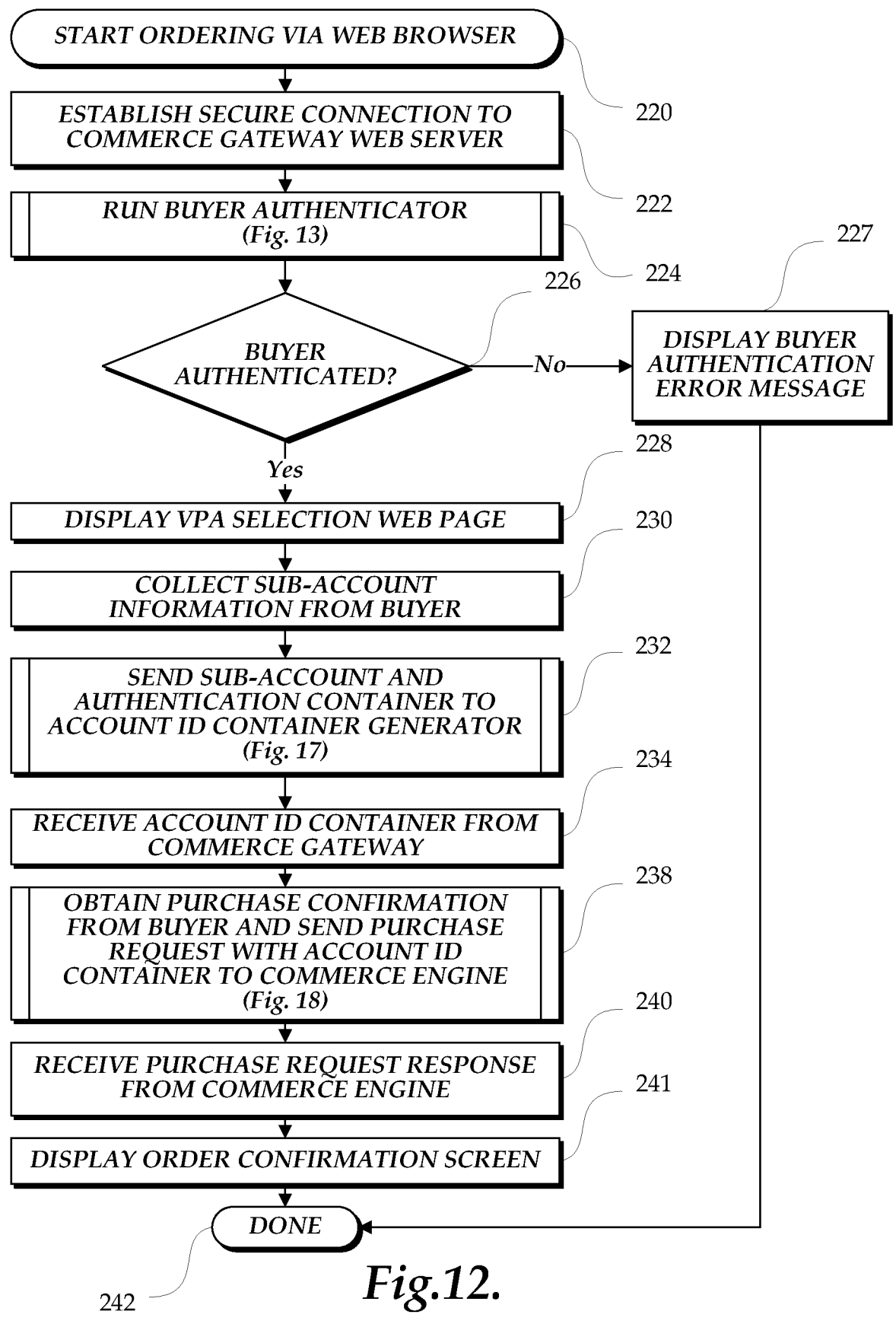
FIG. 12 is a flow diagram illustrating the logic used by the buyer's computer to order goods, services and/or content from the Internet using the Web browser.

FIG. 12 illustrates the logic implemented by the Web browser 64 installed on the buyer computer 50 when the virtual payment account option 1155 is selected. The logic begins in a block 220 and proceeds to a block 222 where a secure connection between the buyer computer 50 and commerce gateway 52 is established. In an actual embodiment of the present invention, the Secure Socket Layer (SSL) protocol is used for establishing a secure connection. SSL uses public key encryption incorporated into a Web browser, such as NETSCAPE NAVIGATOR® Web browser and Netscape's commerce servers, to secure the information being transferred over the Internet. The logic then proceeds to a block 224 where a buyer authenticator component 65 on the buyer computer 50 is executed. It will be appreciated that the buyer authenticator component 65 can also be included, in part or in whole, in the Web browser 64. The buyer authenticator component 65 is shown in more detail in FIG. 13 and described next.

The buyer authenticator 65 determines whether a buyer is a registered holder of a virtual payment account or, put another way, a registered participant in the closed virtual payment system of the present invention. The logic of FIG. 13 begins in a block 243 and proceeds to a block 244 where an authentication request and container are received from the Web browser 64. The container includes: transaction information, such as purchase detail; identification of the parties, such as a buyer identification that identifies the buyer, e.g., the digital certificate previously issued to the buyer when he or she created the virtual payment account as described above; and a seller identification, e.g., the digital certificate issued to the seller upon creation of a seller account; and context, such as transaction date and time. It will be appreciated that the container is initially empty, and data is then added to the container by various components. As stated earlier, embodiments of the invention implement the buyer authenticator 65 in the Web browser 64. In one actual embodiment, the buyer authenticator 65 is an applet operating from within the Web browser 64.

Next, in decision block 246, a test is made to determine if a digital certificate is installed on the buyer computer 50. The digital certificate may be stored in the buyer computer 50 memory 63 or one some other device associated with the buyer computer such as a secure token, a smart card or encrypted on some computer readable medium. It will be appreciated that other methods of digital identification can be used. If the digital certificate is installed, the digital certificate identification is inserted into the authentication container and the authentication request and container are returned to the Web browser in blocks 248 and 250. The container can be any one of a variety of data formats, for example, one embodiment of the present invention a proprietary protocol is used. In an actual embodiment of a present invention, a public key generated by the buyer's computer and signed by the commerce gateway (thereby forming a digital certificate) is also inserted into the container. The secret key is never transmitted anywhere in the virtual payment system of the present invention. The combination of the secret key and the digital certificate provides a heightened level of security to the buyer authentication process. A digital signature is generally a document that has been encrypted by the secret key of a public key pair. Only the public key of the same key pair will be able to decrypt the document to its original form. This is particularly useful in demonstrating that only the holder of the secret key is able to sign (encrypt) the document. In practical terms, signing a large document using public key cryptography can be very time consuming. Almost equally effective is creating a cryptographic message digest of the document and then encrypting the digest with the secret key. Therefore those of ordinary skill in the art will appreciate that anyone knowing the corresponding public key and the digest algorithm will be able to verify that the message was not altered and that it originated from the holder of the corresponding secret key. It will be appreciated that the digital certificate as used herein refers to an authentication identifier that is recognized by the provider of the virtual payment account that adheres to the provider's non-repudiation purchase policies.

If, however, in decision block 246 it is determined that a digital certificate is not installed on the buyer computer 50, the logic proceeds to a decision block 252 where a test is made to determine if "certificate not present" processing should be performed. Certificate not present processing allows a buyer to manually enter identification information when a digital certificate is not present. The identification information can include information such as an e-mail address, a password and personal information, for example, a mortgage payment amount. If the result of decision block 252 is positive, the logic proceeds to an alternate authentication in block 254. The alternate authentication is shown in more detail in FIG. 14 and described next.

Figure 14:
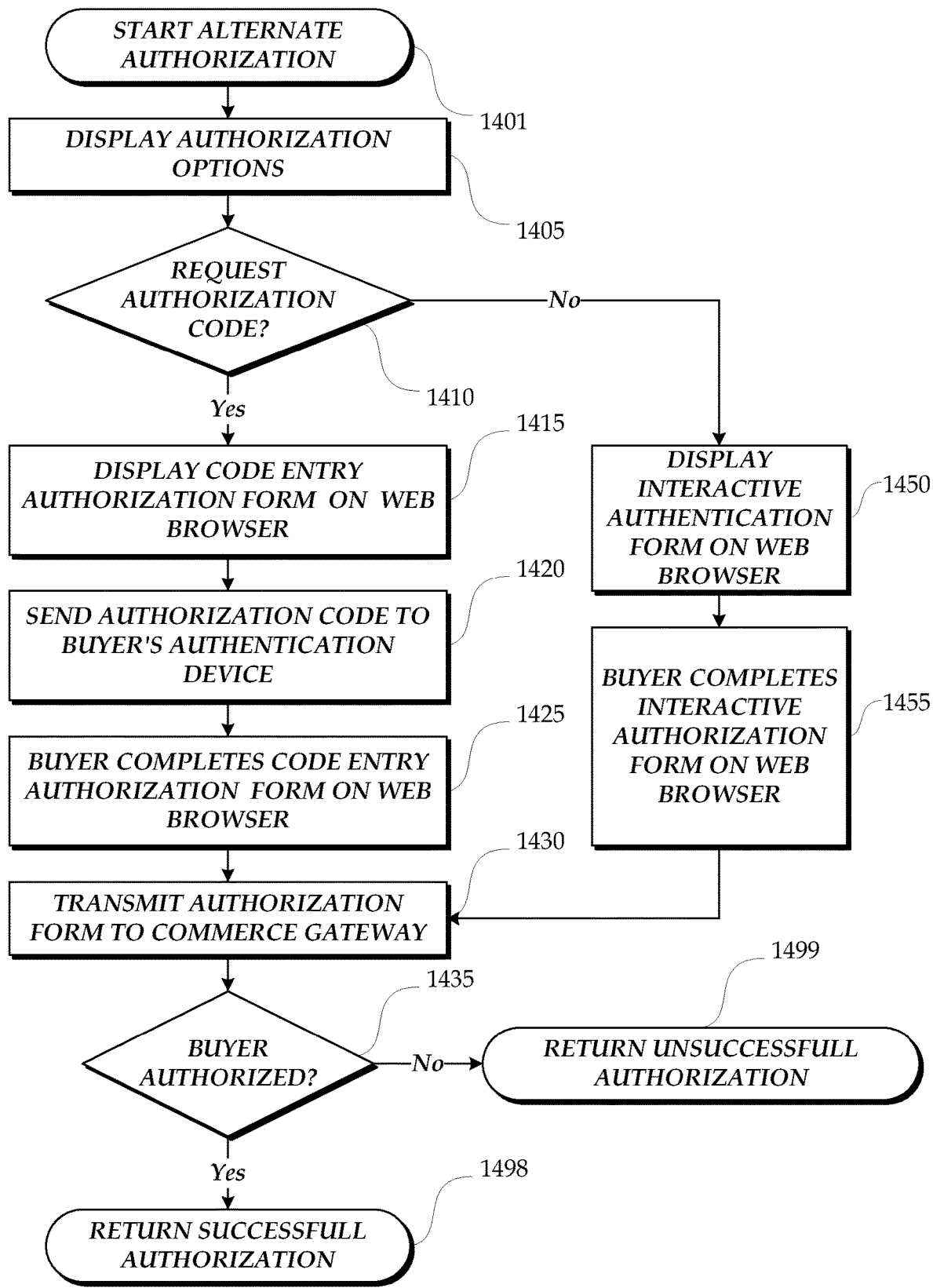
FIG. 14 is a flow diagram illustrating the logic used by an alternate buyer authenticator of the buyer's computer to validate that the buyer is a registered virtual payment account participant.
Figure 28:
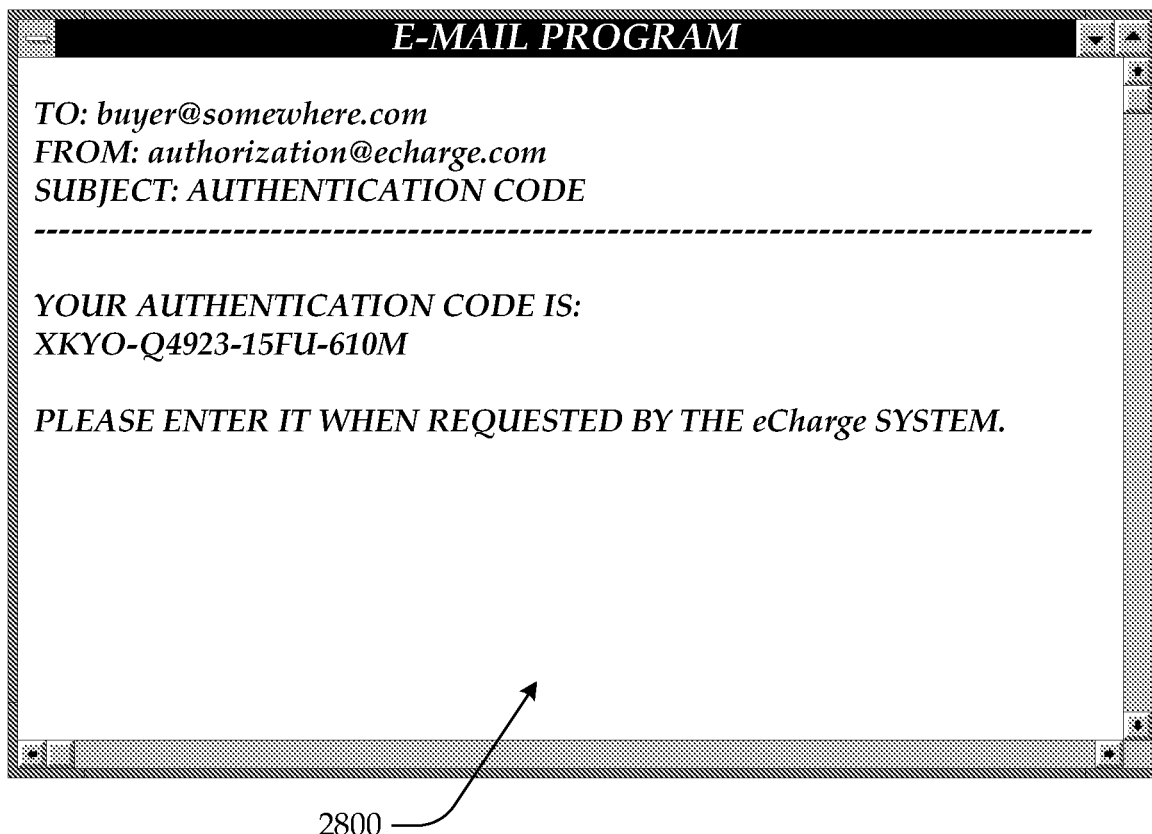
FIG. 28 is an exemplary window of an e-mail computer program containing an alternate authentication message.
Figure 29:
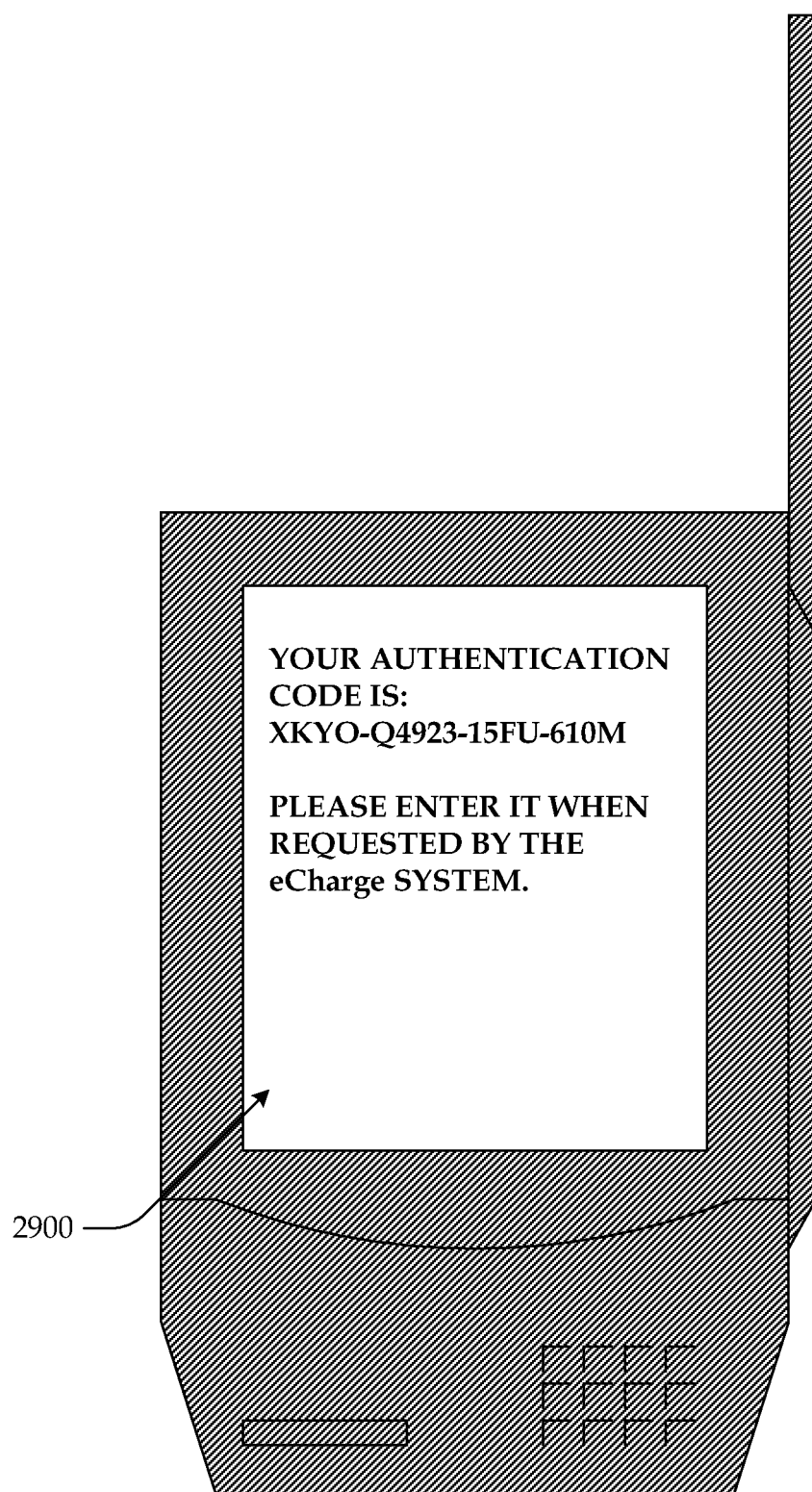
FIG. 29 is an exemplary device showing an alternate authentication message.

The logic of FIG. 14 begins at a block 1401 and proceeds to block 1405 where the authorization options are displayed to the buyer. Next, it is determined in a block 1410 if the buyer requested an authorization code as the alternate authorization mechanism. If the buyer did choose to receive an authorization code, then the Web browser 64 on the buyer computer is sent an authorization code entry form in a block 1415 and the authorization code is sent to an authentication device in a block 1420. Exemplary authentication devices 2800 or 2900 are shown in FIGS. 28 and 29 respectively. After receiving the authorization code, the buyer enters the code in the authorization code entry form in a block 1425.

If however at block 1405 the buyer decides not to request an authorization code, then from block 1410 the logic flows to a block 1450 where an interactive authentication Web form 3000 is sent to the Web browser 64 on the buyer's computer 50. An exemplary interactive authentication Web form 3000 is shown in FIG. 30. Next in a block 1455 the buyer completes the interactive authentication Web form 3000.

Next, the completed authorization entry form from block 1425 or 1455 is transmitted to the commerce gateway 52 in a block 1430. The logic then proceeds to a block 1435 where it is determined whether the authentication was successful. If the authentication was successful the logic ends at a block 1498 returning a successful authentication. If the authentication was unsuccessful the logic ends at a block 1499 returning an unsuccessful authentication.

Figure 15:
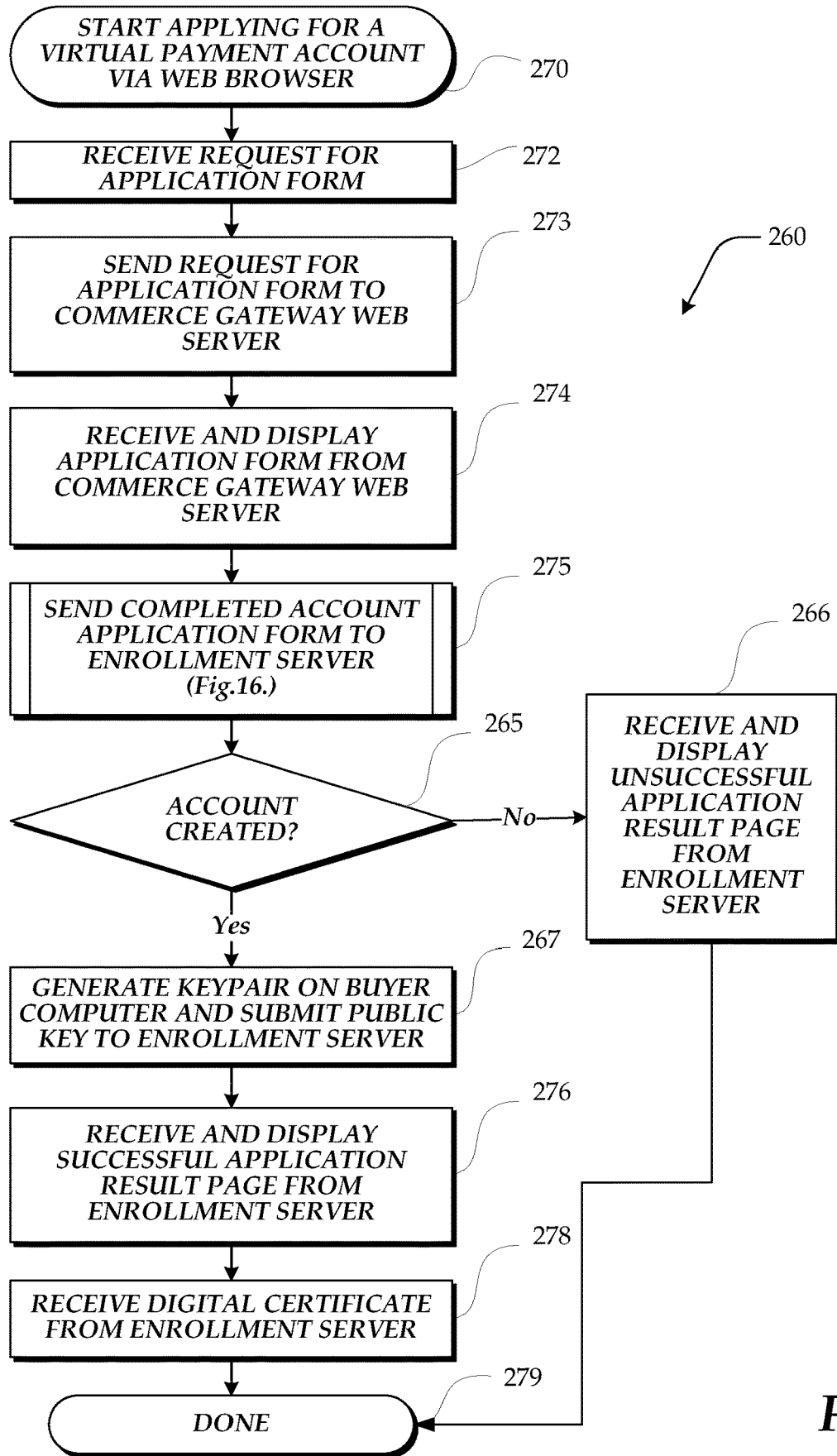
FIG. 15 is a flow diagram illustrating the logic used by the buyer's computer to apply for a virtual payment account using the Web browser.

Returning to FIG. 13 the logic then moves to a block 256 where the information from the alternate authentication process is passed back through the buyer authenticator 65 and the logic ends at block 262. If there is no digital certificate installed ("No" in decision block 246) and certificate not present processing is not going to be performed, for example by a user selecting "cancel" 3010 in the certificate not present authorization Web page 3000 shown in FIG. 30 (or "No" in decision block 252), the buyer likely does not have a virtual payment account. Accordingly, the logic of FIG. 13 proceeds to a decision block 258 where a test is made to determine if the buyer wishes to apply for a virtual payment account. If the buyer wishes to apply for a virtual payment account, the logic proceeds to a block 260, in which the buyer is allowed to apply for a virtual payment account as shown in FIG. 15 and described next. Otherwise, the buyer authenticator 65 returns an unsuccessful authorization message to the Web browser 64 in a block 261 and the logic ends in block 262.

FIG. 15 illustrates the logic implemented by the Web browser 64 when a buyer applies for a virtual payment account. It will be appreciated that applying for a virtual payment account can be invoked by a buyer requesting an account directly from the commerce gateway 52 or by a buyer who is not registered attempting to order a product from a registered seller. In either case, the logic for applying for a virtual payment account via a Web browser 64 begins in a block 270 and proceeds to a block 272 where a request for an application form is received by the Web browser 64. Next in a block 273, the request for an application form is sent to the Web server component 87 of the commerce gateway 52, The requested application form is then received from the Web server component 87 of the commerce gateway 52 and displayed in the buyer's Web browser in a block 274.

Figure 16:
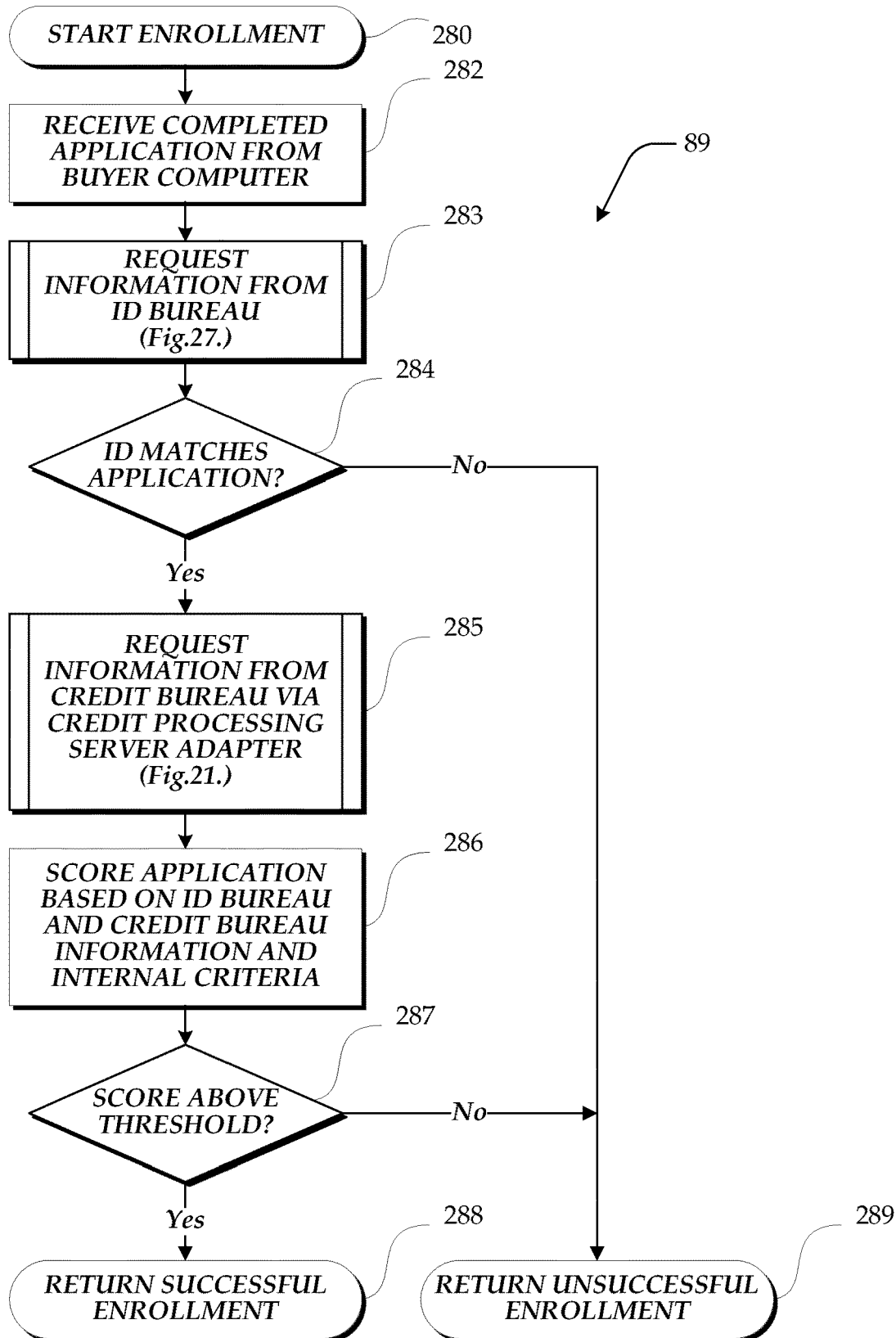
FIG. 16 is a flow diagram illustrating the logic used by an enrollment server of the commerce gateway shown in FIG. 5 to establish a new buyer account in accordance with the present invention.

Next, in a block 275, the completed account application form is sent to the commerce gateway 52 and processed by an enrollment server component 89 as shown in FIG. 16, and described next. In another embodiment, the account application is sent to the transaction server component 84 that handles financial transactions and also handles non-financial transactions, such as enrollment.

The logic of the enrollment server 89 shown in FIG. 16 begins in a block 280 and proceeds to a block 282 where a completed application form is received from the Web browser. Next, in a block 283 identity information, such as name, employer, current residence, etc., is requested from an identity bureau 56 via the identity bureau adapter 79 whose logic is shown in FIG. 27 and described next.

Figure 27:
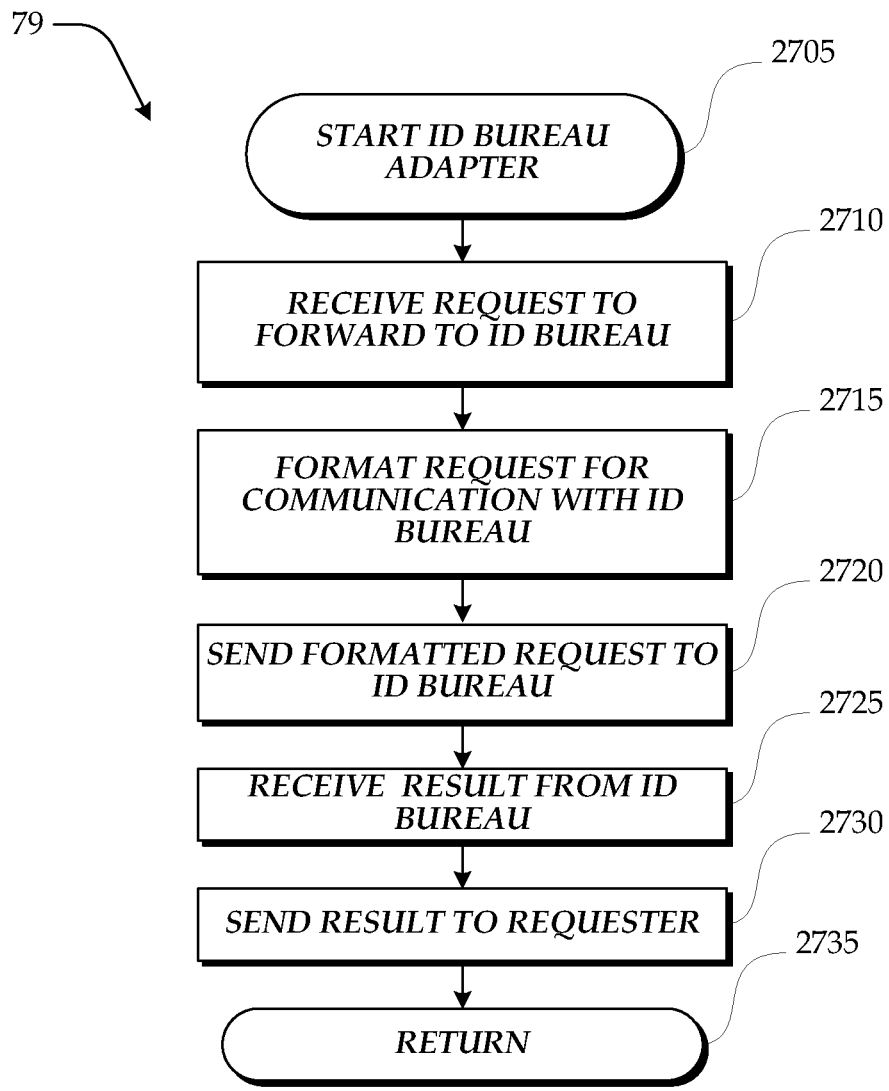
FIG. 27 is a flow diagram illustrating the logic used by a commerce gateway to process a request for information from an identity bureau.

Accordingly, the logic of FIG. 27 begins in a block 2705 and proceeds to a block 2710 where the identity request is received. The request is then formatted to be compatible with the particular identity bureau in a block 2715. Next, the logic proceeds to a block 2720 where the formatted request is then sent to identity bureau 56. The result of the request is received from the identity bureau in a block 2725. Next, in a block 2730, the result is then returned to requester. The logic of FIG. 27 then ends in a block 2735.

Figure 21:
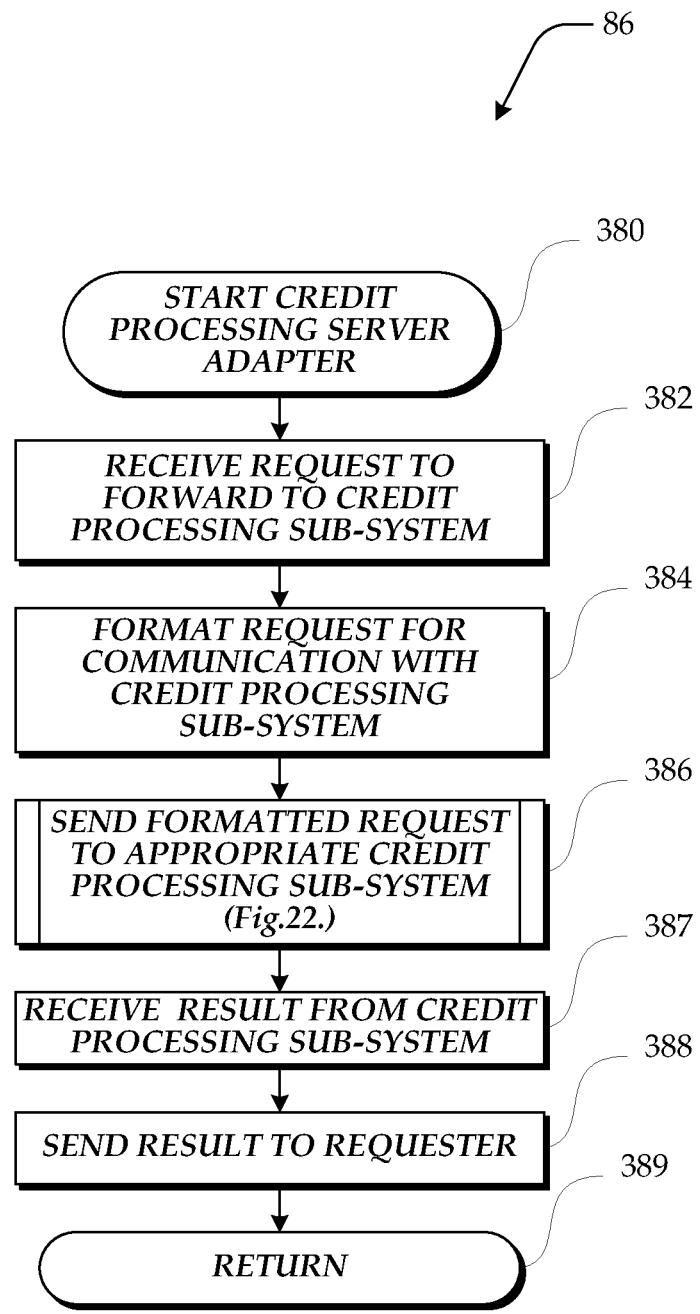
FIGS. 21 and 22 are flow diagrams illustrating the logic used by various sub-systems of the credit processing server shown in FIG. 6 to provide for payment of goods, services and/or content ordered over the Internet using a virtual payment account.

Returning to FIG. 16, if in a block 284, which in this case is the enrollment server 89, it is determined that the identity information received from the identity bureau 56 via the identity bureau adapter 79 corresponds to the information in the application received in block 282, then processing continues to a block 285 where the enrollment server requests credit information, such as income, length of time with current employer, length of time at current residence, etc., from a credit bureau 58 via the credit processing server adapter 86 as shown in FIG. 21 and described later with reference to a purchase authorization request.

Upon receipt of the credit information, the logic proceeds to a block 286 where the application is scored based on the identity bureau information and credit bureau information in combination with internal criteria. The internal criteria provide a score for the various pieces of credit information. For example, incomes will be broken down into ranges, with a point value assigned to each range. Similarly, point values will be assigned based on the time the applicant has lived at his or her current residence, etc. The points for each piece of credit information are combined to determine a score for the applicant. The score equates to the credit worthiness of the buyer and is used to determine if the applicant will receive a credit account, or if the score falls in an intermediate range, a prepaid account, and if so, to establish a credit limit for the applicant, i.e., buyer. Next, if the score is above a threshold logic ends with a successful enrollment result returned to the Web browser in a block 288. However if the score is below a certain threshold or if the identity information provided by the identity bureaus 56 does not correspond to that of the buyer's application, then an unsuccessful result is returned in a block 289. Processing then returns to FIG. 15.

In FIG. 15, once a response is received from the enrollment server 89 a block 265 examines whether an account was created. If it was, then a request is sent to the buyer computer 50 to generate a public key encryption pair in block 267 and to submit the public key to the enrollment server 89 on the commerce gateway 52. The enrollment server then signs the public key to create a digital certificate and returns a successful enrollment Web page 620, as shown in FIG. 8E, which is received in a block 276 along with the digital certificate in a block 278. If at block 265 it was determined that an account was not created then an unsuccessful application Web page is displayed (not shown) at a block 266. In the case of applying for a virtual payment account, the result page 620 provides details of the new account for the buyer, or contains a message informing the buyer that there was an error creating the account. The logic of FIG. 15 of applying for a virtual payment account then ends in a block 279 and processing returns to FIG. 13.

Referring again to FIG. 13, after the buyer has applied for a virtual payment account, the logic returns to decision block 246 where the test to determine if a digital certificate is installed on the buyer computer 50 is repeated. Depending on the results of decision block 246, either blocks 248-250 or blocks 252-256 are repeated for the recent applicant of a virtual payment account. The logic then ends in a block 262.

Figure 13:
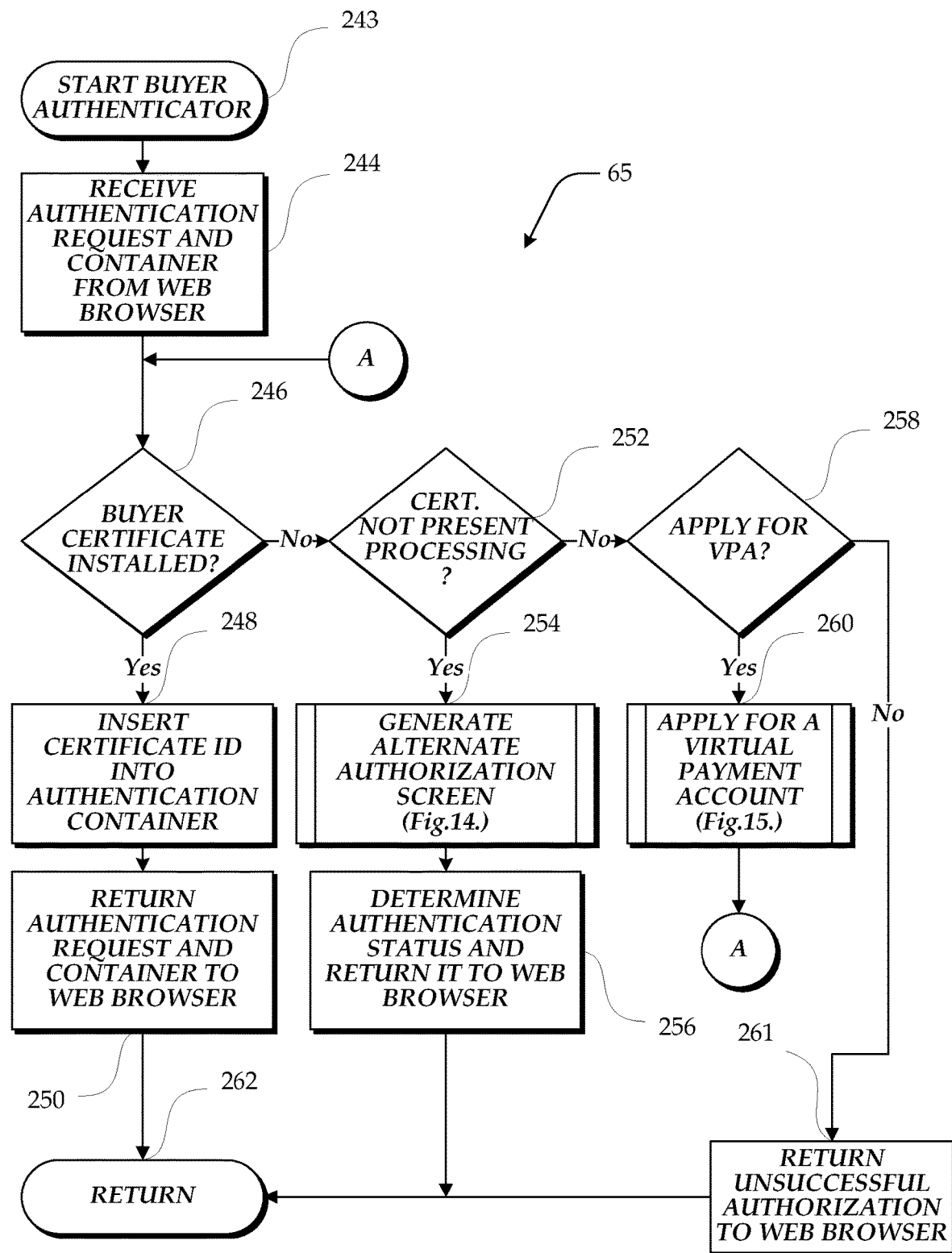
FIG. 13 is a flow diagram illustrating the logic used by a buyer authenticator of the buyer's computer to validate that the buyer is a registered virtual payment account participant.

While the logic of authenticating a buyer as shown in FIG. 13 and described herein uses a digital certificate as the primary means for authenticating a buyer, it will be appreciated that other methods are possible. For example, a lesser level of security could be employed, whereby a user could be required to enter identifying information, such as the information entered in alternate authentication shown in FIG. 14. Alternatively, a greater degree of security could be employed whereby a digital certificate is required, and "certificate not present" processing is not allowed. Or, an even greater level of security could be used requiring a digital signature and other verifying information from the buyer.

Returning to FIG. 12, after buyer authentication is completed in block 224, the logic proceeds to a decision block 226, where a test is made to determine if the buyer authentication was successful. If not, the logic proceeds to a block 227 where an error message is displayed on the buyer computer 50 by the Web browser 64 notifying the buyer of the failed authentication. The logic of FIG. 12 ends in a block 242.

However, if the buyer was successfully authenticated, the logic proceeds to a block 228 where a virtual payment account selection Web page 1170 as shown in FIG. 11B is displayed. Included in the requested information of the virtual payment account selection Web page 1170 is an identification of the applicable account or sub-account to which the purchase should be applied. Next, in a block 230, sub-account and password information (used to unlock the buyer's digital certificate) are obtained from the buyer from the information entered in the virtual payment account selection Web page 1170 of FIG. 11B when the buyer indicates that the information has been entered by selecting "Continue" 1177. The logic of FIG. 12 then proceeds to a block 232 where the sub-account, and an authentication container are sent to the commerce gateway 52 and processed by the account identification container generator 88 shown in FIG. 17 and described next.

Figure 17:
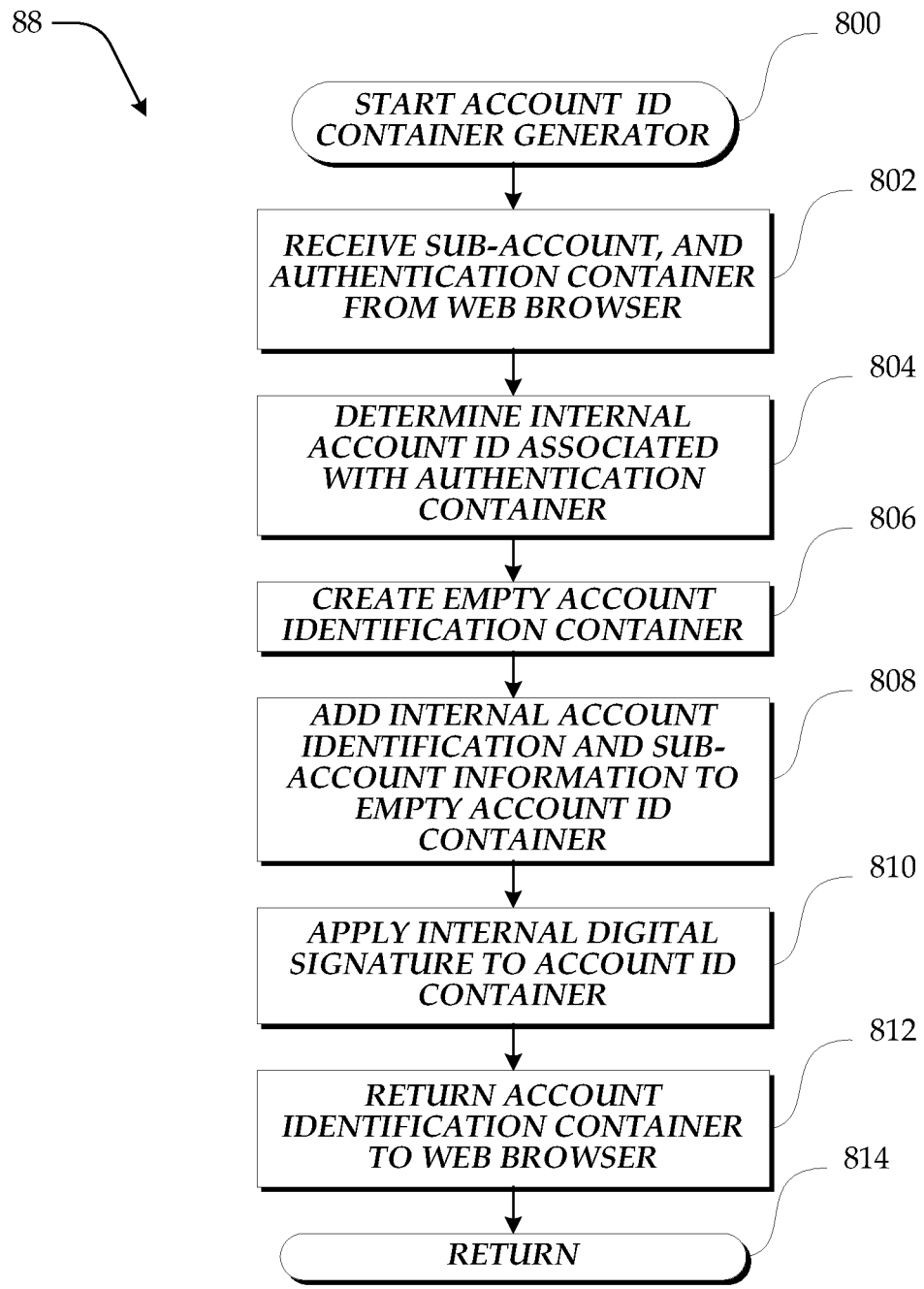
FIG. 17 a flow diagram illustrating the logic used by an account identification container generator of the commerce gateway shown in FIG. 5 to generate an account identification for a given transaction.

The logic of FIG. 17 begins in a block 800 and proceeds to a block 802 where the sub-account and authentication container are received from Web browser 64 of the buyer computer 50. The logic then proceeds to a block 804 where an internal account identification associated with authentication container is determined. An empty account identification container is then created in a block 806. Next, in a block 808, internal account identification and sub-account information is added to the empty account identification container. The logic then proceeds to a block 810 where an internal digital signature is applied to the account identification container. For example, message digest logic can be used by applying an algorithm that takes a variable length message and produces a fixed length digest as output using a one-way hashing algorithm that establishes the message as cryptographically secure. Finally, the account identification container is returned to the Web browser 64 in a block 812. The logic of FIG. 17 then ends at a block 814, and processing returns to FIG. 12.

Returning to FIG. 12, after the sub-account and authentication container are sent to the commerce gateway 52, the logic then proceeds to a block 234 where the logic waits to receive the account identification container from the account identification container generator component 88 of the commerce gateway 52. Once the account identification container is received from the commerce gateway 52, the logic proceeds to a block 238 where a purchase request is sent to the commerce engine 75 in the form of a request and account identification container for processing as shown in FIG. 18 and described next.

The commerce engine 75 is the component of the seller server 51 that determines whether or not the order will be processed and whether the requested product will ultimately be provided to the buyer. It will be appreciated that commerce engines are well known in the art. The commerce engine component 75 used in conjunction with the commerce gateway adapter component 76 allows the virtual payment system of the present invention to expand existing technology that is currently used for traditional credit systems to encompass the virtual payment account of the present system. It will be further appreciated that while the embodiment shown and described modifies the commerce engine to achieve this functionality (which may be possible through existing API calls of the commerce engine), other embodiments are possible. This expanded commerce engine functionality is shown in FIG. 18.

Figure 18:
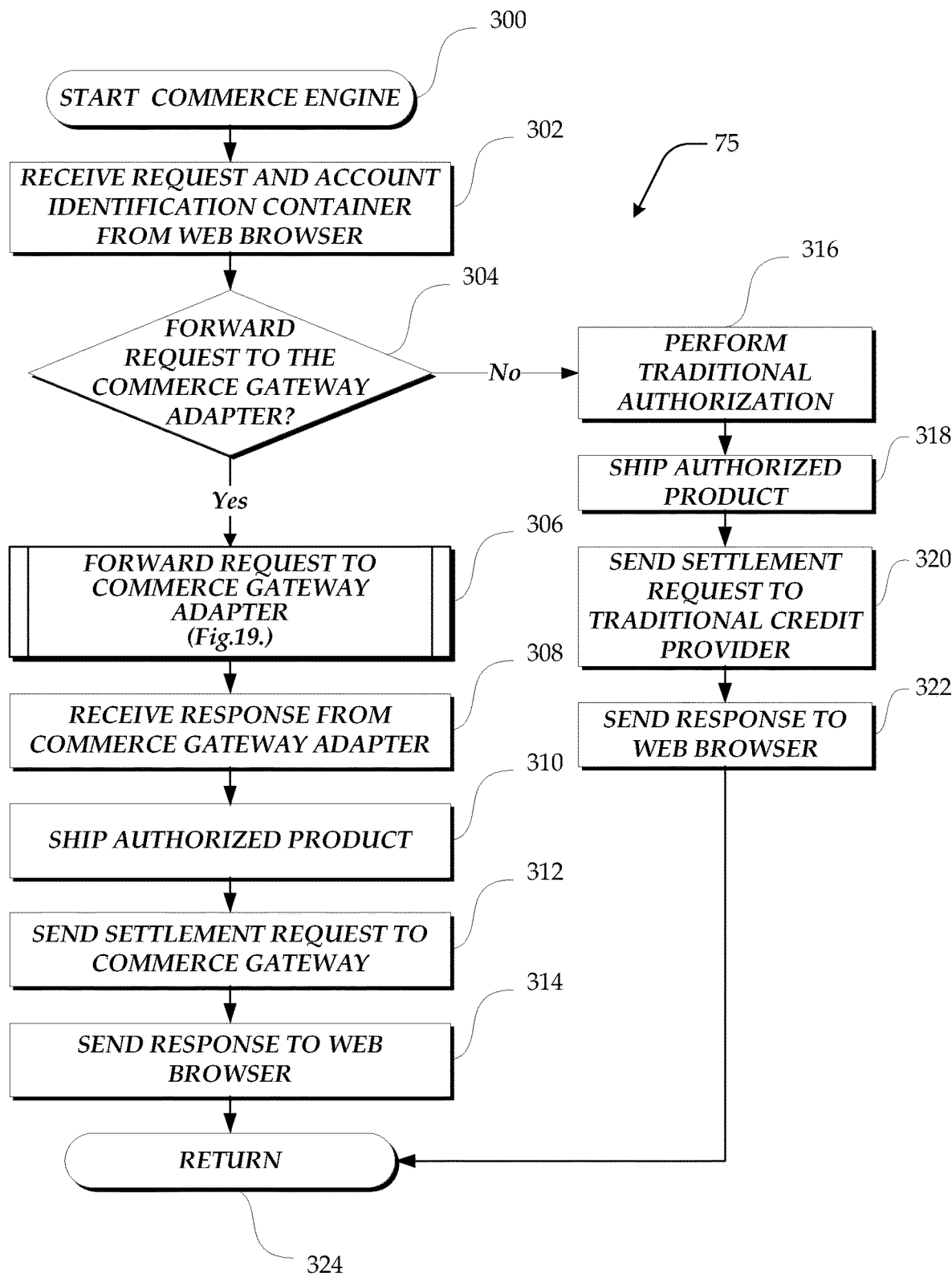
FIG. 18 is a flow diagram illustrating the logic used by a commerce engine of a seller computer shown in FIG. 4 to provide for the ordering, shipment and payment of goods, services and/or content over the Internet.
Figure 19:
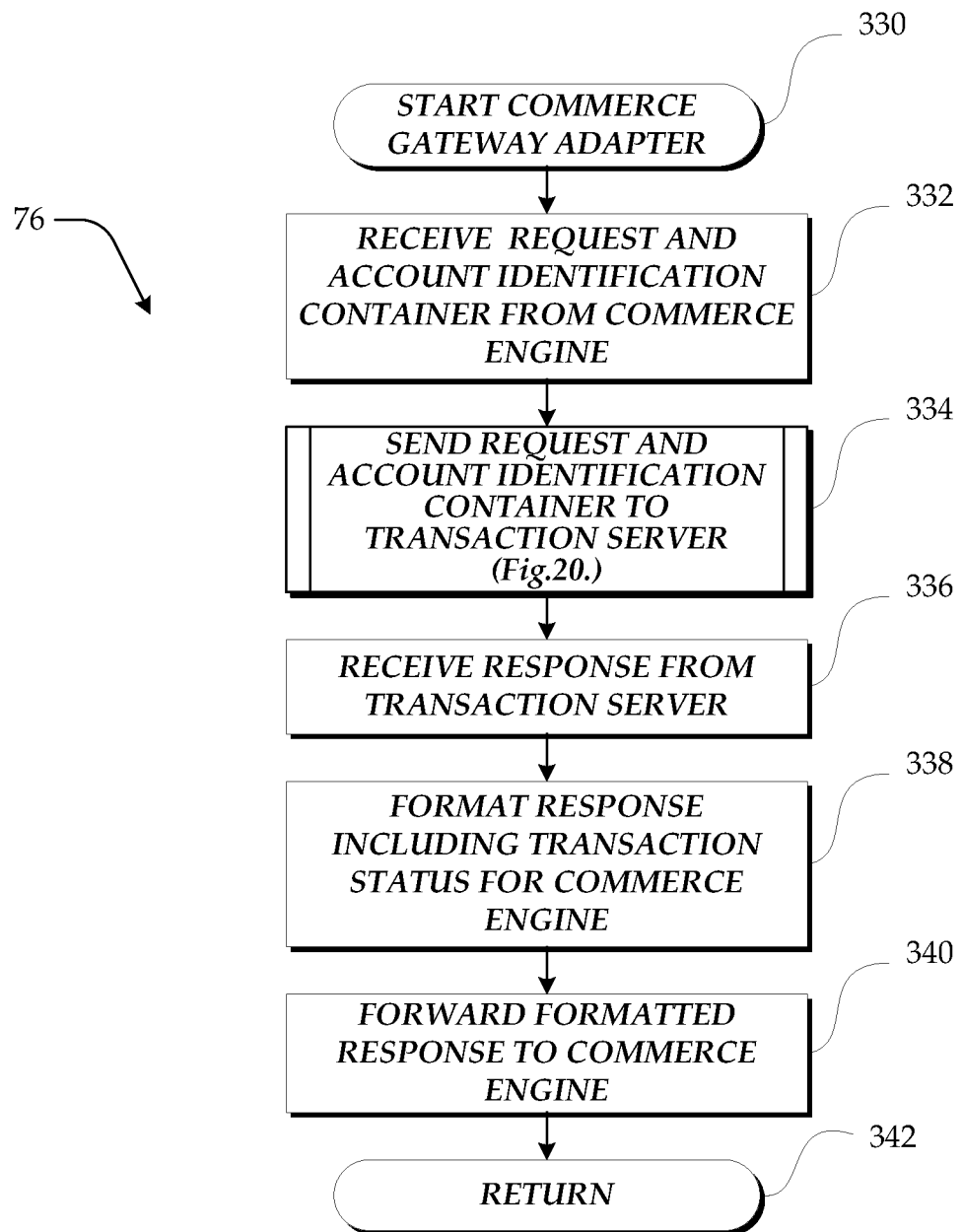
FIG. 19 is a flow diagram illustrating the logic used by a commerce gateway adapter of the seller server shown in FIG. 4 to allow a commerce engine to communicate with a transaction server on the commerce gateway.

The logic of FIG. 18 begins in a block 300 and proceeds to a block 302 where a purchase request and account identification container are received from the Web browser 64 of the buyer computer 50. The logic then proceeds to a decision block 304 where a test is made to determine whether the purchase request should be forwarded to the commerce gateway adapter 76. If the purchase request is to purchase products using a virtual payment account, the request should be forwarded to the commerce gateway adapter 76 for processing in accordance with the virtual payment system of the present invention. In another embodiment, only the request (without the account identification container) is received from the Web browser in block 302, and if it is determined in decision block 304 that the purchase request should be forwarded to the commerce gateway adapter 76, the account identification is then obtained from the Web browser 64. In either case, if it is determined in decision block 304, that the purchase request should be forwarded to the commerce gateway adapter 76, the logic proceeds to a block 306 where the request is forwarded to the commerce gateway adapter. The commerce gateway adapter 76 is shown in more detail in FIG. 19 and described next.

Figure 20:
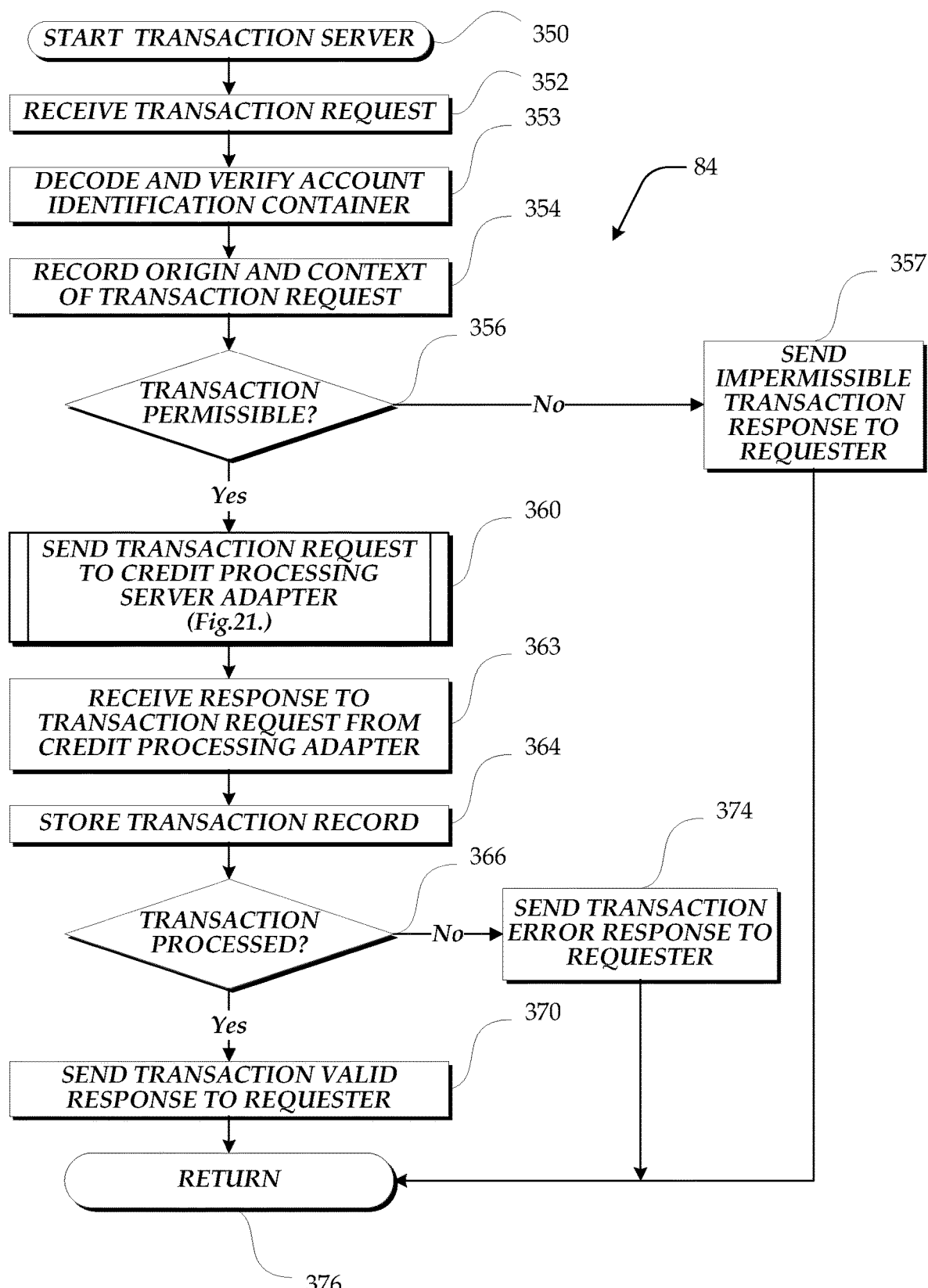
FIG. 20 is a flow diagram illustrating the logic used by the transaction server of the commerce gateway shown in FIG. 5 to process an order for goods, services and/or content over the Internet using a virtual payment account.

The commerce gateway adapter 76 is a component residing on the seller server 51 that allows the seller server to communicate directly with the transaction server component 84 of the commerce gateway 52 in order to expand the authorization function of the commerce engine 75 to include virtual payment account transactions. Accordingly, the logic of FIG. 19 begins in a block 330 proceeds to a block 332 where the forwarded purchase request and account identification container are received from the commerce engine 75. Next, in a block 334 the purchase request and account identification container are sent to the transaction server 84 in the form of a transaction request for further processing as shown in FIG. 20 and described next.

The transaction server component 84 of the commerce gateway 52 is responsible for interfacing with the other components of the system and determining whether or not a requested transaction should be applied to a buyer's virtual payment account. The logic of FIG. 20 begins in a block 350 and proceeds to a block 352 where the transaction request is received. Next, in a block 353 the account identification container is decoded and verified. The origin or source of the request as well as the context, i.e., date and time, of the request are then recorded in memory 83 of the commerce gateway 52 in a block 354. Next, the logic proceeds to a decision block 356 where a test is made to determine whether the requested transaction is permissible. A variety of factors can be considered in making the determination of whether a requested transaction is permissible. For example, spending limit cannot be exceeded, and user-imposed limitations, such as those put on a young shopper account, e.g., sites from which the young shopper can make purchases and hours during which the young shopper can make purchases as shown in FIG. 9C, cannot be violated.

If the transaction is not permissible, the logic proceeds to a block 357 where an impermissible transaction message is sent to the requester (e.g., the commerce gateway adapter 76 in the context of a purchase request). The logic of FIG. 20 then ends in a block 376. If, however, the transaction is permissible, the logic proceeds from decision block 356 to a block 360 where the transaction request is sent to a credit processing server adapter 86 for further processing as shown in FIG. 21 and described next.

The credit processing server adapter 86 is the component residing on the commerce gateway 52 that allows commerce gateway 52 components, such as the transaction server 84 and the enrollment server 89 to communicate directly with the various sub-systems of the credit processing server 53, which provide for the application of the requested transaction to the buyer's actual payment account. Accordingly, the logic of FIG. 21 begins in a block 380 and proceeds to a block 382 where the request is received. For example, a purchase authorization request or a refund request is received from the transaction server 84 and a credit information request is received from the enrollment server 89. The request is then formatted to be compatible with the appropriate credit processing sub-system, i.e., the account/billing sub-system 94, the payment processing sub-system 95 and/or the account enrollment sub-system 96, on the credit processing server 53 in a block 384. Next, the logic proceeds to a block 386 where the formatted request is then sent to credit processing server 53 for processing by the appropriate credit processing sub-system, as shown in FIG. 22 and described next.

Figure 22:
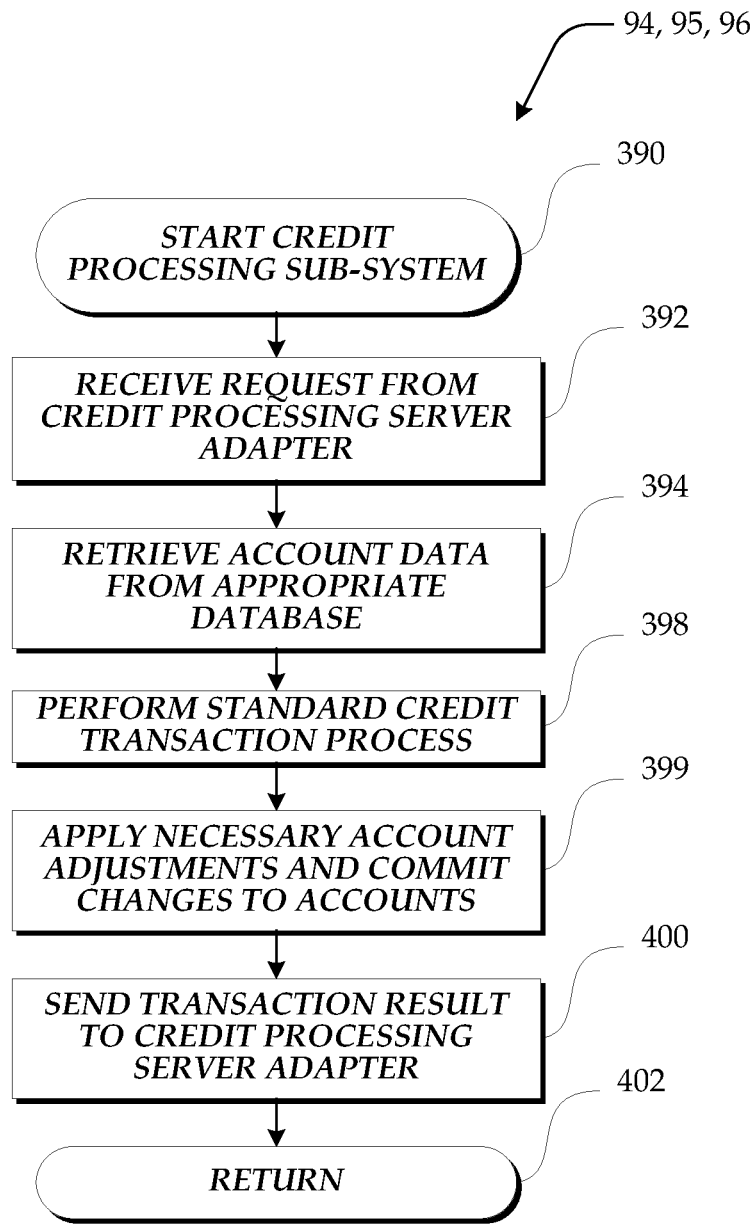

For any credit processing sub-system, the logic of FIG. 22 begins in a block 390 and proceeds to a block 392 where the transaction request is received from the credit processing server adapter 86. Next, account data and sub-account data are retrieved in blocks 394 and 396, respectively from the appropriate database, e.g., account database 97 and financial database 98. Standard credit transaction processing is then performed in a block 398. Examples of standard transactions for the account/billing sub-system 94 include: creating and maintaining accounts, including holding account information and account holder information, such as name and address; calculating interest; calculating minimum monthly payments; generating electronic monthly statements; and calculating other charges, known as discounts. The discount is the portion of the transaction amount that will go to the provider of the commerce gateway 52, and can be determined on a fixed amount per transaction basis, or a percentage of transaction amount basis. Examples of standard transactions for the payment processing sub-system 95 include: collecting payments from buyers and applying the payments to the buyer's account; transferring funds between sellers and buyer, for example by interfacing with financial institutions 59 for ACH transactions. Examples of standard transactions for the account enrollment sub-system include: obtaining credit information from credit bureaus; providing the credit information to the commerce gateway 52 for scoring; determining a credit score based on the credit information and providing the score to the commerce gateway; and providing scoring information to the account/billing sub-system 94 for account creation.

The logic then proceeds to a block 399 where necessary account adjustments are applied, if applicable. For example, the account balance will be reduced by the amount of an authorized purchase transaction. In one embodiment of the present invention, reward points are accrued at the time of purchase, but committed later, for example during the periodic, e.g., monthly, statement preparation process. Alternatively, reward points may not accrue until payment is made for the product to which the points are attributed. Next, the transaction result, such as the credit information or the purchase authorization, is sent to the credit processing server adapter 86 in a block 400. The logic of FIG. 22 then ends in a block 402 and processing returns to FIG. 21.

Returning to FIG. 21, the result of the transaction request is received from the credit processing sub-system 94, 95 or 96 in a block 387. Next, in a block 388, the result is then returned to requester, e.g., the result of a purchase authorization request is returned to the transaction server 84 and credit information, for example, a credit limit, is returned to the enrollment server 89 in response to request for a credit information request to be used for establishing a buyer's account. The logic of FIG. 21 then ends in a block 389 and processing returns to the requester, e.g., transaction server 84 (FIG. 20) or enrollment server 89 (FIG. 16).

Returning to FIG. 20, once the transaction server receives the response to its transaction request, e.g., authorization result of a purchase request, from the credit processing adapter in a block 363, the logic proceeds to a block 364 where the transaction record, for example purchase information including amount of purchase, is stored in memory 83 of the commerce gateway 52. The logic then proceeds to a decision block 366, where a test is made to determine if the transaction was successfully processed. If so, the logic proceeds to a block 370 where a transaction response with a valid status is then sent to the requester (e.g., the commerce gateway adapter 76 or the Web browser 64, whichever the case may be). If the transaction was not successfully processed, the logic proceeds from decision block 366 to a block 374 where a transaction response with an error status is then returned to the requester in a block 376.

After a valid transaction response 370, an error transaction response 374, or an impermissible transaction response 357 is sent to the requester, the logic of FIG. 20 ends in block 376 and processing returns to the requester. In the case of a purchase request, the requester is the commerce gateway adapter 76. In one exemplary embodiment, a record of all transactions is stored in the financial database 98.

Returning to FIG. 19, after the response to the purchase request made by the commerce gateway adapter 76 is received from the transaction server in a block 336, the logic proceeds to a block 338 where the response including the transaction status is formatted to be compatible with the commerce engine 75. The formatted response is then forwarded to the commerce engine in a block 340. The logic of FIG. 19 then ends in a block 342 and processing returns to the commerce engine 75 in FIG. 18.

Figure 41:
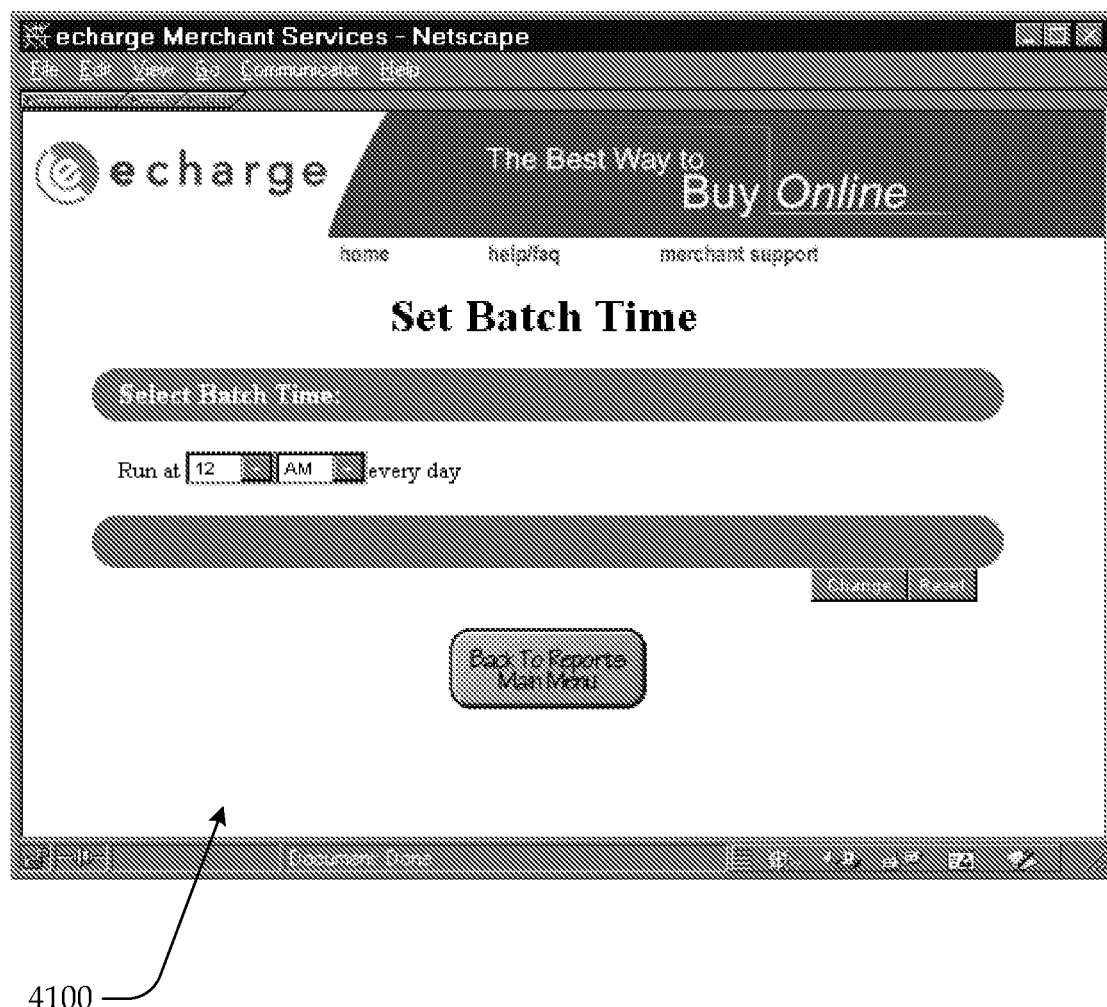

Returning to FIG. 18, once a response is received by the commerce engine 75 from the commerce gateway adapter 86 in a block 308, the authorized and ordered product is shipped to the buyer in a block 310. It will be appreciated by those of ordinary skill in the art that if the ordered product is capable of being downloaded, e.g., the product is an electronically stored good, a URL for a premium content Web site, etc., the product will simply be transferred by the seller server 51 to the buyer computer 50. Otherwise, the product will be shipped or provided by more traditional methods, e.g., regular mail, hand delivery, etc. Once shipment is complete, the logic then proceeds to a block 312 where a settlement request is sent to the commerce gateway 52 in order to initiate movement of funds. In an actual embodiment of the present invention, the seller submits the transaction into a settlement batch for payment when the settlement batch for that seller is next processed. The timing of the processing could be that night or at a later date based on the contract, i.e., terms of the purchase transaction. FIG. 41 illustrates an exemplary Web page 4100 for designate when batches should be processed. Settlement transactions are described in FIG. 24 in more detail below with reference to FIG. 24.

Returning to FIG. 18, in a block 314, a response confirming fulfillment of the order is sent to the Web browser 64 of the buyer's computer 50. The logic of FIG. 18 then ends in a block 324.

However if at decision block 304, it is determined that the purchase request should not be forwarded to the commerce gateway 52; the logic proceeds to a block 316 where standard commerce engine processing is performed. More specifically, in block 316 traditional credit or debit card authorization is performed such as approval or denial for the use of a credit card, e.g., VISA® or MASTERCARD®, for the specified purchase amount. Next, the authorized goods are shipped in a block 318. The logic then proceeds to a block 320 where a settlement request is sent to the traditional credit provider, e.g., VISA® or MASTERCARD®. A response confirming fulfillment of the order is then sent to the Web browser 64 of the buyer computer 50 in a block 322. The logic of FIG. 18 then ends in block 324 and processing returns to FIG. 12.

Returning to FIG. 12, once the Web browser 64 of the buyer computer 50 receives a response to its purchase request in a block 240, the logic proceeds to a block 241 where an order confirmation Web page 1190 is displayed as shown in FIG. 11E. The logic of FIG. 12 then ends in block 242.

Figure 23:
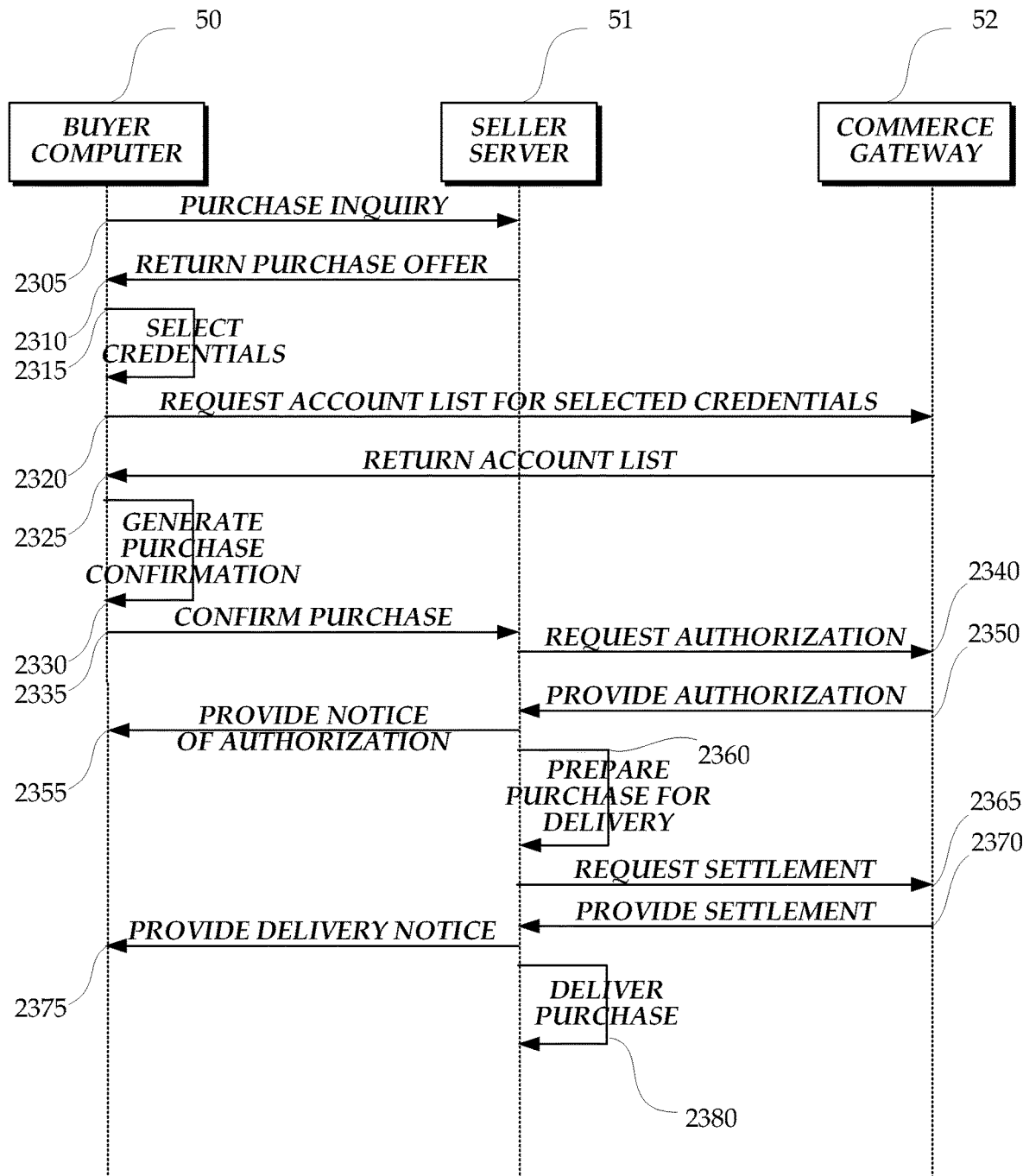
FIG. 23 is a diagram illustrating the actions taken by the buyer's computer, the seller server and the commerce gateway to order goods, services and/or content using the virtual payment account.

FIG. 23 is a diagram illustrating the actions taken by the buyer's computer 50, the seller server 51 and the commerce gateway 52 for ordering products using a virtual payment account system. This diagram presents a high-level view of the detailed processing shown in the flow charts described above. In response to an inquiry into purchasing a product 2305, a seller returns a purchase offer 2310 to the buyer's computer 50. At this point, the buyer has the option of beginning the purchasing process as shown in FIG. 12. To continue the buyer authenticator 65 checks to see which credentials, e.g. certificates, are available to the buyer and selects all available credentials to be used by the commerce gateway 2315 to authenticate the buyer. The buyer computer 50 then requests a list of all accounts or sub-accounts 2320 for these credentials from the commerce gateway 52. The commerce gateway 52 returns only those accounts that are usable by the buyer 2325 using the selected credentials. The buyer computer 50 then generates a purchase confirmation 2330 using one of the accounts on the list returned from the commerce gateway 52. Buyer computer 50 then sends the purchase confirmation 2335 to the seller server 51. The seller server 51 requests authorization 2340 from the commerce gateway to verify that the purchase confirmation is valid. The commerce gateway then returns an authorization 2350 that the purchase confirmation is valid. The seller server 51 may then notify 2355 the buyer computer 50 that the purchase confirmation was authorized. The seller server then prepares the purchase for delivery 2360. At this point, the seller may request a settlement transaction 2365 from the commerce gateway 52, which would then provide a settlement transaction 2370 back to the seller server 51. The seller server 51 may then notify 2375 the buyer computer 50 of delivery details. Finally, the good(s) or service(s) that the buyer purchased are delivered 2380.

If the seller is an auction Web site, the authorization 2340 sent by the commerce gateway 52 to the seller server 51 includes information such as a buyer account identification, a seller identification, a seller sale offering, a buyer authentication, a seller authentication, and a master identification, i.e., identification of the commerce gateway 52 provider. Particular to this type of response is an expiration date/time that is used to signal the shorter of the maximum times that the buyer and the seller are willing to "reserve" funds associated with this transaction. If the transaction, i.e., settlement request 2365, is not received by the commerce gateway 52 before the expiration date/time of the transaction, the products and/or funds will be released back to their owners. At a later time, once the buyer has committed to the purchase, the buyer releases an authorization to the provider of the commerce gateway 52 knowing that the seller has proven ability to ship the products on demand without delay. This initiates the actual settlement of funds and triggers payment to the seller in the next settlement batch, without any further interaction with the seller. This payment method supports buyer-initiated, pre-approved purchases with expiration date/time, such as auction and gift-certificate purchases.

It will be appreciated that FIG. 23 illustrates processing of a valid purchase transaction. If there is an error at any time during the processing, e.g., buyer is not authorized because he or she is not a registered buyer, has exceeded his or her spending limit, etc., processing will terminate after an appropriate error response has been returned to the buyer computer 50 for display to the buyer via the Web browser 64.

Settlement Transaction

Figure 24:
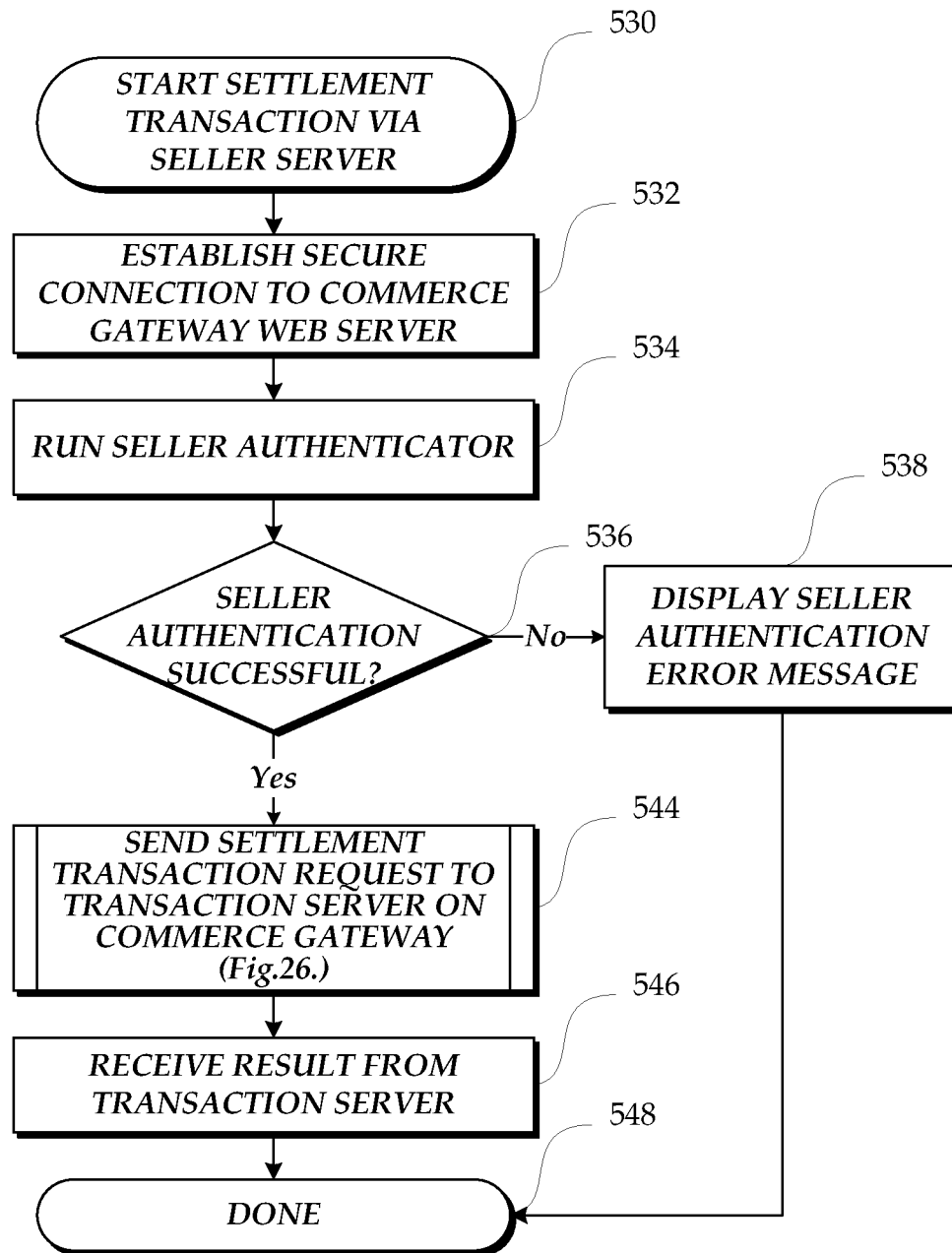
FIG. 24 is a flow diagram illustrating the logic used by the seller's computer to perform a settlement transaction, i.e., initiate transfer of funds.

When a seller establishes a seller account, a contract is formed defining the relationship between the seller and the commerce gateway provider. That contract defines the terms, such as when payments will be funded and what fee shall be given to the commerce gateway provider. The commerce gateway fee can be a per transaction fee or a percentage fee based on the amount of a transaction. The logic for settlement transactions for a virtual payment account is similar to the logic used for processing standard credit card settlement transactions. After the seller ships the product, the seller sends a settlement transaction to the commerce gateway 52 as shown in FIG. 24. It will be appreciated that the logic performed by the seller server 51 can be performed by the commerce engine component 75, or some other component, for example, a Web browser (not shown) residing on the seller server 51.

FIG. 24 illustrates the logic implemented by seller server 51 when the seller wishes to perform a settlement transaction. The logic begins in a block 530 and proceeds to a block 532 where a secure connection between the seller computer 51 and commerce gateway 52 is established, using the same logic shown and described with reference to the buyer in block 222 of FIG. 12. The logic then proceeds to a block 534 where the seller authenticator process is run. The seller authenticator process is similar to the buyer authenticator process shown in FIG. 13 and described above. Next, in a decision block 536 a test is made to determine if the seller is a registered participant (i.e., seller's digital certificate was issued by the commerce gateway provider, seller's digital certificate has not expired and seller's digital certificate has not been revoked). If not, the logic proceeds to a block 538 where a seller authentication error message is displayed on the seller server display 72, for example, via a Web browser. The logic of FIG. 24 then ends in a block 548.

If the seller authenticator process is successful, the logic proceeds from decision block 536 to a block 544 where a settlement request is sent to the transaction server 84 on the commerce gateway 52. As shown and described in FIG. 25, the transaction server 84 forwards the request to the credit processing server adapter 86, which in turn forwards the transaction request to the appropriate credit processing subsystem. In the case of a settlement transaction request, the payment processing sub-system 95 processes the transaction. The payment processing sub-system forwards the settlement request to the financial institution 59. The financial institution funds the transactions into the commerce gateway provider's account. The commerce gateway provider takes its percentage and pays the sellers their portion. The financial institution 59 waits for their billing cycle, e.g., monthly, and then charges the buyers for their purchases plus interest charges. The financial institution waits for the buyer payments. If the buyer does not pay, standard late payment processing, such as late notices, finance charges, etc. is performed.

Figure 25:
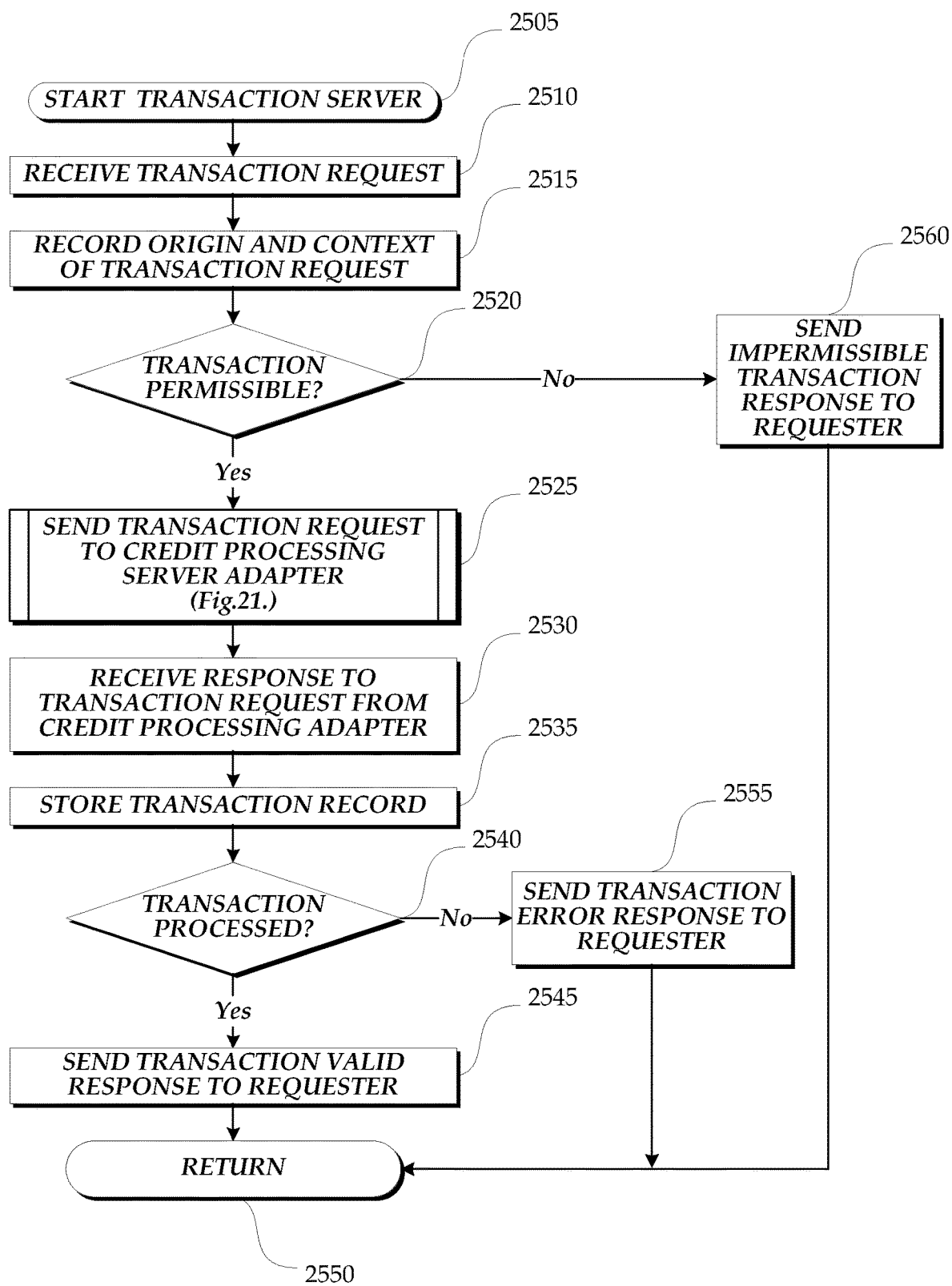
FIG. 25 is a flow diagram illustrating the logic used by the transaction server of the commerce gateway shown in FIG. 5 to process a settlement transaction.

The logic of FIG. 25 begins in a block 2505 and proceeds to a block 2510 where the settlement request is received. The origin or source of the settlement request as well as the context, i.e., date and time, of the request are then recorded in memory 83 of the commerce gateway 52 in a block 2515. Next, the logic proceeds to a decision block 2520 where a test is made to determine whether the requested settlement is permissible. A variety of factors can be considered in making the determination of whether a requested settlement is permissible. Some factors might include a settlement request for a transaction that did not have a purchase confirmation from a buyer, that had a purchase confirmation from a buyer whose account did not hold sufficient funds, for an auction settlement whose time had expired or whose credentials were no longer valid. It will be appreciated that yet other factors may cause a settlement transaction to be impermissible. If the transaction is not permissible, the logic proceeds to a block 2560 where an impermissible settlement request message is sent to the requester, i.e., the seller, in this case. If, however, the transaction is permissible, the logic proceeds from decision block 2520 to a block 2525 where the transaction request is sent to a credit processing server adapter 86 for further processing as shown in FIG. 21 and described above. Continuing in FIG. 20, once the transaction server receives the response to its transaction request, e.g., authorization result of a settlement request, from the credit processing adapter in a block 2530, the logic proceeds to a block 2535 where a transaction record, for example purchase information including amount of purchase, is stored in memory 83 of the commerce gateway 52. The logic then proceeds to a decision block 2540, where a test is made to determine if the transaction was successfully processed. If so, the logic proceeds to a block 2545 where a transaction response with a valid status is then sent to the requester, i.e., the seller in this case. If the transaction was not successfully processed, the logic proceeds from decision block 2540 to a block 2555 where a transaction response with an error status is then returned to the requester.

After a valid transaction response 2545, an error transaction response 2555, or an impermissible transaction response 2560 is sent to the requester, the logic of FIG. 25 ends in block 2550 and processing returns to the requester.

Referring back to FIG. 24, after the transaction server 84 has processed the settlement transaction and provided the results of the settlement transaction to the seller's computer 51, the result of the settlement transaction is displayed on the seller's display 73, for example, via the seller server's Web browser. The logic of FIG. 24 then ends in block 548.

Refund Transaction

Figure 26:
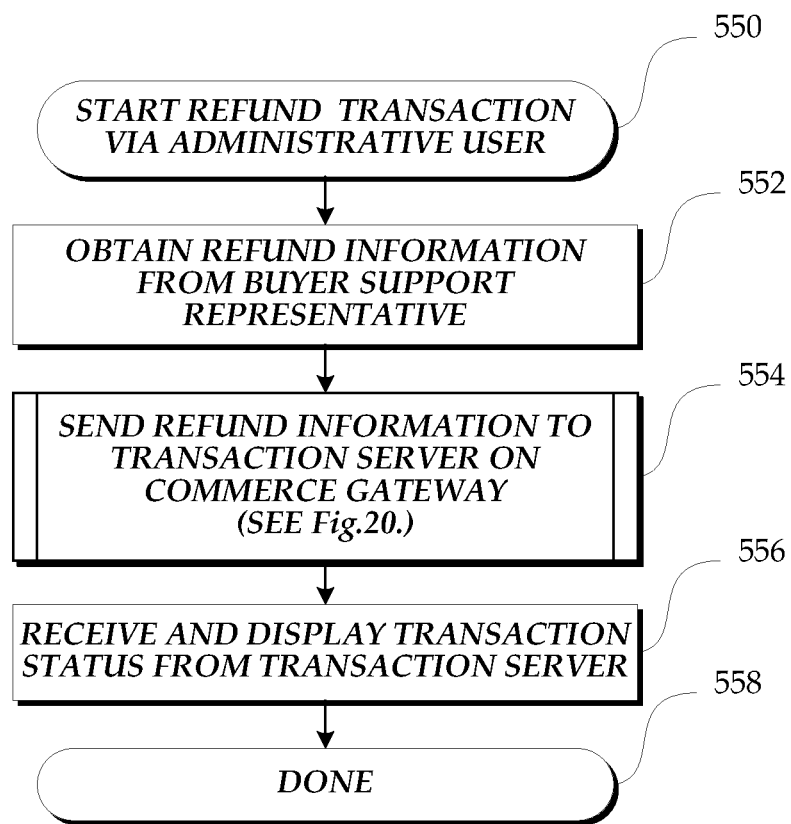
FIG. 26 is a flow diagram illustrating the logic used by the administrator's computer to initiate a refund to be applied to a virtual payment account in accordance with the present invention.

FIG. 26 illustrates the logic implemented by the present invention when a refund transaction is initiated, for example, when a buyer disputes a charge on his or her virtual payment account. As with any payment dispute, it must be determined whether the buyer will receive all or a portion of the disputed amount. This process is external to the virtual payment system of the present invention. The determination of whether the dispute has merit is determined by the seller. If the seller determines that the dispute has merit, the seller notifies a customer service representative and a refund transaction is initiated. In the embodiment shown in FIG. 26 and described herein, if it is determined that an amount disputed by a buyer is subject to a refund, a customer service representative initiates the refund, or chargeback transaction via the administrative computer 54 shown in FIG. 2. In one actual embodiment, the administrative computer is a "dumb terminal" by which the customer service representative enters information directly into the transaction server 84 on the commerce gateway 52. In another embodiment, the administrative computer may have a Web browser that allows the administrator to enter the information using Web pages available only on the LAN 44 behind the firewall 55, i.e., the buyer and seller do not have access to these administrative Web pages.

Referring to FIG. 26, the logic begins in a block 550 and proceeds to a block 552 where the refund information including account, sub-account and amount is obtained. The refund transaction information is then sent to the transaction server 84 by the administrative computer 54 in a block 554 in the form of a refund request. Transaction server 84 processing is shown and described with reference to FIG. 20.

As also noted above, in processing the refund request, the transaction server 84 will forward a transaction request to the credit processing server 53 for processing by the account/billing sub-system 94 as shown in FIG. 22. A refund applied to a buyer's virtual payment account causes the buyer's balance to decrease by the amount of the payment. Still referring to FIG. 26, after the transaction server 84 has processed the refund transaction, the result of the transaction processing is received and displayed by the administrative computer 54. The logic of FIG. 26 then ends in a block 558. Unlike the purchase transaction, the refund transaction is not initiated by the buyer via the Web browser 64; therefore, the buyer is notified by other means, for example by sending an e-mail message to the buyer's computer 50. It will also be appreciated that in yet other embodiments of the present invention, the seller server 51 may initiate the refund request as opposed to the administrative computer 54.

Buyer Account Management

Figure 10A:
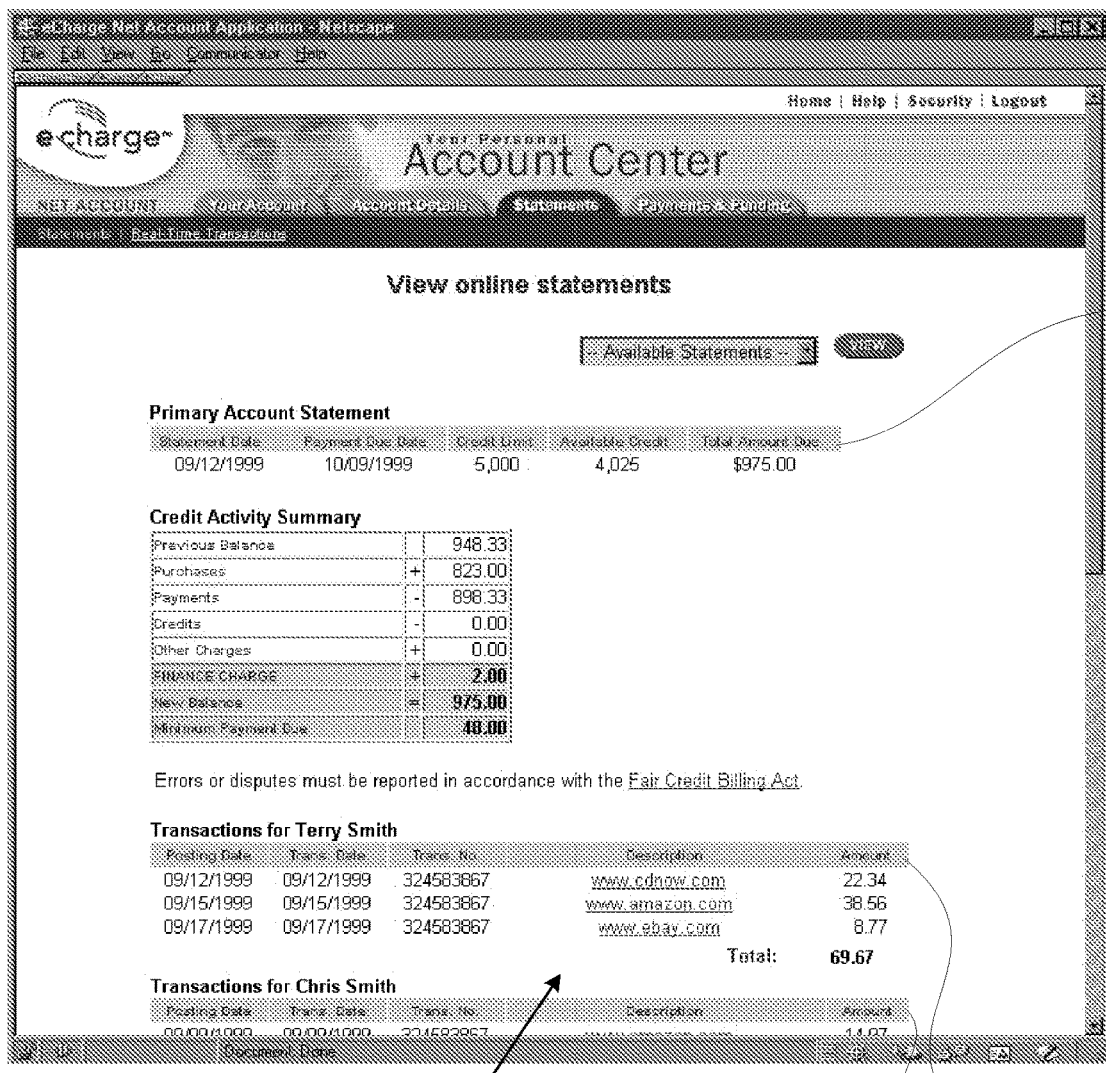
FIGS. 10A-10C are exemplary Web pages displayed on a buyer's computer containing account statements and reports for a buyer's virtual payment account in accordance with the present invention.
Figure 10B:
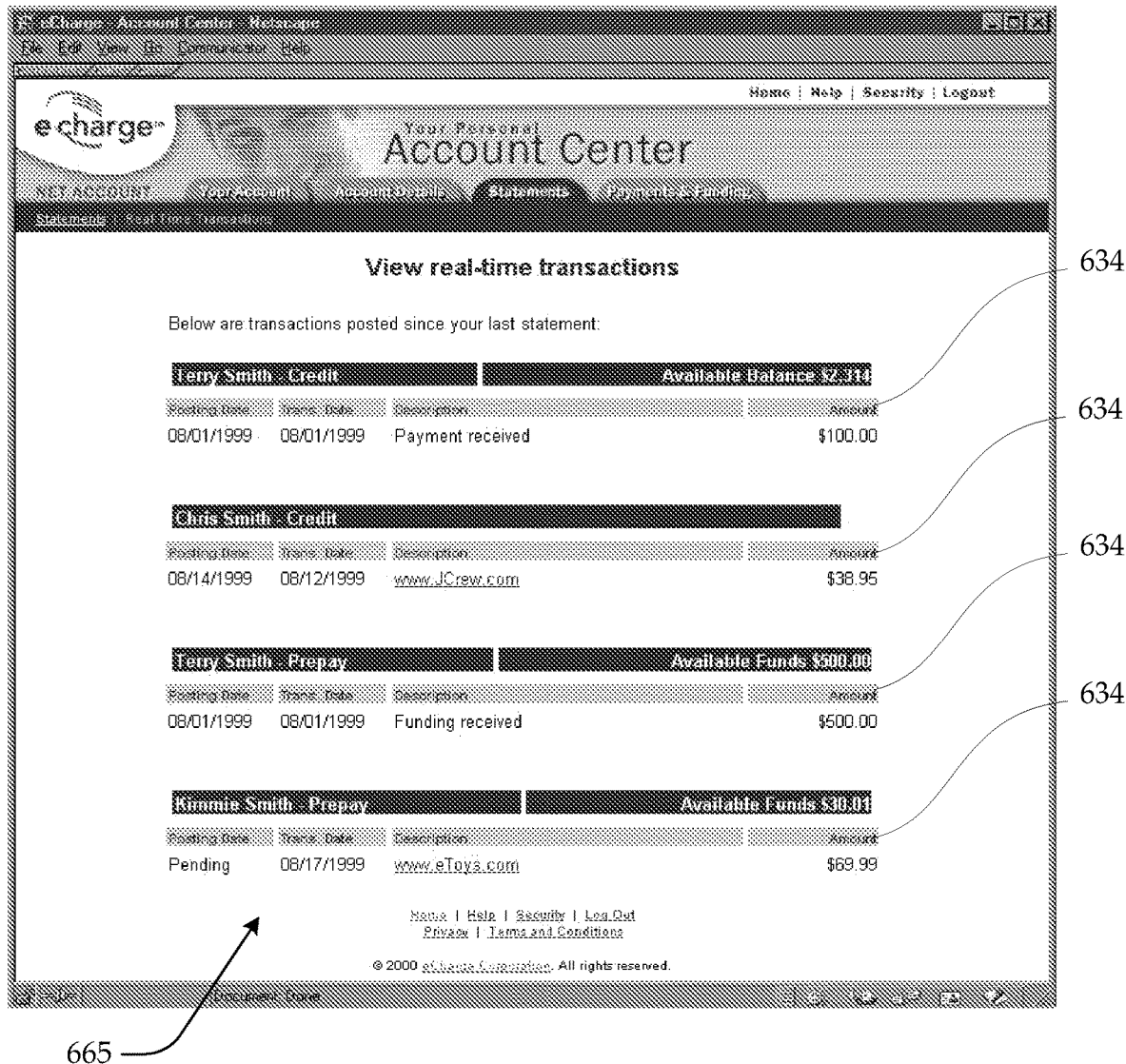
Figure 10C:
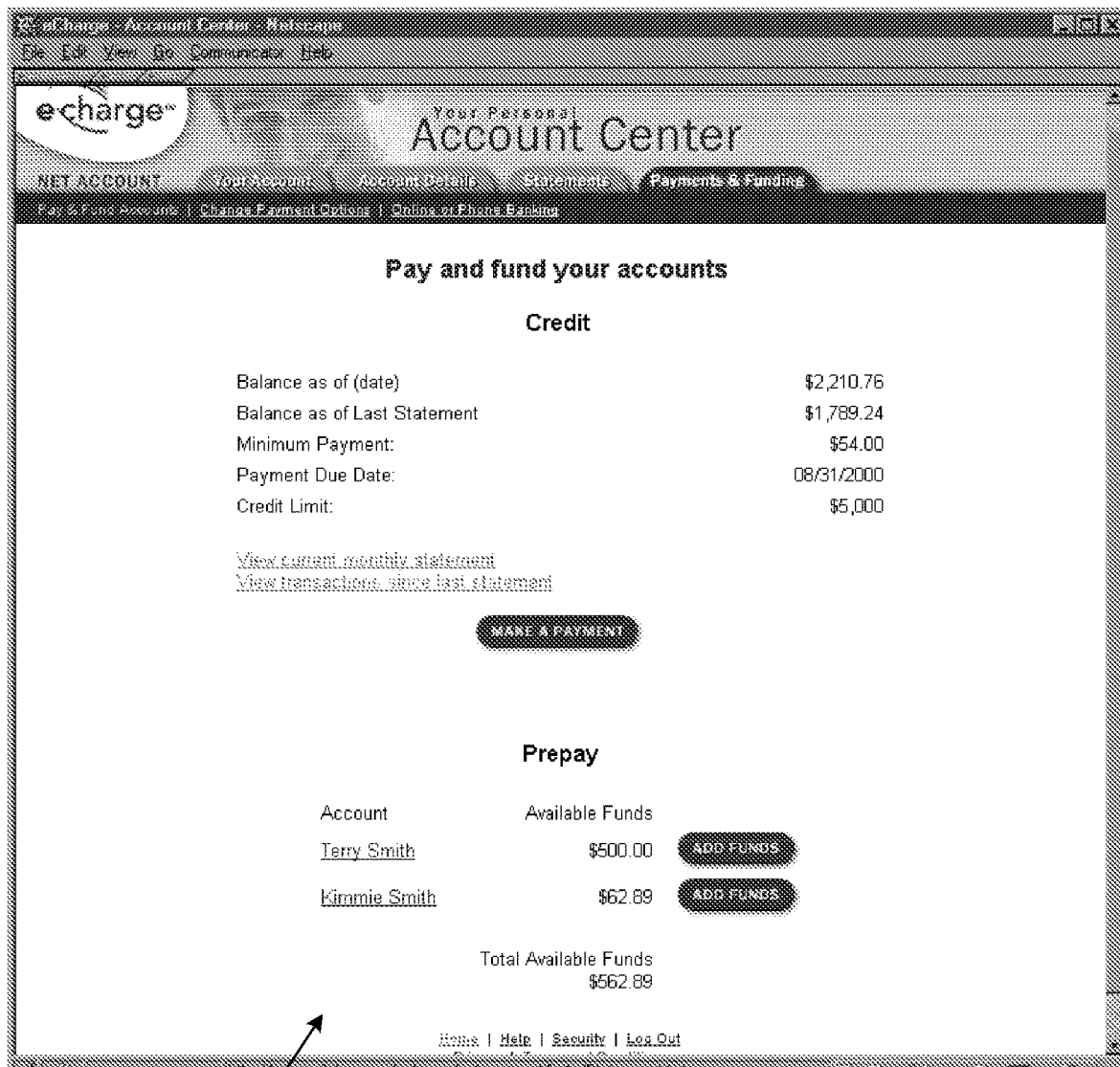

Other transactions normally associated with an account such as a standard credit card account are also applicable to the virtual payment account of the present invention. FIGS. 10A-10C illustrate some examples of Web pages used by a buyer with a virtual payment account. Processing of these transactions is similar to other transaction processing as illustrated in flow diagrams and described above, and therefore will not be discussed in further detail herein. FIG. 10A illustrates a Web page 660 containing details of a primary account 632 along with sub-accounts 634. FIG. 10B illustrates an exemplary Web page 665 summarizing the sub-accounts for a master account 634. FIG. 10C illustrates a transaction summary Web page 670 for the sub-accounts for a given master account.

Seller Reports

Figure 42:
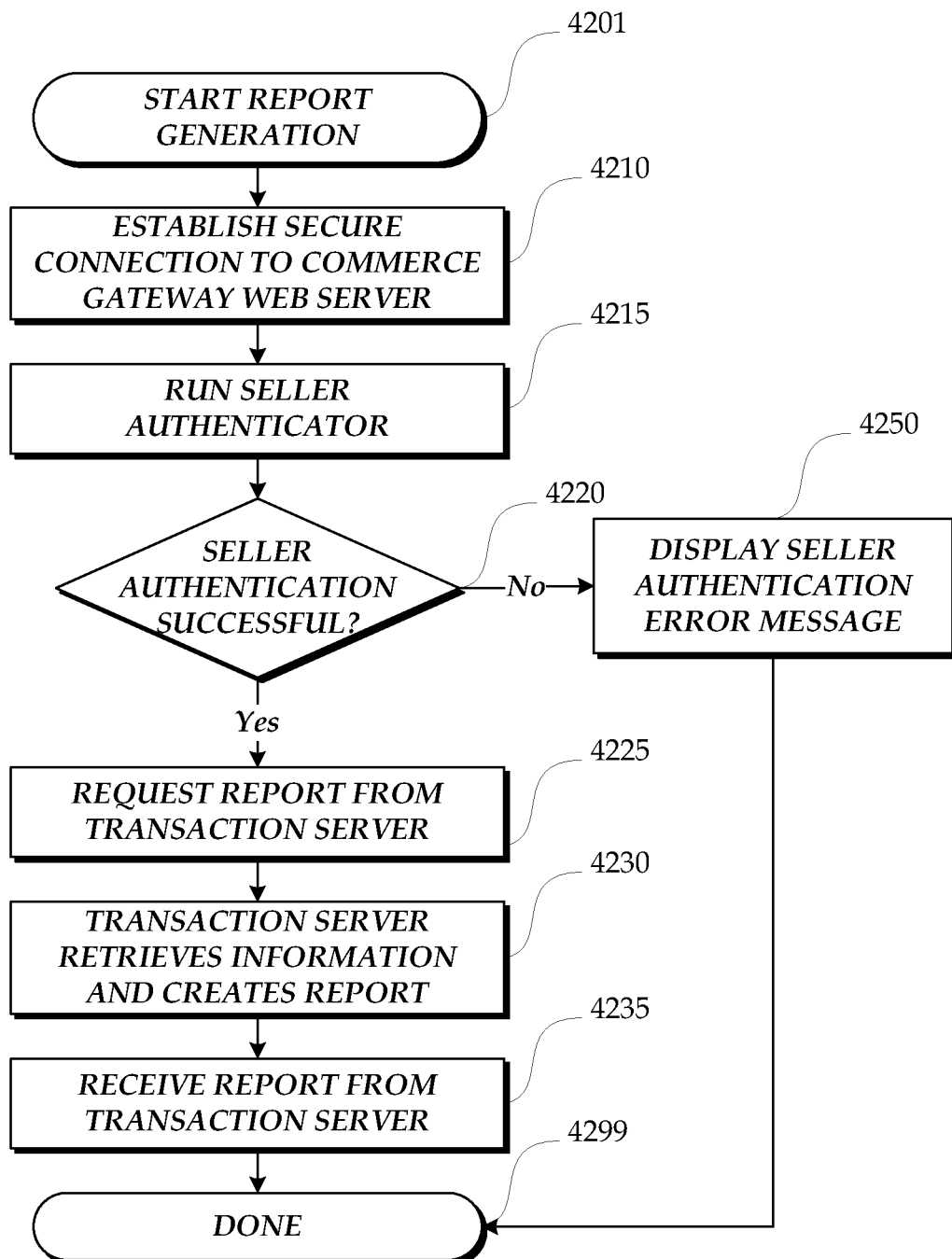
FIG. 42 is a flow diagram illustrating the logic used to authenticate a seller and generate a report for seller.

It is often desirable for seller's to have detailed reports available to judge the current state of their business. Accordingly, the present invention maintains records of transactions in readily retrievable formats. It is also desirable that competitors not have access to the same reports on the details of a seller's business. Accordingly, the present invention provides for secure authenticated access to a seller's reports. FIG. 42 illustrates the logic for generating seller reports. The logic starts at a block 4201 and proceeds to a block 4210 that establishes a secure connection between the seller computer 51 and the commerce gateway 52. The logic then proceeds to a block 4215 where the seller is authenticated much as the buyer authenticator illustrated in FIG. 13. The flow continues to a block 4220 where a test is performed to see if the seller has been authenticated. If the authentication was successful, the logic continues to a block 4225 where the seller requests the transaction server 84 to generate a report. At a block 4230 the transaction server retrieves relevant information and generates a report, which in a block 4235 is received by the seller computer for viewing by the seller. The logic ends in a block 4299.

In one actual embodiment of the present invention, the commerce gateway 52 requests report information from the credit processing server 53, in particular from the financial database 98 stored on the credit processing server. It will be appreciated by those of ordinary skill in the art, that a financial database may be used to store information for report generation, yet may also store information relevant for other purposes.

Figure 31:
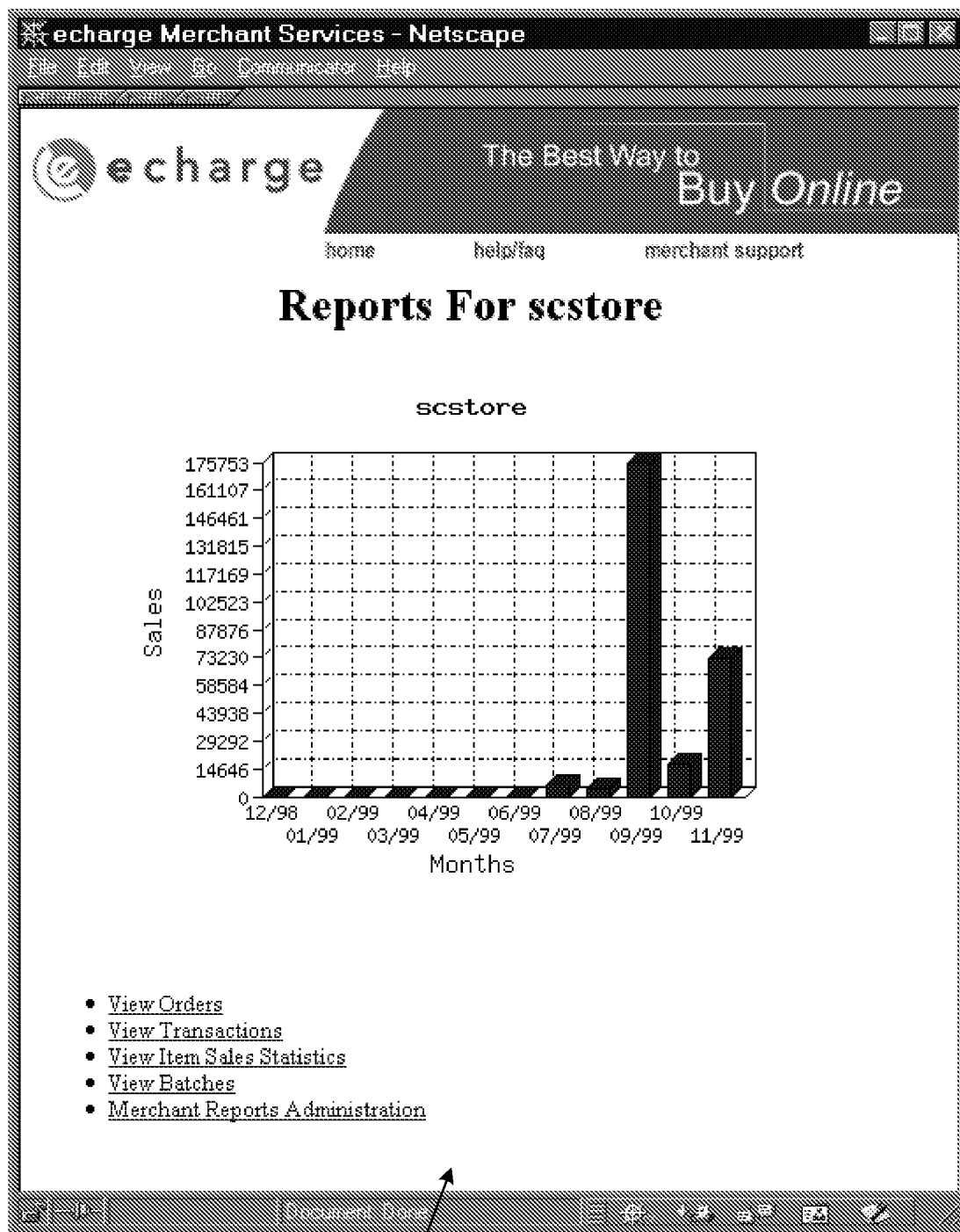
Figure 32:
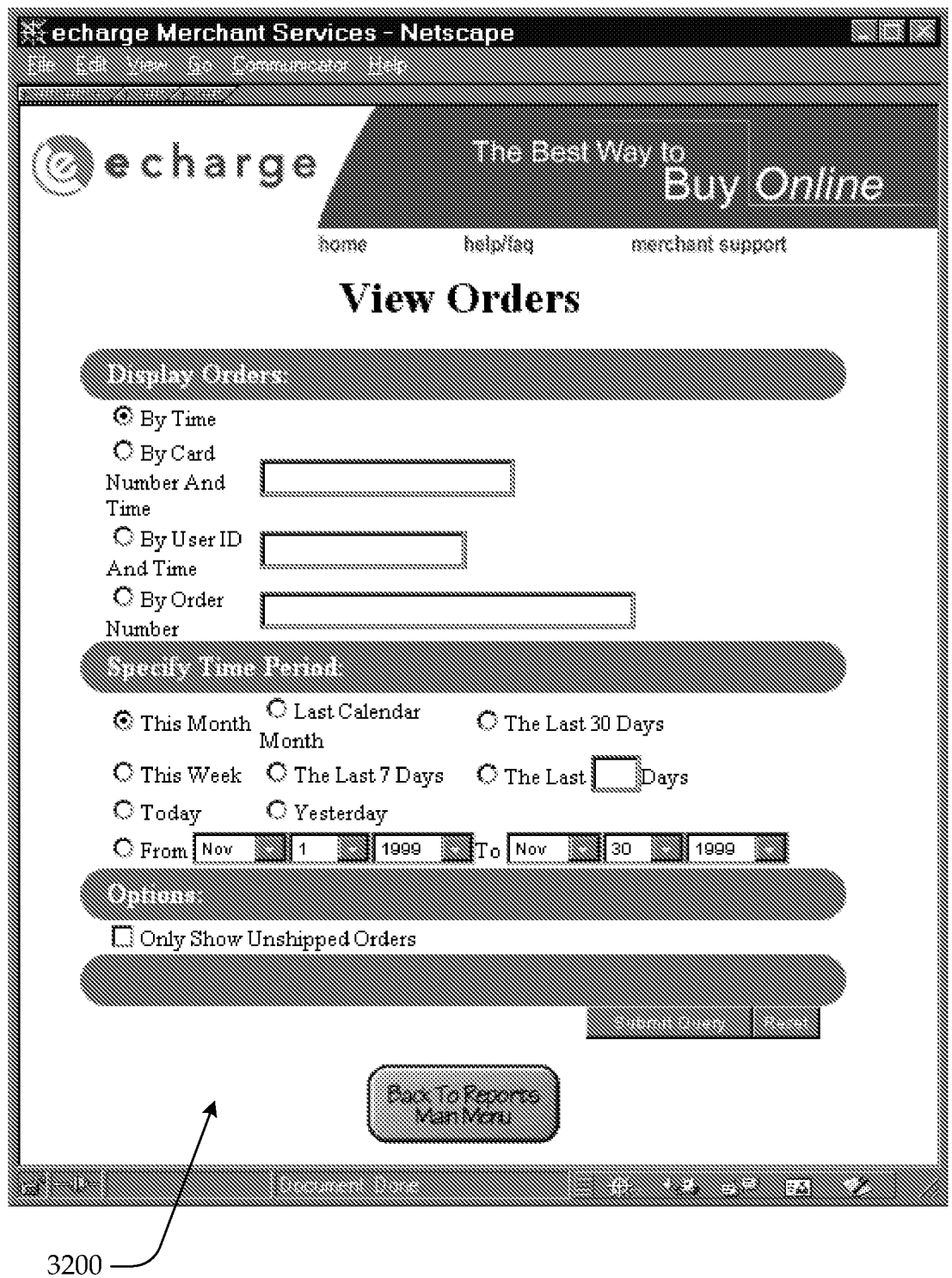
Figure 33:
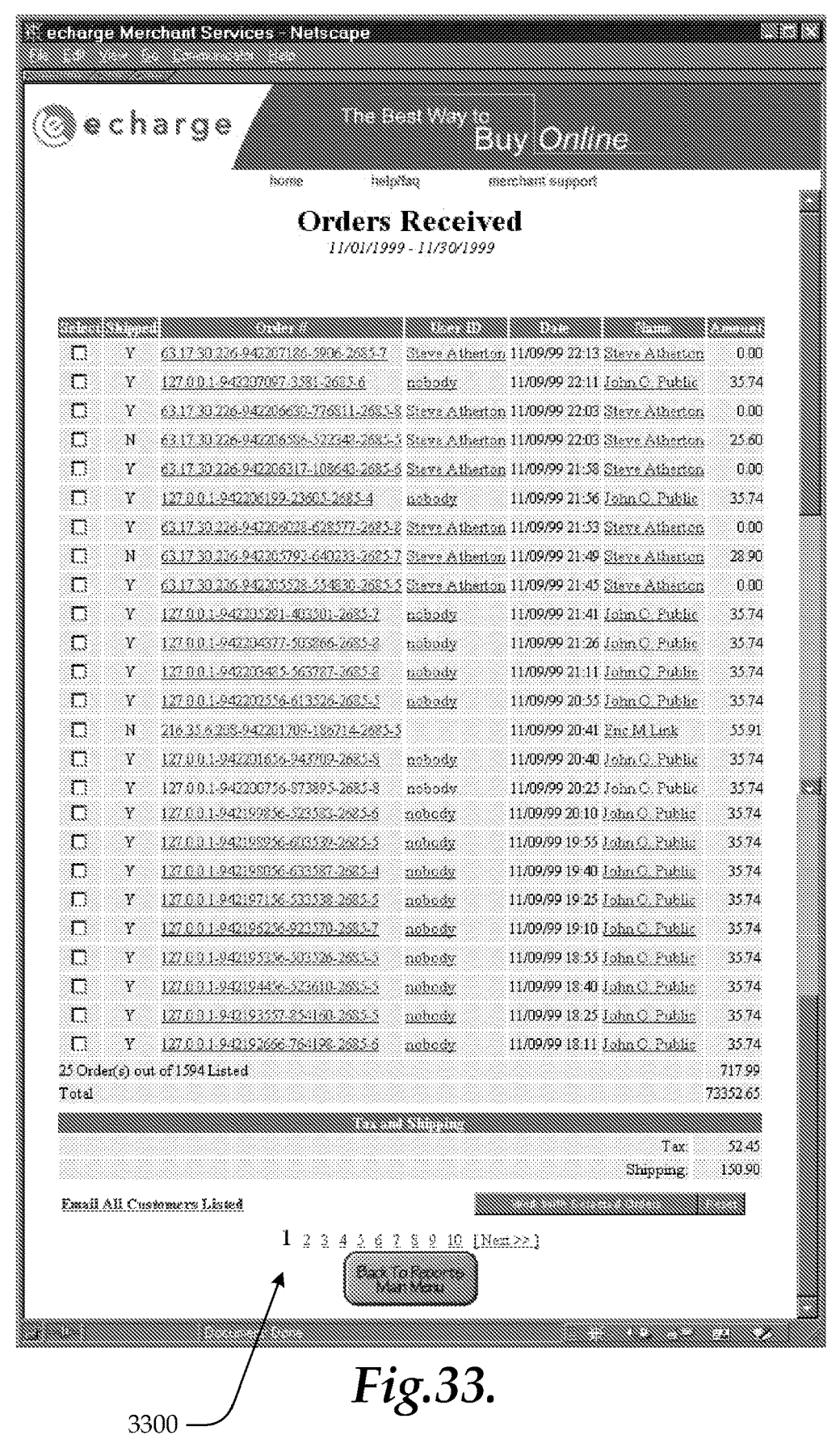
Figure 34:
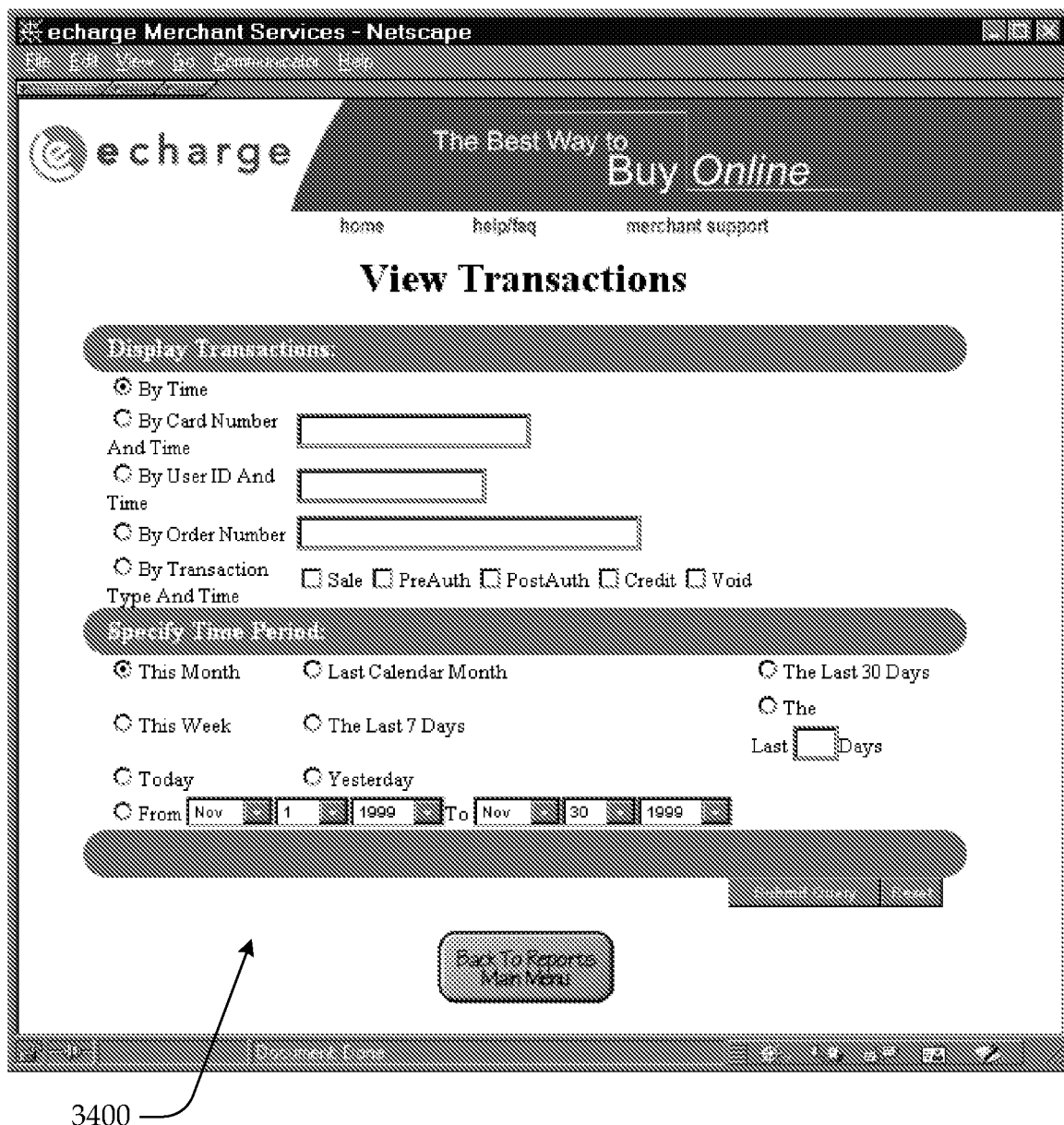
Figure 36:
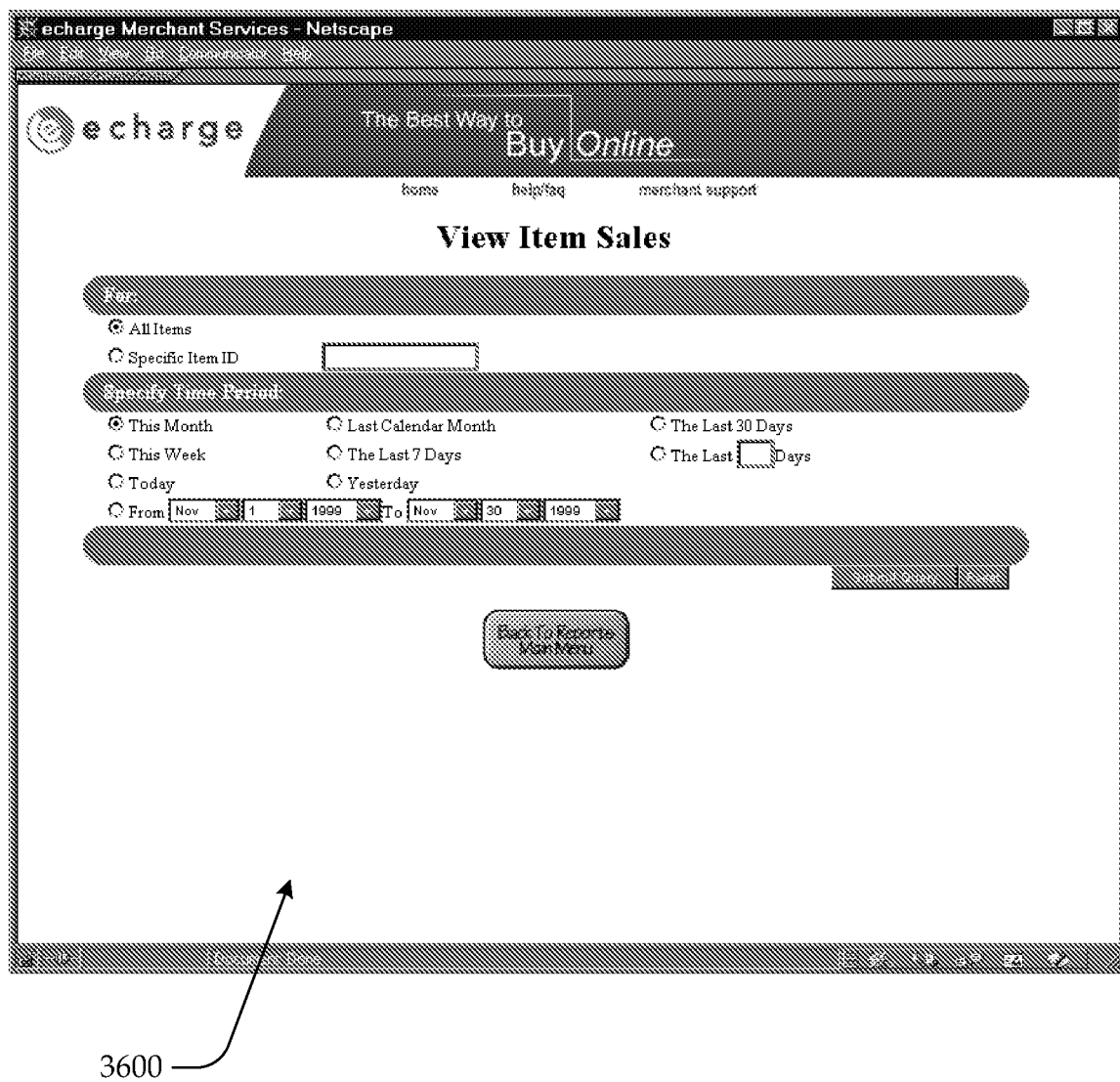
Figure 38:
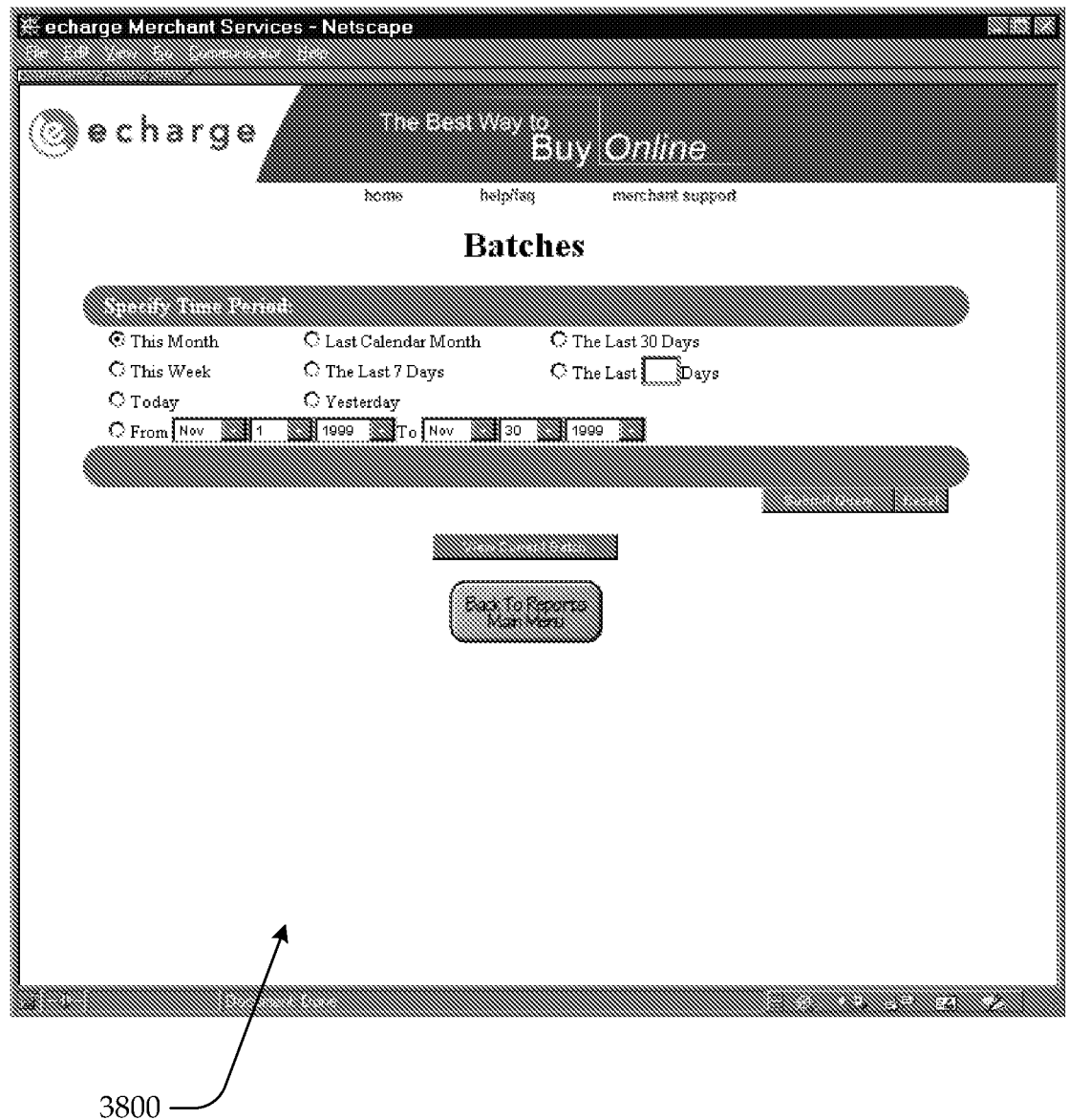
Figure 39:
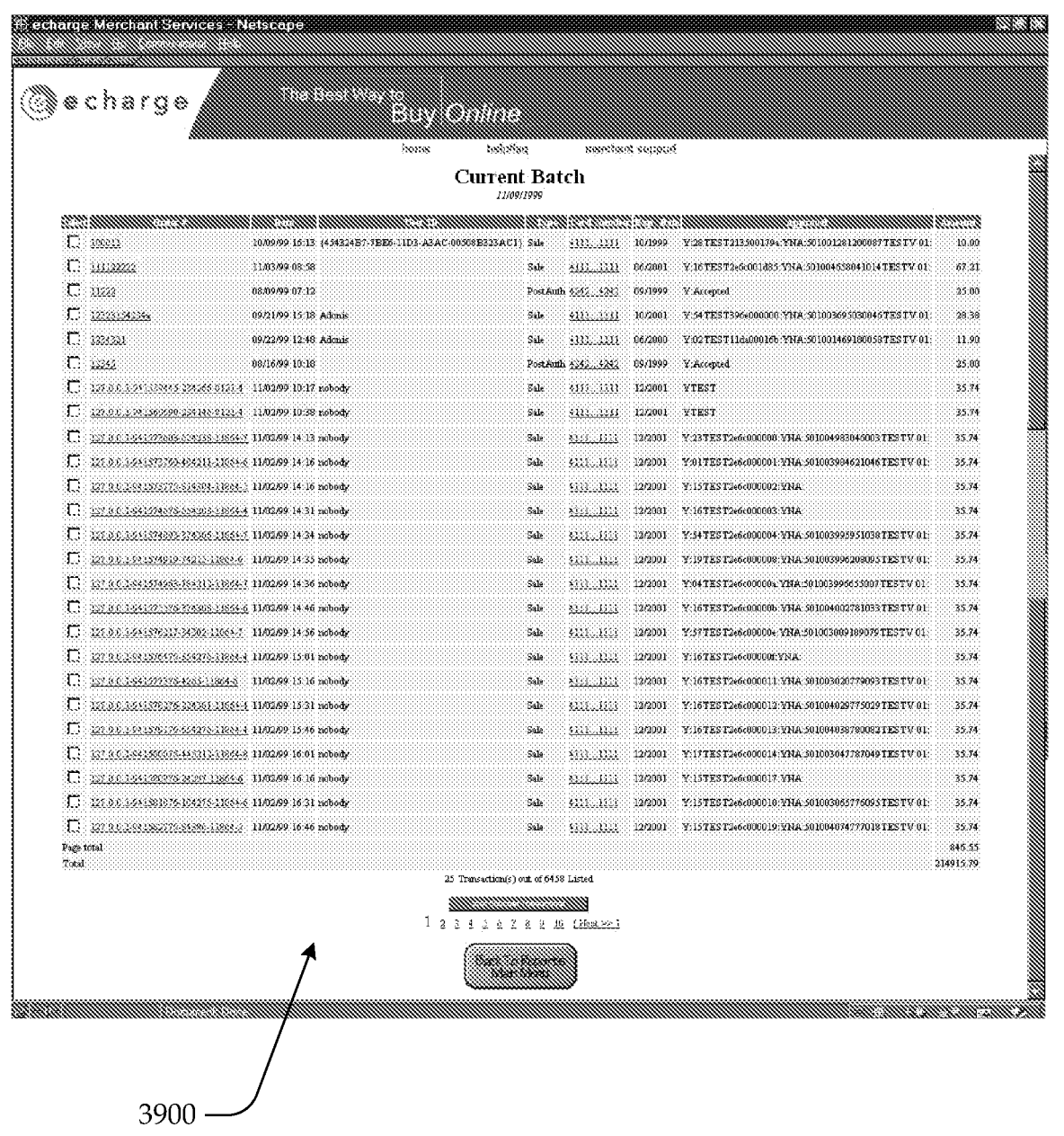
Figure 40:
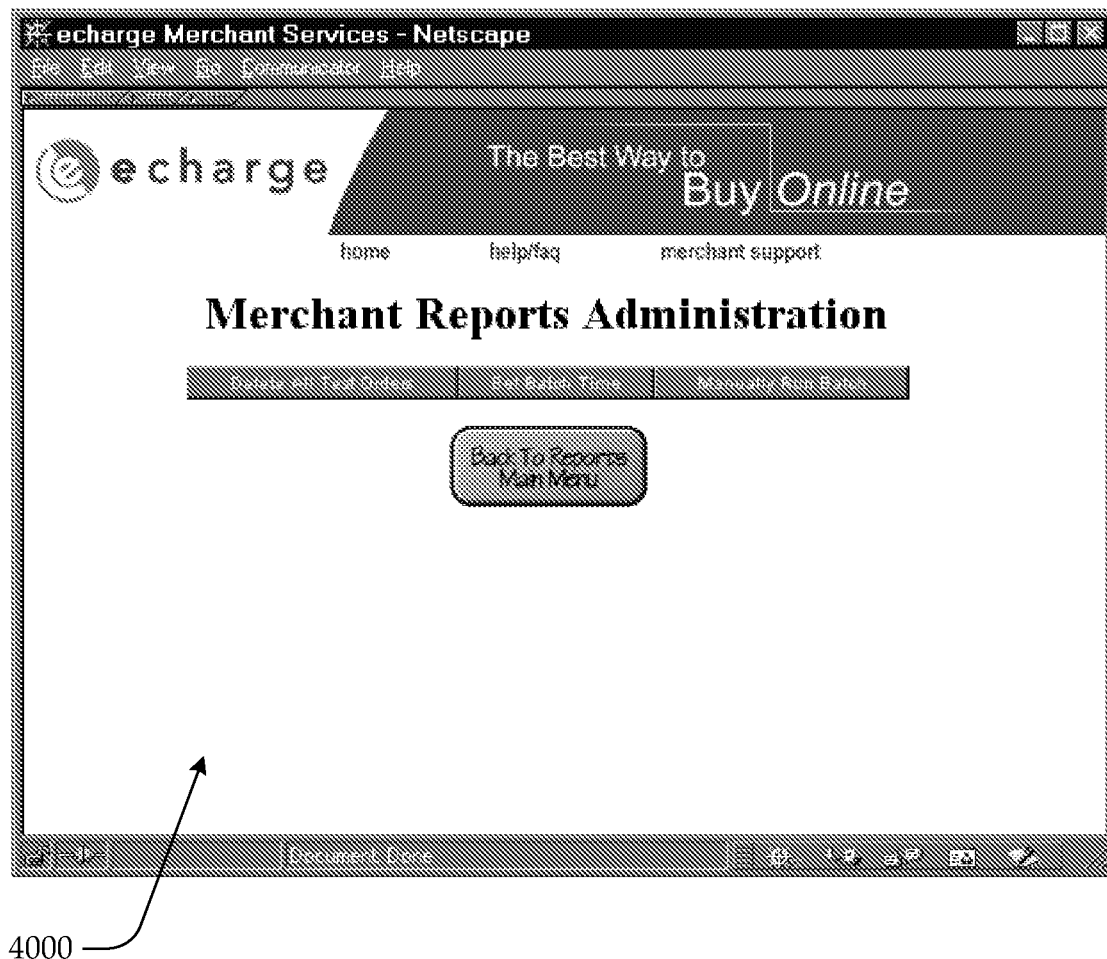

FIGS. 31, 33, 35, 37, and 39 illustrate exemplary Web pages 3100, 3300, 3500, 3700, and 3900 illustrating exemplary reports available to a seller. FIG. 31 shows an exemplary Web page 3100 with a graph charting the number of sales occurring each month during a year-long period. FIG. 33 shows an exemplary Web page 3300 with a table indicating the status and information on particular orders received. FIG. 35 shows an exemplary Web page 3500 with a table listing transactions that have already been processed for each order, and the result of that processing. FIG. 37 shows an exemplary Web page 3700 with a table listing item sales and along with relevant statistics such as number of units sold, what percentage of units have been sold and what percent of overall sales does that item account for. FIG. 39 shows an exemplary Web page 3900 with a table listing transactions that have yet to be processed and are still wait for the next batch of transaction to be run.

FIGS. 32, 34, 36, 38, and 40 illustrate exemplary Web page forms 3200, 3400, 3600, 3800 and 4000 for customizing seller reports.

While the preferred embodiment of the invention has been illustrated and described, it will be appreciated that various changes can be made therein without departing from the spirit and scope of the invention. For example, it will also be appreciated that there are other transactions applicable to a virtual payment account of the present invention, e.g., account closure, credit limit modification, overdue account notification, etc. It will be appreciated that these transactions can be initiated by various components of the system, for example a financial institution may institute a change in a credit limit by sending a request to one of the sub-systems on the credit processing server. One of ordinary skill in the art will recognize that the requests for such transactions are processed by the virtual payment system of the present invention in a manner similar to the processing of the purchase settlement, and refund transactions described in detail above.

We claim:

1. A method for purchasing an item offered for sale from a network server by an electronic device of a user using a virtual payment account, the network server including a database containing information regarding items offered for sale, the method comprising:

establishing, by a commerce server, a secure connection with an electronic device of the user, the commerce server being operable to serve a plurality of network servers, including the network server, wherein the electronic device is used by the user when purchasing the item offered for sale from the network server;

receiving, by the commerce server, an authentication request from the electronic device via the secure connection, wherein the authentication request comprises one or more credentials purported to identify the user as a registered holder of one or more virtual payment accounts maintained by the commerce server, each credential comprising a digital certificate generated by the commerce server using a public key of an encryption key pair generated by an authenticator downloaded to the buyer computer from the commerce server upon approval of a virtual payment account by the commerce platform, the virtual payment account associated with the digital certificate, and the digital certificate is generated by the commerce server by signing the public key to form the digital certificate, and each credential stored in a container at the electronic device, the container generated during approval of the virtual payment account by the commerce server;

in response to the commerce server receiving the authentication request, determining by the commerce server whether a valid virtual payment account maintained by the commerce server is associated with the user based on account identification information within one or more of the credentials for which the commerce server verified the digital signature of the commerce server within the one or more of the credentials;

in response to the commerce server determining that a valid virtual payment account is associated with the user based on verification of the digital signature of the commerce server within one or more of the credentials, returning account identification information to the electronic device that identifies at least the valid virtual payment account, wherein the account identification information is usable to purchase the item offered for sale from the network server using the valid virtual payment account that is determined to be associated with the user based on the one or more electronic device credentials;

in response to the network server receiving an order to purchase the item and the account identifier from the electronic device, and the commerce server receiving a request for purchase authorization from the network server including the account identifier, sending a valid transaction authorization by the commerce server to the network server; and in response to the network server receiving the valid transaction authorization, completing the purchase of the item.

2. The method defined in claim 1 further comprising, in response to the network server requesting purchase authorization from the commerce server, the commerce server:
determining whether the virtual payment account may be charged for purchase of the item; and
in response to determining that the virtual payment account may be charged for the purchase of the item, transmitting the valid transaction authorization to the network server.

3. The method defined in claim 1 wherein the virtual payment account comprises a main account and at least one sub-account.

4. The method defined in claim 1 further comprising returning the container to a web browser running on the electronic device.

5. The method defined in claim 1 wherein the commerce server is operable to interface with one or more credit processing servers in order to authorize and settle item purchases using virtual payment accounts maintained by the commerce server.

6. The method defined in claim 1 wherein completing the purchase of the item comprises the seller computer providing the item to a buyer associated with the electronic device and requesting payment from the commerce server.

7. The method defined in claim 1 wherein the account identification information is obtained in response to retrieving information from a secure token.

8. The method defined in claim 1 wherein the seller computer provides the item to the buyer associated with the electronic device by downloading the item to the electronic device.

9. The method defined in claim 1 wherein the seller computer provides the item to the buyer associated with the electronic device by arranging for the item to be shipped to the buyer.

10. An article of manufacture having one or more non-transitory computer readable media storing instructions which, when executed by a commerce server of a network arrangement, cause the network arrangement to perform a method for facilitating purchase of an item offered for sale from a network server by an electronic device of a user using a virtual payment account, the network server storing an item offered for sale database containing information regarding items offered for sale, the method comprising:

establishing, by a commerce server, a secure connection with an electronic device of the user, the commerce server being operable to serve a plurality of network servers, including the network server, wherein the electronic device is used by the user when purchasing the item offered for sale from the network server;

receiving, by the commerce server, an authentication request from the electronic device via the secure connection, wherein the authentication request comprises one or more credentials purported to identify the user as a registered holder of one or more virtual payment accounts maintained by the commerce server, each credential comprising a digital certificate generated by the commerce server using a public key of an encryption key pair generated by an authenticator downloaded to the buyer computer from the commerce server upon approval of a virtual payment account by the commerce platform, the virtual payment account associated with the digital certificate, and the digital certificate is generated by the commerce server by signing the public key to form the digital certificate, and each credential stored in a container at the electronic device, the container generated during approval of the virtual payment account by the commerce server;

in response to the commerce server receiving the authentication request, determining by the commerce server whether a valid virtual payment account maintained by the commerce server is associated with the user based on account identification information within one or more of the credentials for which the commerce server verified the digital signature of the commerce server within the one or more of the credentials;

in response to the commerce server determining that a valid virtual payment account is associated with the user based on verification of the digital signature of the commerce server within one or more of the credentials, returning account identification information to the electronic device that identifies at least the valid virtual payment account, wherein the account identification information is usable to purchase the item offered for sale from the network server using the valid virtual payment account that is determined to be associated with the user based on the one or more electronic device credentials;

in response to the network server receiving an order to purchase the item and the account identifier from the electronic device, and the commerce server receiving a request for purchase authorization from the network server including the account identifier, sending a valid transaction authorization by the commerce server to the network server; and in response to the network server receiving the valid transaction authorization, completing the purchase of the item.

11. The article of manufacture defined in claim 10 wherein the method further comprises, in response to the network server requesting purchase authorization from the commerce server, the commerce server:

determining whether the virtual payment account may be charged for purchase of the item; and in response to determining that the virtual payment account may be charged for the purchase of the item, transmitting the valid transaction authorization to the network server.

12. The article of manufacture defined in claim 10 wherein the virtual payment account comprises a main account and at least one sub-account.

13. The article of manufacture defined in claim 10 wherein the method further comprises returning the account identification container to a web browser running on the electronic device.

14. The article of manufacture defined in claim 10 wherein the commerce server is operable to interface with credit processing servers in order to authorize and settle item purchases using virtual payment accounts maintained by the commerce server.

15. The article of manufacture defined in claim 10 wherein completing the purchase of the item comprises the seller computer providing the item to a buyer associated with the electronic device and requesting payment from the commerce server.

16. The article of manufacture defined in claim 10 wherein the account identification information is obtained in response to retrieving information from a secure token.

17. The article of manufacture defined in claim 10 wherein the seller computer provides the item to the buyer associated with the electronic device by downloading the item to the electronic device.

18. The article of manufacture defined in claim 10 wherein the seller computer provides the item to the buyer associated with the electronic device by arranging for the item to be shipped to the buyer.

* * * * *